United States Patent
Sun et al.

(10) Patent No.: US 7,929,765 B2
(45) Date of Patent: Apr. 19, 2011

(54) VIDEO TEXT PROCESSING APPARATUS

(75) Inventors: Jun Sun, Beijing (CN); Yutaka Katsuyama, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/778,336

(22) Filed: May 12, 2010

(65) Prior Publication Data

US 2010/0220930 A1 Sep. 2, 2010

Related U.S. Application Data

(62) Division of application No. 10/737,209, filed on Dec. 17, 2003, now Pat. No. 7,787,705.

(30) Foreign Application Priority Data

Dec. 26, 2002 (JP) ................................ 2002-378577

(51) Int. Cl.
*G06K 9/18* (2006.01)
(52) U.S. Cl. ....................................... 382/182; 382/270
(58) Field of Classification Search ................... 382/182
See application file for complete search history.

(56) References Cited

U.S. PATENT DOCUMENTS

| | | | |
|---|---|---|---|
| 4,769,826 A | 9/1988 | Kubo et al. | |
| 4,809,067 A | 2/1989 | Kikuchi et al. | |
| 4,837,632 A | 6/1989 | Kubo et al. | |
| 5,307,422 A | 4/1994 | Wang | |
| 5,465,304 A | 11/1995 | Cullen et al. | |
| 5,583,946 A * | 12/1996 | Gourdol | 382/187 |
| 5,652,806 A * | 7/1997 | Friend | 382/175 |
| 5,731,832 A | 3/1998 | Ng | |
| 5,745,169 A | 4/1998 | Murphy et al. | |
| 5,793,887 A | 8/1998 | Zlotnick | |
| 5,805,725 A * | 9/1998 | Sakata et al. | 382/187 |
| 5,974,177 A * | 10/1999 | Krtolica | 382/202 |
| 5,991,441 A * | 11/1999 | Jourjine | 382/187 |
| 6,055,025 A | 4/2000 | Shahraray | |
| 6,064,769 A * | 5/2000 | Nakao et al. | 382/224 |
| 6,069,918 A | 5/2000 | Meyer et al. | |
| 6,101,274 A * | 8/2000 | Pizano et al. | 382/176 |
| 6,211,912 B1 | 4/2001 | Shahraray | |
| 6,272,245 B1 | 8/2001 | Lin | |
| 6,347,156 B1 | 2/2002 | Kamada et al. | |
| 6,366,699 B1 | 4/2002 | Kuwano et al. | |
| 6,470,094 B1 * | 10/2002 | Lienhart et al. | 382/176 |

(Continued)

FOREIGN PATENT DOCUMENTS

JP 11-178007 A 7/1999

(Continued)

OTHER PUBLICATIONS

USPTO, [Perungavoor] "U.S. Appl. No. 10/737,209 (120 parent)", {NOA} Notice of Allowance and Fees Due (PTOL 85), which includes Notice of Allowability (PTOL-37) and Examiner's Statement of Reasons for Allowance Feb. 5, 2010.

(Continued)

*Primary Examiner* — Sath V Perungavoor
(74) *Attorney, Agent, or Firm* — Fujitsu Patent Center

(57) ABSTRACT

Video frames that contain text areas are selected from given video frames by removing redundant frames and non-text frames, the text areas in the selected frames are located by removing false strokes, and text lines in the text areas are extracted and binarized.

17 Claims, 64 Drawing Sheets

U.S. PATENT DOCUMENTS

| | | | |
|---|---|---|---|
| 6,507,671 B1 | 1/2003 | Kagan et al. | |
| 6,535,639 B1 | 3/2003 | Uchihachi et al. | |
| 6,614,930 B1* | 9/2003 | Agnihotri et al. | 382/176 |
| 6,694,056 B1* | 2/2004 | Ito et al. | 382/186 |
| 6,778,224 B2 | 8/2004 | Dagtas et al. | |
| 6,891,971 B2* | 5/2005 | Loudon et al. | 382/186 |
| 7,031,553 B2* | 4/2006 | Myers et al. | 382/289 |
| 7,039,652 B2 | 5/2006 | Jun et al. | |
| 7,158,669 B2 | 1/2007 | Tanaka et al. | |
| 7,260,257 B2 | 8/2007 | Zhang et al. | |
| 7,260,779 B2* | 8/2007 | Keyser et al. | 715/251 |
| 7,333,676 B2* | 2/2008 | Myers et al. | 382/289 |
| 7,372,991 B2 | 5/2008 | Chen et al. | |
| 7,512,275 B2 | 3/2009 | Yumoto et al. | |
| 7,620,268 B2 | 11/2009 | Myers et al. | |
| 7,738,706 B2* | 6/2010 | Aradhye et al. | 382/182 |
| 7,787,705 B2* | 8/2010 | Sun et al. | 382/270 |
| 7,817,855 B2* | 10/2010 | Yuille et al. | 382/176 |
| 2001/0033694 A1* | 10/2001 | Goodman et al. | 382/229 |
| 2002/0005898 A1 | 1/2002 | Kawada et al. | |
| 2002/0037104 A1* | 3/2002 | Myers et al. | 382/187 |
| 2002/0126143 A1 | 9/2002 | Bae et al. | |
| 2002/0126203 A1 | 9/2002 | Yu et al. | |
| 2002/0175932 A1 | 11/2002 | Yu et al. | |
| 2002/0196370 A1 | 12/2002 | Dagtas et al. | |
| 2003/0086611 A1* | 5/2003 | Loudon et al. | 382/186 |
| 2003/0091235 A1 | 5/2003 | Xiong | |
| 2003/0198381 A1 | 10/2003 | Tanaka et al. | |
| 2003/0218696 A1 | 11/2003 | Bagga et al. | |
| 2003/0234772 A1 | 12/2003 | Zhang et al. | |
| 2004/0202349 A1 | 10/2004 | Erol et al. | |
| 2004/0205655 A1 | 10/2004 | Wu et al. | |
| 2005/0201619 A1* | 9/2005 | Sun et al. | 382/176 |
| 2010/0220930 A1* | 9/2010 | Sun et al. | 382/190 |

FOREIGN PATENT DOCUMENTS

JP  2001-285716 A  10/2001

OTHER PUBLICATIONS

USPTO, [Perungavoor] "U.S. Appl. No. 10/737,209 (120 parent)", {CTFR} Final Rejection. Feb. 10, 2009.

USPTO, [Perungavoor] "U.S. Appl. No. 10/737,209 (120 parent)", {CTRS} Requirement for Restriction/Election. Mar. 21, 2008.

USPTO, [Perungavoor] "U.S. Appl. No. 10/737,209 (120 parent)",{CTNF} Non-Final Rejection. Sep. 10, 2008.

USPTO, [Perungavoor] "U.S. Appl. No. 10/737,209 (120 parent)", {CTNF} Non-Final Rejection. Oct. 8, 2009.

M.A. Smith, T. Kanade, "Video skimming for quick browsing based on audio and image characterization", Technical Report CMU-CS-95-186, Carnegie Mellon University, Jul. 1995.

Wei Xiong, Chung Mong Leee, Rui-Hua Ma, "Automatic video data structuring through shot partitioning and key-frame computing", Machine Vision and Applications, Springer Berlin/Heidelberg, pp. 51-65, Jun. 1, 1997, ISSN: 0932-8092 (Print) 1432-1769 (Online).

U.S. Appl. No. 10/737,209, filed Dec. 17, 2003, S. Perungavoor.

"Japanese Office Action", Japanese Appln No. 2002-378577, partial English translation, Feb. 12, 2008.

Sato, Toshio et al., "Video OCR: Indexing Digital News Libraries by Recognition of Superimposed Captions", ACM Multimedia Systems Special Issue on Video Libraries Feb. 1998, pp. 1-12.

Wu, Victor et al., "Text Finder: An Automatic System to Detect and Recognize Text In Images", IEEE Transactions on Pattern Analysis and Machine Intelligence, vol. 21, No. 11 Nov. 1999, pp. 1224-1229.

* cited by examiner

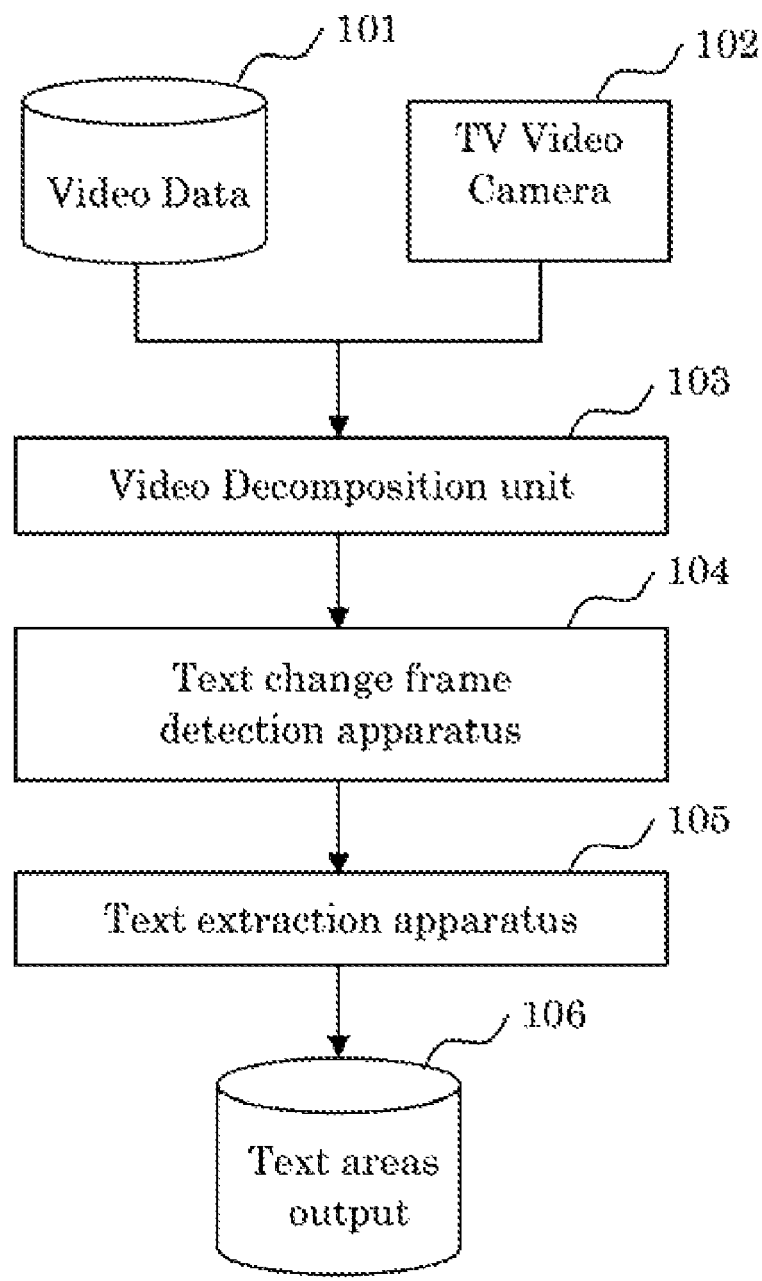
F I G. 1

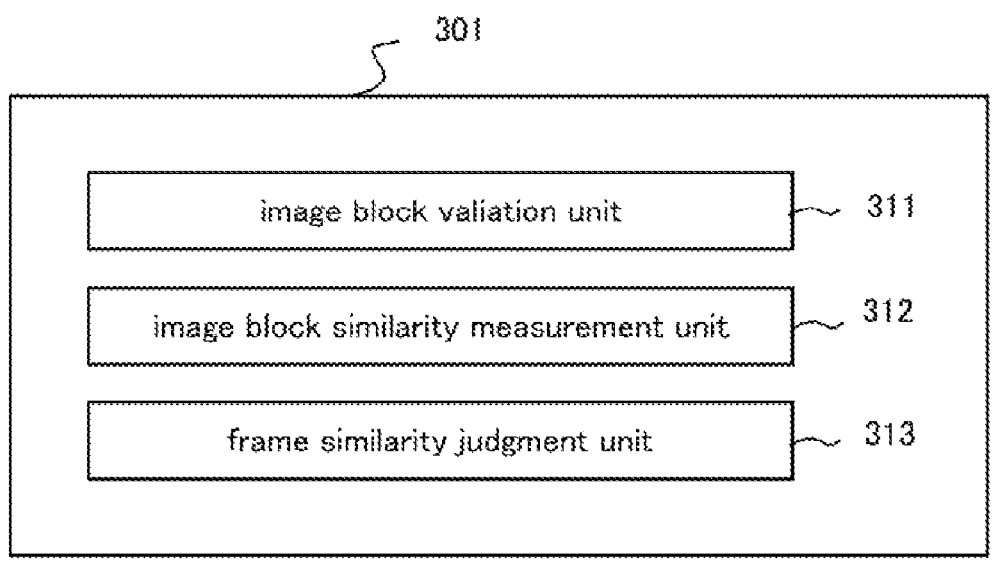
F I G. 4

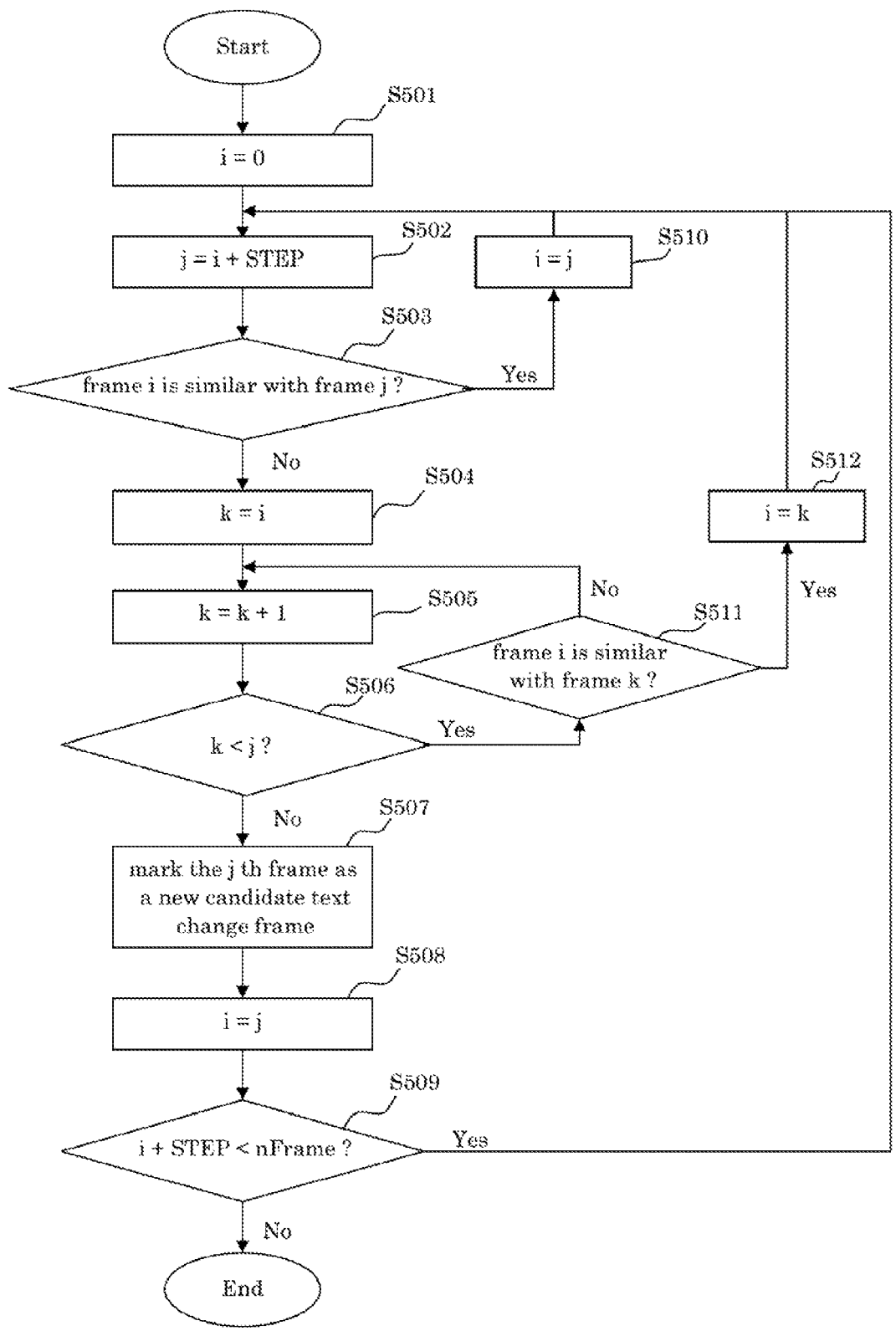
F I G. 10

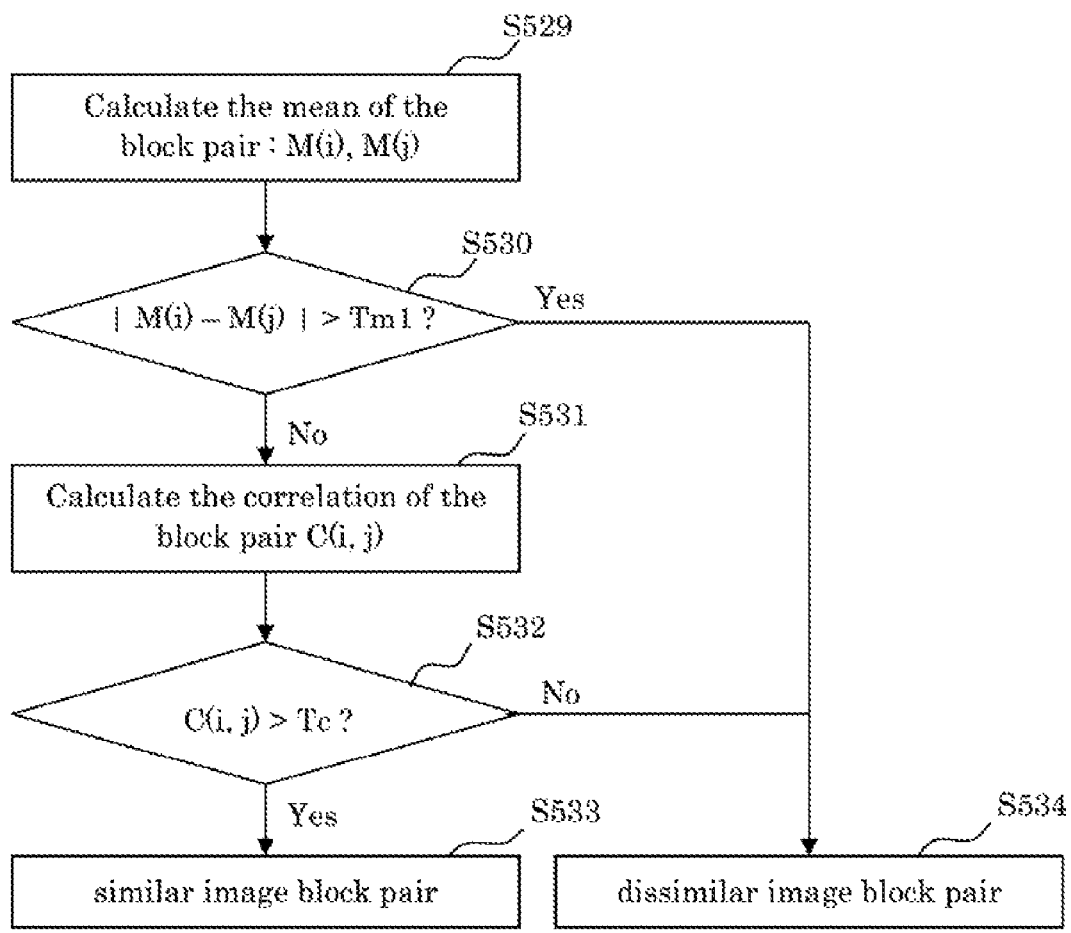
F I G. 13

F I G. 2 0

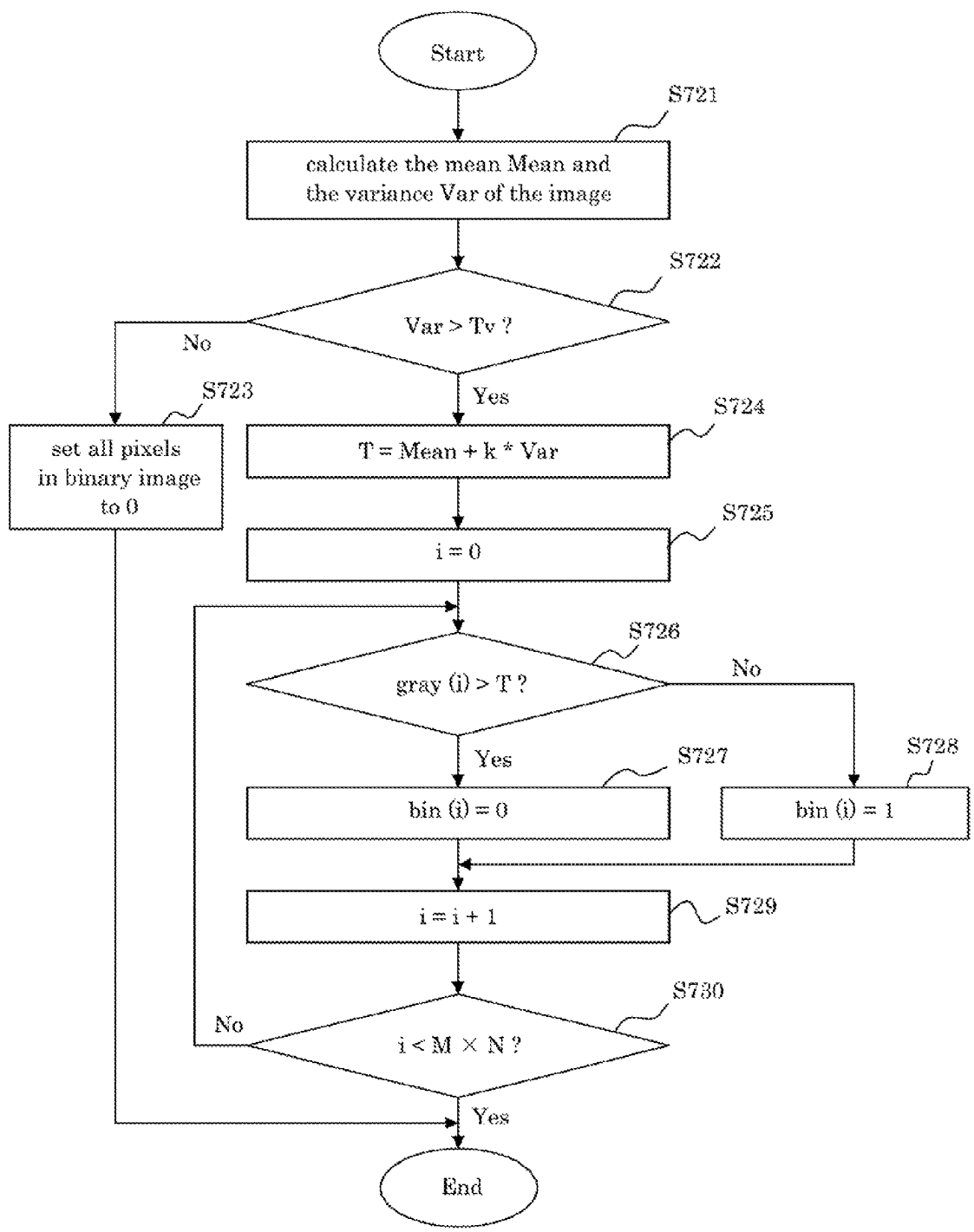
F I G. 25

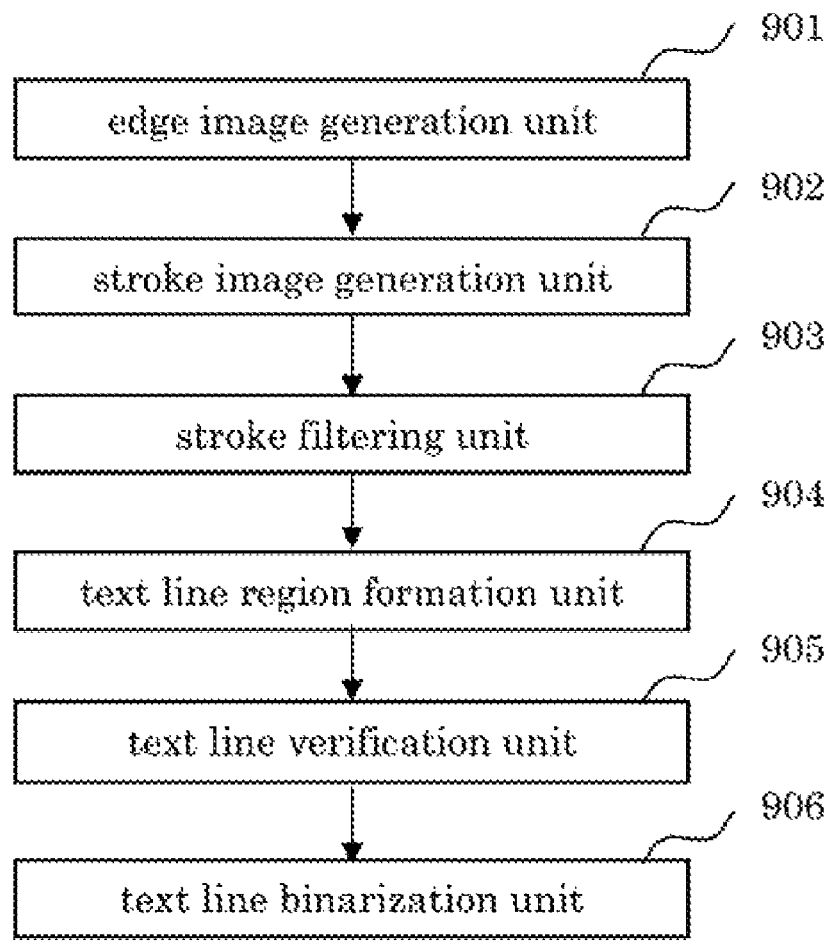
F I G. 3 4

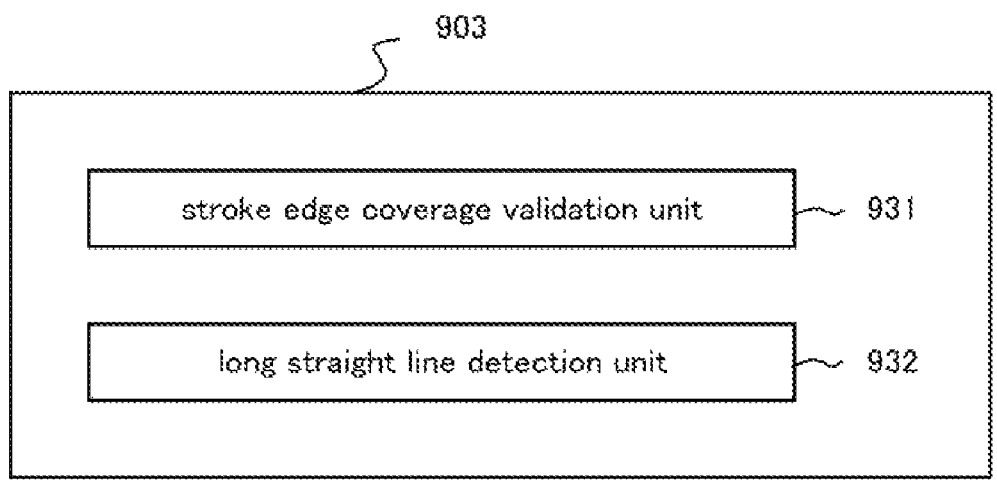
F I G. 37

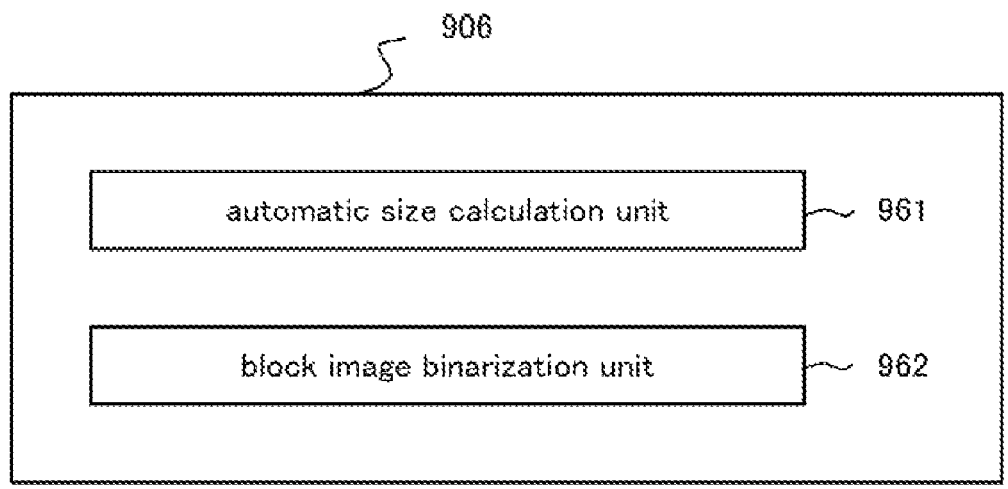
F I G. 4 0

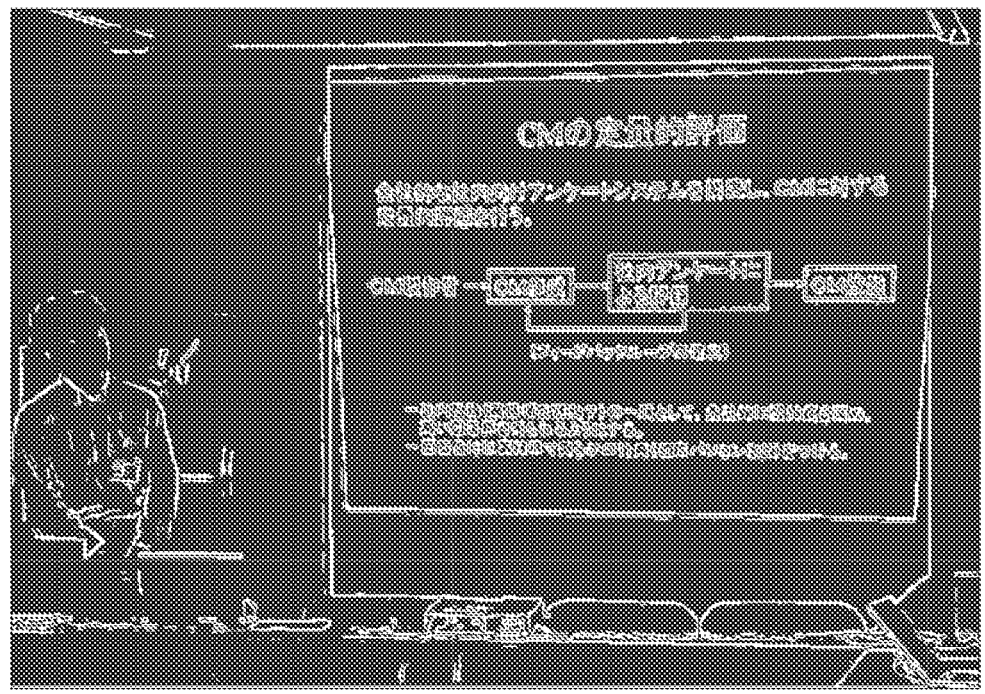
F I G. 4 2

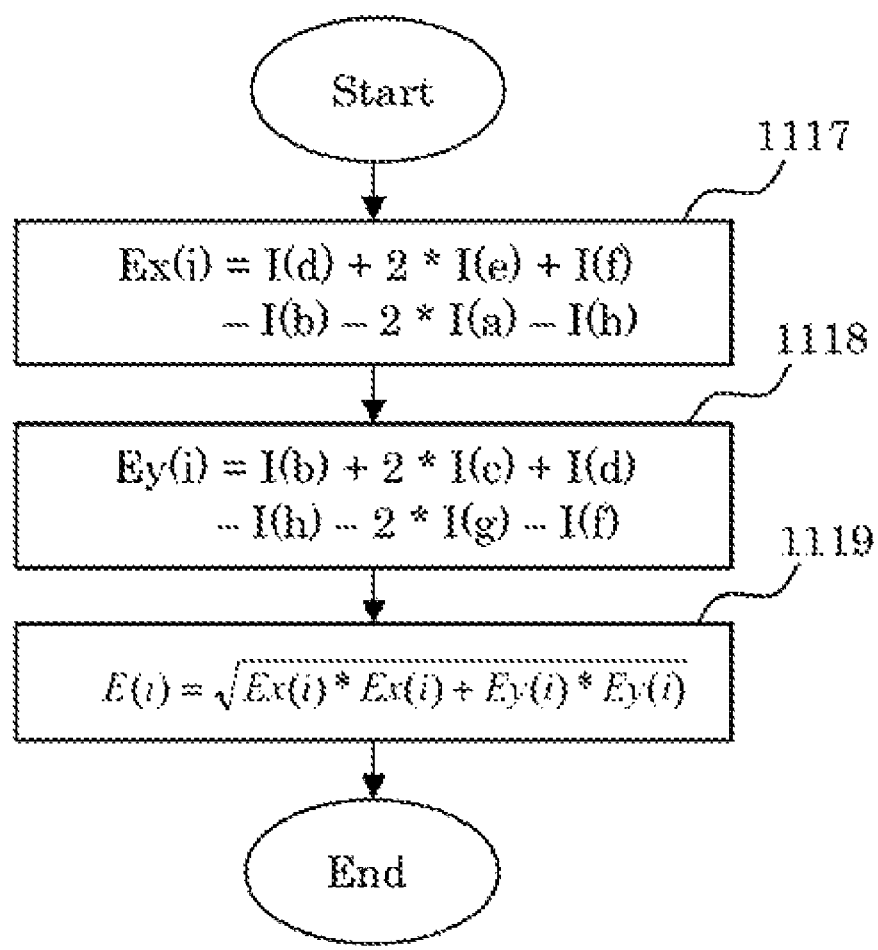
F I G. 5 0

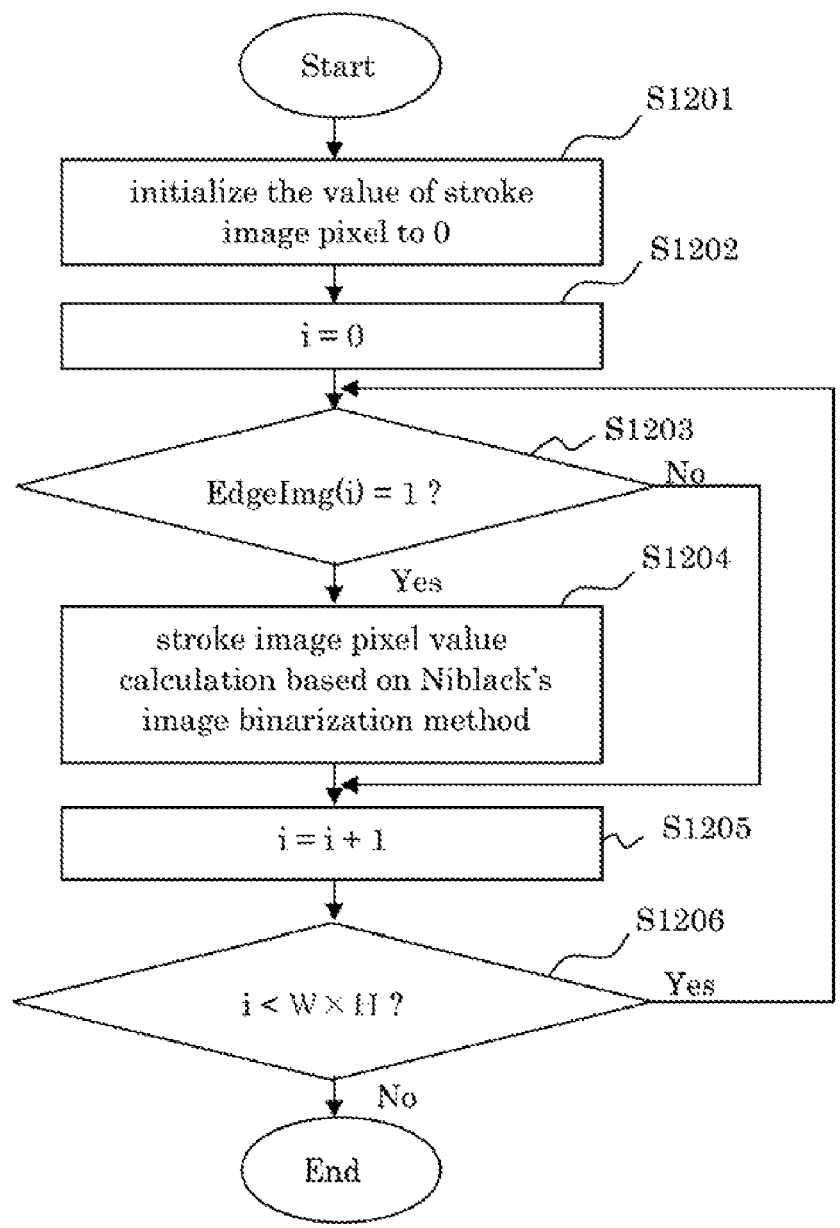
F I G. 5 1

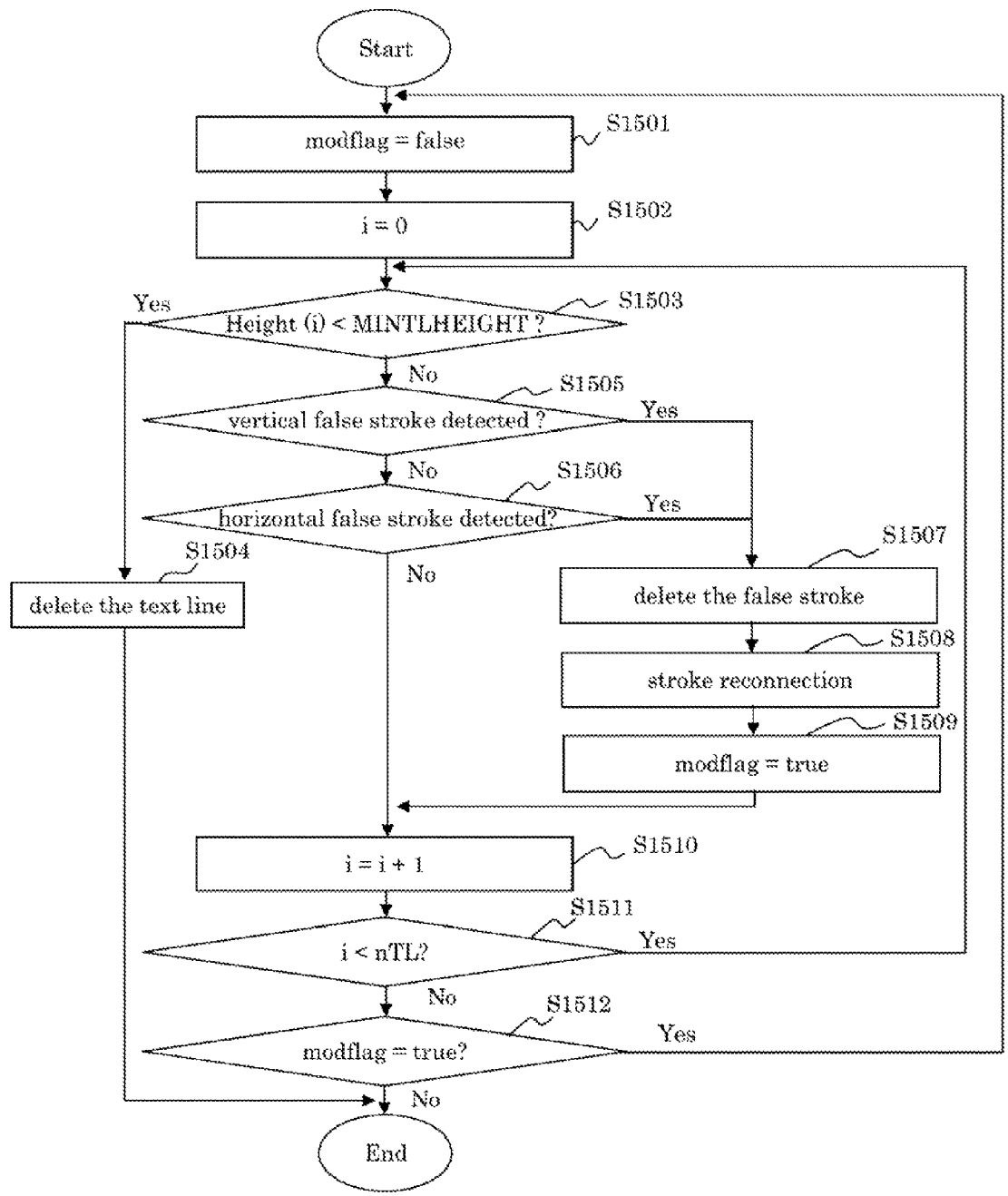
F I G. 56

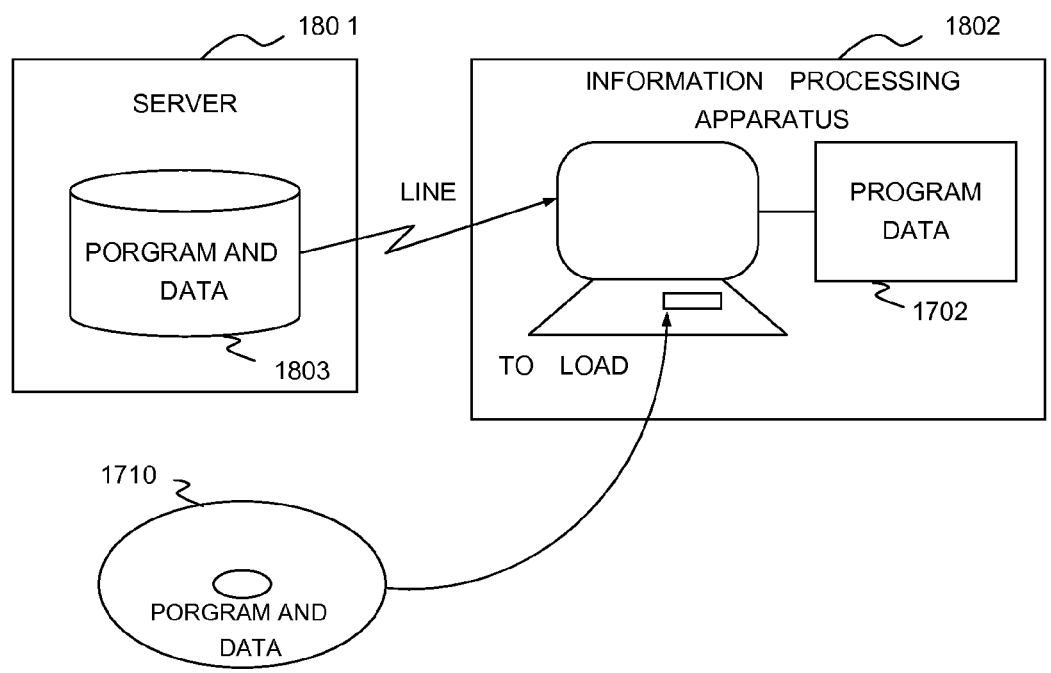
F I G . 6 4

VIDEO TEXT PROCESSING APPARATUS

BACKGROUND OF THE INVENTION

1. Field of the Invention

The present invention relates to a video image processing apparatus, more specifically to a text image extraction apparatus for e-Learning video. The text change frame detection apparatus locates the video frames that contain text information. The text extraction apparatus extracts the text information out of the video frames and send the extracted text information to an optical character recognition (OCR) engine for recognition.

2. Description of the Related Art

Text retrieval in video and image is a very important technique and has a variety of application, such as storage capacity reduction, video and image indexing, and digital library, etc.

The present invention focuses on a special type of video-e-Learning video, which often contains a large amount of text information. In order to efficiently retrieve the text content in the video, two techniques are needed: text change frame detection in video and text extraction from image. A text change frame is a frame that marks the change of text content in a video. The first technique fast browses the video and selects those video frames that contain text area. The second technique then extracts the text information from those video frames and sends them to an OCR engine for recognition.

Text change frame detection technique can be regarded as a special case of scene change frame detection technique. The techniques for detecting the scene change frame that marks the changes of the content in video from a plurality of frames in a video have been studied actively in recent years. Some methods focus on the intensity difference between frames, some methods focus on the difference of color histogram and the texture. However, these methods are not suitable for text change frame detection in video, especially in e-Learning field.

Take presentation video—a typical e-Learning video as example, in which the video frame often contains a slide image. Examples of slide image include the PowerPoint® image and the film image from a projector. The change of the content of slide will not cause a dramatic change in color and texture. Also, the focus of the video camera often moves around in a slide image during the talk, which causes image shifting. Image shifting also occurs when the speaker moving his or her slides. These content shifting frames will be marked as scene change frames by conventional methods. Another drawback of the conventional method is that they can not tell directly whether a frame contains text information.

Another way to extract text change frame from video is performing text extraction method on every frame in the video and judging whether the content has been changed. The problem of such strategy is that it is very time consuming.

After the text change frames are detected, a text extraction method should be used to extract the text lines from the frames. Many methods are proposed to extract the text lines from video and static image, such as:

V. Wu, R. Manmatha, and E. M. Riseman, "TextFinder: An Automatic System to Detect and Recognize Text in Images," IEEE transactions on Pattern Analysis and Machine Intelligence, VOL. 21, NO. 11, pp. 1224-1229, November, 1999.

T. Sato, T. Kanade, E. Hughes, M. Smith, and S. Satoh, "Video OCR: Indexing Digital News Libraries by Recognition of Superimposed Captions," ACM Multimedia Systems Special Issue on Video Libraries, February, 1998.

Also, some patents related to this field have been published, such as U.S. Pat. Nos. 6,366,699, 5,465,304, 5,307,422.

These methods will meet problem when deal with video frame in e-Learning. The characters in e-Learning video image always have very small size, also the boundaries of these characters are very dim, and there are many disturbances around the text area, such like the bounding box of text line, the shading and occlusion of human body, etc.

However, there are the following problems in the above mentioned conventional video image processing.

It is very time consuming to perform text extraction method on every frame in the video and judge whether the content has been changed.

The characters in e-Learning video image always have very small size, also the boundaries of these characters are very dim, and there are many disturbances around the text area. Therefore, the conventional text extraction method will leave many false character strokes in the final binary image, which give a wrong recognition result in the following OCR stage.

SUMMARY OF THE INVENTION

It is an object of the present invention to select the candidate text change frames from a plurality of video frames in a fast speed, while keeping a high recall rate, which is defined as the rate of the number of extracted correct text change frames to the total number of correct text change frames.

It is another object of the present invention to provide a scheme for efficiently detecting the text region in the text change frame, removing as much as possible the false character strokes, and providing a binarized image for every text line.

The above objects are fulfilled by a video text processing apparatus for fast selecting from all frames in a video those frames that contain text contents, marking the region of each text line in the text frame and outputting the text line in a binary form, comprising a text change frame detection apparatus for fast selecting text frames in the video and a text extraction apparatus for extracting the text lines in the text frame. The binary form is, for example, represented by black pixels corresponding to background and white pixels corresponding to character strokes.

The first text change frame detection apparatus comprises first frame removing means, second frame removing means, third frame removing means and output means, and selects a plurality of video frames including text contents from given video frames. The first frame removing means removes redundant video frames from the given video frames. The second frame removing means removes video frames that do not contain a text area from the given video frames. The third frame removing means detects and removes redundant video frames caused by image shifting from the given video frames. The output means outputs remaining video frames as candidate text change frames.

The second text change frame detection apparatus comprises image block validation means, image block similarity measurement means, frame similarity judgment means and output means, and selects a plurality of video frames including text contents from given video frames. The image block validation means determines whether two image blocks in the same position in two video frames of given video frames are a valid block pair that has an ability to show a change of image contents. The image block similarity measurement means calculates a similarity of two image blocks of the valid block pair and determines whether the two image blocks are similar.

The frame similarity judgment means determines whether the two video frames are similar by using a ratio of the number of similar image blocks to the total number of valid block pairs. The output means outputs remaining video frames after a similar video frame is removed, as candidate text change frames.

The third text change frame detection apparatus comprises fast and simple image binarization means, text line region determination means, rebinarization means, text line confirmation means, text frame verification means and output means, and selects a plurality of video frames including text contents from given video frames. The fast and simple image binarization means generates a first binary image of a video frame of the given video frames. The text line region determination means determines a position of a text line region by using a horizontal projection and a vertical projection of the first binary image. The rebinarization means generates a second binary image of every text line region. The text line confirmation means determines validity of a text line region by using a difference between the first binary image and the second binary image and a fill rate of the number of foreground pixels in the text line region to the total number of pixels in the text line region. The text frame verification means confirms whether a set of continuous video frames are non-text frames that do not contain a text area by using the number of valid text line regions in the set of continuous video frames. The output means outputs remaining video frames after the non-text frames are removed, as candidate text change frames.

The fourth text change frame detection apparatus comprises fast and simple image binarization means, text line vertical position determination means, vertical shifting detection means, horizontal shifting detection means and output means, and selects a plurality of video frames including text contents from given video frames. The fast and simple image binarization means generates binary images of two video frames of the given video frames. The text line vertical position determination means determines a vertical position of every text line region by using horizontal projections of the binary images of the two video frames. The vertical shifting detection means determines a vertical offset of image shifting between the two video frames and a similarity of the two video frames in a vertical direction by using correlation between the horizontal projections. The horizontal shifting detection means determines a horizontal offset of the image shifting and a similarity of the two video frames in a horizontal direction by using correlation between vertical projections of every text line in the binary images of the two video frames. The output means outputs remaining video frames after a similar video frame is removed, as candidate text change frames.

After the candidate text change frames in the video are detected by the text change frame detection apparatus, the image of every frame is then sent to the text extraction apparatus for text extraction.

The first text extraction apparatus comprises edge image generation means, stroke image generation means, stroke filtering means, text line region formation means, text line verification means, text line binarization means and output means, and extracts at least one text line region from a given image. The edge image generation means generates edge information of the given image. The stroke image generation means generates a binary image of candidate character strokes in the given image by using the edge information. The stroke filtering means removes the false strokes from the binary image by using the edge information. The text line region formation means combines a plurality of strokes into a text line region. The text line verification means removes a false character stroke from the text line region and reforms the text line region. The text line binarization means binarizes the text line region by using a height of the text line region. The output means outputs a binary image of the text line region.

The second text extraction apparatus comprises edge image generation means, stroke image generation means, stroke filtering means and output means, and extracts at least one text line region from a given image. The edge image generation means generates an edge image of the given image. The stroke image generation means generating a binary image of candidate character strokes in the given image by using the edge image. The stroke filtering means checks an overlap rate of a contour of a stroke in the binary image of the candidate character strokes by pixels indicating an edge in the edge image, determines that the stroke is a valid stroke if the overlap rate is greater than a predefined threshold and an invalid stroke if the overlap rate is less than the predefined threshold, and removes the invalid stroke. The output means outputs information of remaining strokes in the binary image of the candidate character strokes.

After the text line regions are extracted by the text extraction apparatus, they are sent to an OCR engine for recognition.

BRIEF DESCRIPTION OF THE DRAWINGS

FIG. 1 shows the configuration of the video text processing apparatus according to the present invention;

FIG. 4 shows the configuration of the frame similarity measurement unit;

FIG. 10 shows the flowchart of the operation of the frame similarity measurement unit;

FIG. 13 shows the flowchart of the operation of the image block similarity measurement unit;

FIG. 20 shows two pairs of binary images for two candidate text line regions;

FIG. 25 shows the flowchart of Niblack's image binarization method;

FIG. 34 shows the configuration of the text extraction apparatus according to the present invention;

FIG. 37 shows the configuration of the stroke filtering unit;

FIG. 40 shows the configuration of the text line binarization unit;

FIG. 42 shows the result of edge image generation;

FIG. 50 shows the flowchart of the operation of the edge strength calculation unit;

FIG. 51 shows the flowchart of the operation of the stroke image generation unit;

FIG. 56 shows the flowchart of the operation of the text line verification unit;

FIG. 64 shows storage media.

DESCRIPTION OF THE PREFERRED EMBODIMENTS

Figure 2:
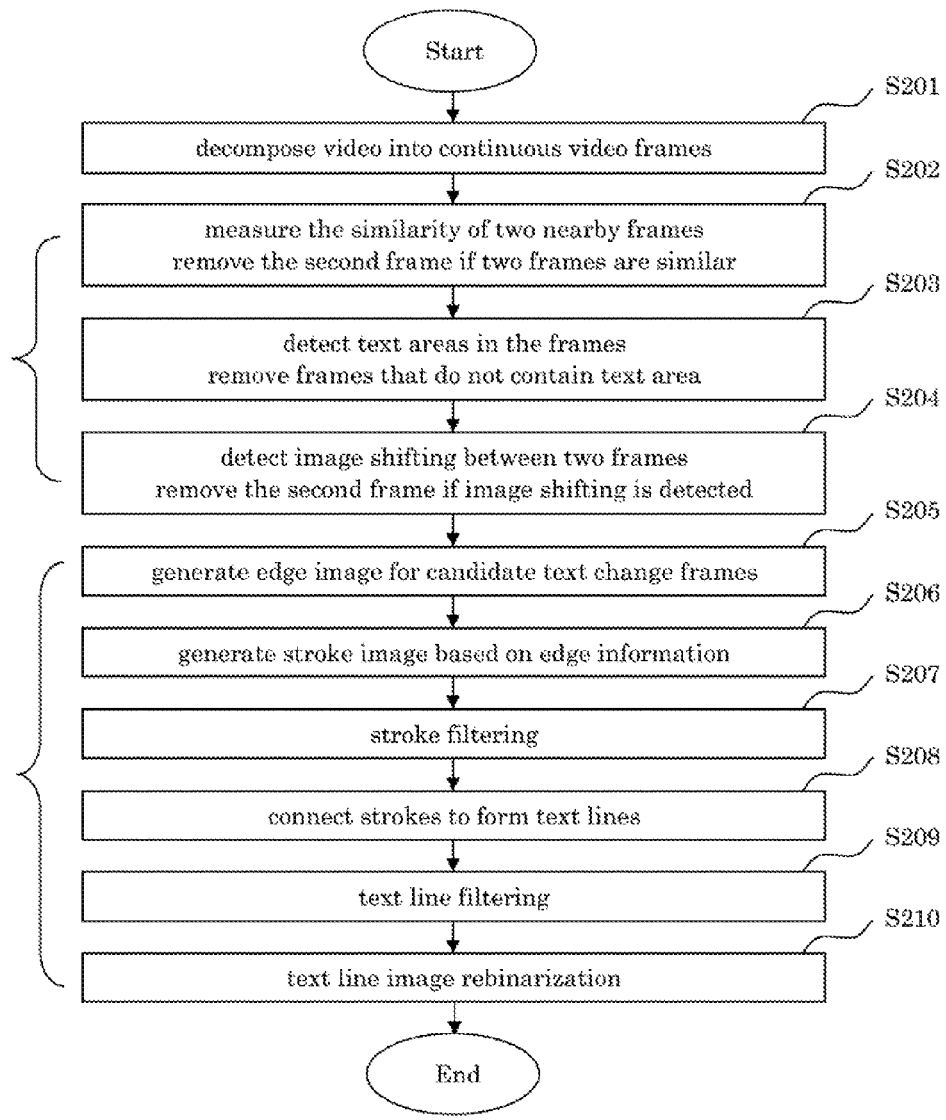
FIG. 2 shows the processing flowchart of the video text processing apparatus.

The embodiments of the present invention are described below in detail by referring to the drawings.

FIG. 1 shows the configuration of the video text processing apparatus according to the present invention. The input of the apparatus is an existing video data 101 or living video stream from a television (TV) video camera 102, the input video data is first decomposed into continuous frames by a video decomposition unit 103. Then a text change frame detection apparatus 104 is used to find the candidate text change frames in the video frames. The text change frame detection apparatus will greatly reduce the total processing time. After that, a text extraction apparatus 105 is enforced on every candidate text change frame to detect text lines (text areas) in the frames and output the images of the text lines to a database 106 for further OCR processing.

FIG. 2 shows the processing flow chart of the video text processing apparatus shown in FIG. 1. A process in S201 is performed by the video decomposition unit 103, processes in S202 to S204 are performed by the text change frame detection apparatus 104, and processes in S205 to S210 are performed by the text extraction apparatus 105.

First the input video is decomposed into continuous frames (S201). Then frame similarity measurement is performed to measure the similarity of two nearby frames (S202). If the two frames are similar, then the second frame is removed. Next text frame detection and verification is performed to judge whether the remaining frames from the process in S202 contain text lines (S203). If a frame does not contain a text line, the frame is removed. Image shifting detection is further performed to determine whether image shifting exists in two frames (S204). If so, the second frame is removed. The output of the text change frame detection apparatus 104 is a group of candidate text change frames.

For every candidate text change frame, edge image generation is performed to generate the edge image of the frame (S205). Then stroke generation is performed to generate the stroke image based on edge information (S206). Next stroke filtering is performed to remove false strokes based on edge information (S207). Text line region formation is further performed to connect individual strokes into a text line (S208). After that, text line verification is performed to remove false strokes in a text line and re-form the text line (S209). Finally, text line binarization is performed to produce the final binary image of the text line (S210). The final output is a serial of binary text line images that will be processed by an OCR engine for recognition.

Figure 3:
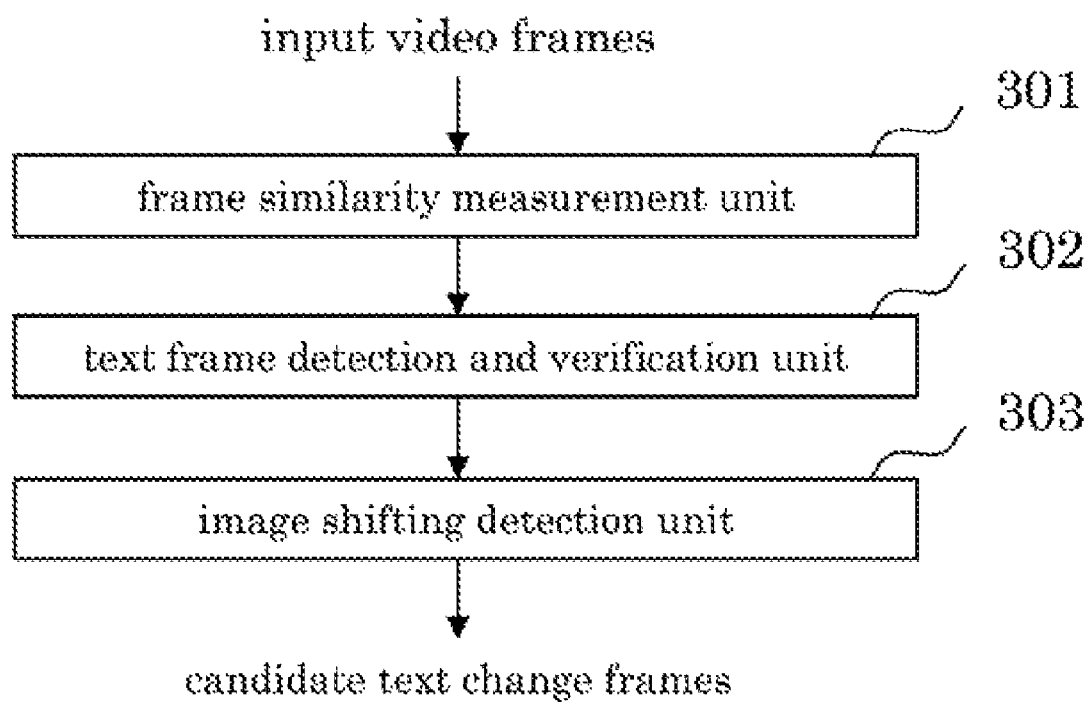
FIG. 3 shows the configuration of the text change frame detection apparatus according to the present invention.

FIG. 3 shows the configuration of the text change frame detection apparatus 104 shown in FIG. 1. The input video frames are first sent to a frame similarity measurement unit 301 for deleting duplicate frames, then a text frame detection and verification unit 302 is used to check whether a frame contains text information. Next, an image shifting detection unit 303 is used to remove redundant frames that caused by image shifting. The frame similarity measurement unit 301, the text frame detection and verification unit 302 and the image shifting detection unit 303 correspond to the first, second and third frame removing means, respectively. The text change frame detection apparatus 104 is very suitable to detect text change frame in e-Learning video. It can remove duplicate video frames, shifting video frames as well as video frames that do not contain text area in a very fast speed while keeping a high recall rate.

FIG. 4 shows the configuration of the frame similarity measurement unit 301 shown in FIG. 3. The frame similarity measurement unit 301 includes an image block validation unit 311, an image block similarity measurement unit 312, and a frame similarity judgment unit 313. The image block validation unit 311 determines whether two image blocks in the same position in two video frames are a valid block pair. A valid block pair is an image block pair that has the ability to show the change of the image content. The image block similarity measurement unit 312 calculates the similarity of two image blocks of the valid block pair and determines whether the two image blocks are similar. The frame similarity judgment unit 313 determines whether the two video frames are similar by using a ratio of the number of similar image blocks to the total number of valid block pairs. According to the frame similarity measurement unit 301, duplicate frames are efficiently detected and removed from the video frames.

Figure 5:
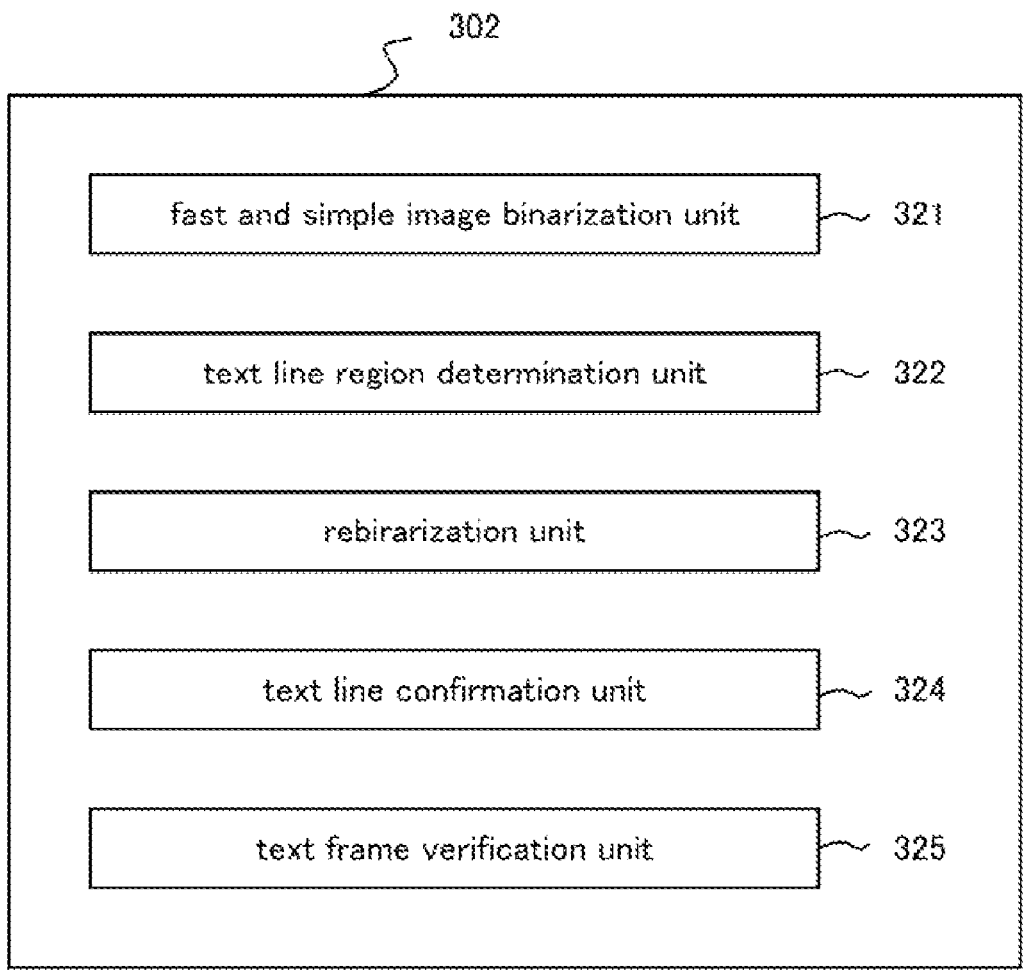
FIG. 5 shows the configuration of the text frame detection and verification unit.

FIG. 5 shows the configuration of the text frame detection and verification unit 302 shown in FIG. 3. The text frame detection and verification unit 302 includes a fast and simple image binarization unit 321, a text line region determination unit 322, a rebinarization unit 323, text line confirmation unit 324, and text frame verification unit 325. The fast and simple image binarization unit 321 generates the first binary image of a video frame. The text line region determination unit 322 determines the position of a text line region by using a horizontal projection and a vertical projection of the first binary image. The rebinarization unit 323 generates the second binary image of every text line region. The text line confirmation unit 324 determines the validity of a text line region by using the difference between the first binary image and the second binary image and a fill rate of the number of foreground pixels in the text line region to the total number of pixels in the text line region. The text frame verification unit 325 confirms whether a set of continuous video frames are non-text frames that do not contain a text area by using the number of valid text line regions in the set of continuous video frames. According to the text frame detection and verification unit 302, non-text frames are fast detected and removed from the video frames.

Figure 6:
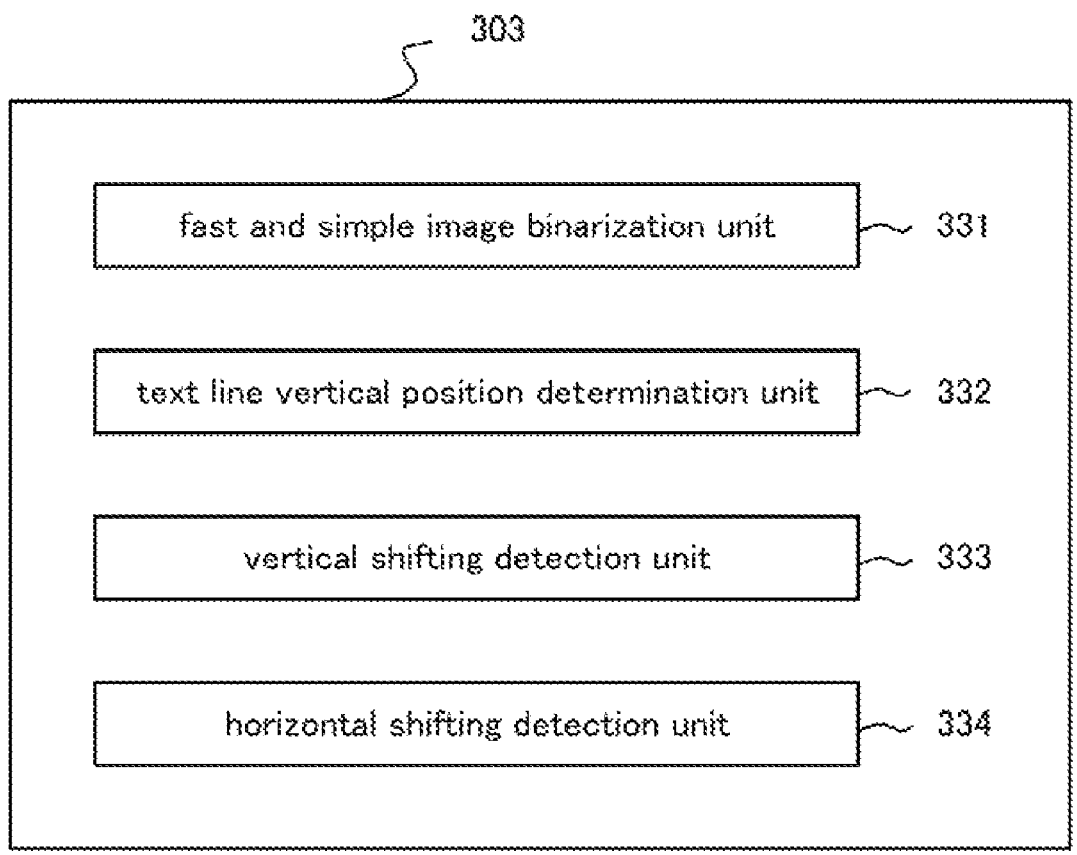
FIG. 6 shows the configuration of the image shifting detection unit.

FIG. 6 shows the configuration of the image shifting detection unit 303 shown in FIG. 3. The image shifting detection unit 303 includes a fast and simple image binarization unit 331, a text line vertical position determination unit 332, and a vertical shifting detection unit 333, a horizontal shifting detection unit 334. The fast and simple image binarization unit 331 generates binary images of two video frames. The text line vertical position determination unit 332 determines the vertical position of every text line region by using horizontal projections of the binary images. The vertical shifting detection unit 333 determines a vertical offset of image shifting between the two video frames and the similarity of the two video frames in the vertical direction by using the correlation between the horizontal projections. The horizontal shifting detection unit 334 determines a horizontal offset of the image shifting and the similarity of the two video frames in the horizontal direction by using the correlation between vertical projections of every text line in the binary images. According to the image shifting detection unit 303, redundant frames caused by image shifting are fast detected and removed from the video frames.

Figure 7:
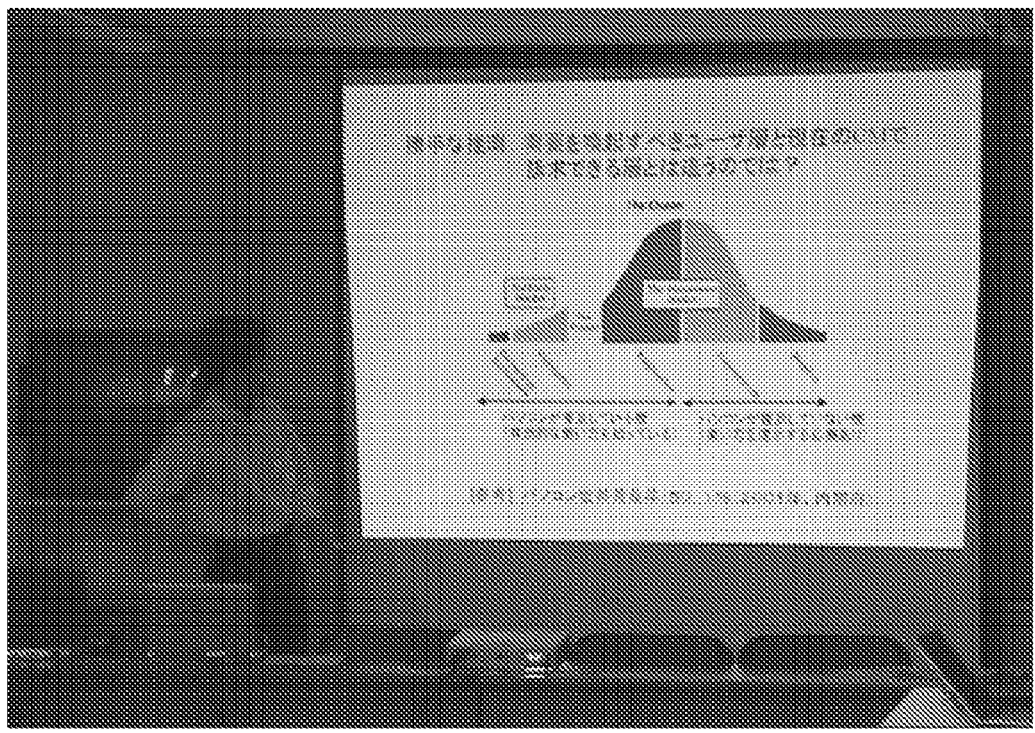
FIG. 7 shows the first frame that has a text content.
Figure 8:
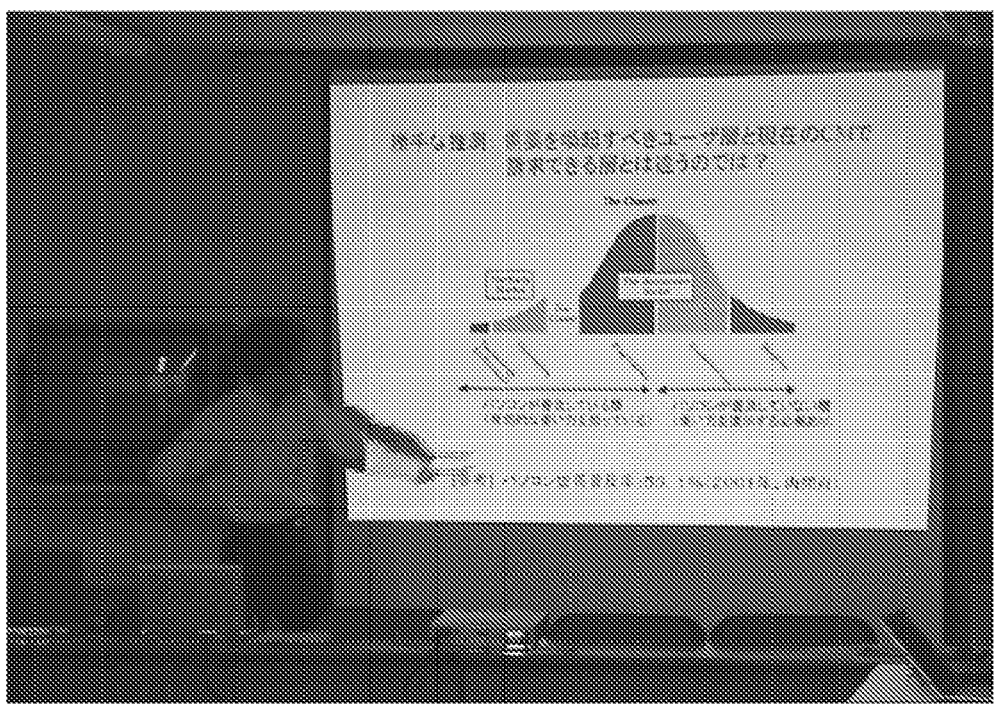
FIG. 8 shows the second frame that has a text content.
Figure 9:
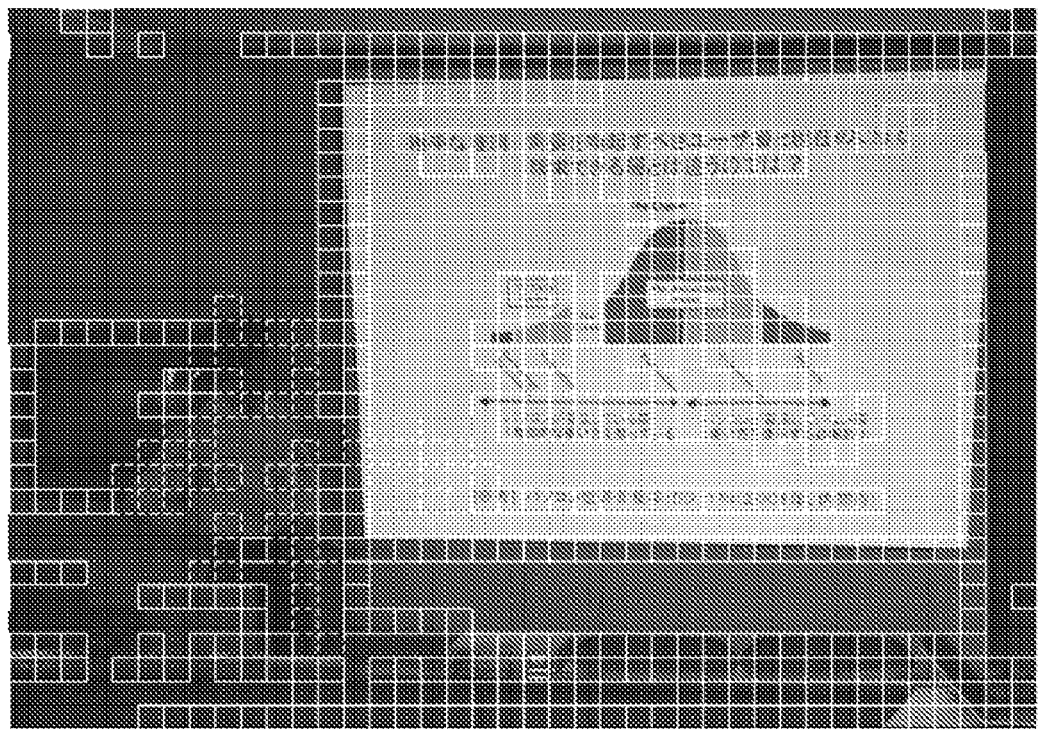
FIG. 9 shows the processing result of the frame similarity measurement unit.

FIGS. 7 and 8 show two frames that have same text content. FIG. 9 shows the processing result of the frame similarity measurement unit 301 for these two frames. The white boxes in the FIG. 9 mark out all valid image blocks which are blocks included by the valid block pairs and have the ability to show the change of the content. Boxes with solid line stand for similar image blocks and boxes with dashed line stand for dissimilar image blocks. Since the ratio of the number of similar image blocks to the number of valid blocks is larger than a predefined threshold, these two images are considered as similar and the second frame is removed.

FIG. 10 shows the flowchart of the operation of the frame similarity measurement unit 301 shown in FIG. 4. The comparison starts at 0 th frame of 0 th second (S501), the current i th frame is compared with the j th frame, which has a frame interval of STEP frames (S502). If the i th frame is similar with the j th frame in comparing the two frames (S503), then the current frame jumps to j th frame (S510) and the processes in S502 and S503 are repeated for comparison.

If the two frame are different, comparison restarts from one frame after the current frame, which is the k th frame (S504 and S505). It is checked whether k is less than j (S506). If the k th frame is before the j th frame, and if the i th frame is similar with the k th frame (S511), then the current frame is assigned as the k th frame (S512), and the processes in S502 and S503 are repeated for comparison.

If the i th frame is different with the k th frame, then k increases by 1 (S505), and it is checked whether k is less than j. If k is not less than j, that means the j th frame is different with the previous frames, the j th frame is marked as a new candidate text change frame (S507). A new search begins from the j th frame (S508). If the sum of the index i of the current search frame and STEP is larger than the total number of input video frames nFrame (S509), then the search is over and the found candidate text change frames are sent to the following units 302 and 303 for further processing. Otherwise, the search is continued.

The purpose of the frame interval STEP is to reduce the total time for the search operation. If STEP is too big and the content of video changes rapidly, the performance will decrease. If the STEP is too small, the total search time will also be not very short. This frame interval is chosen as STEP=4 frames, for example.

Figure 11:
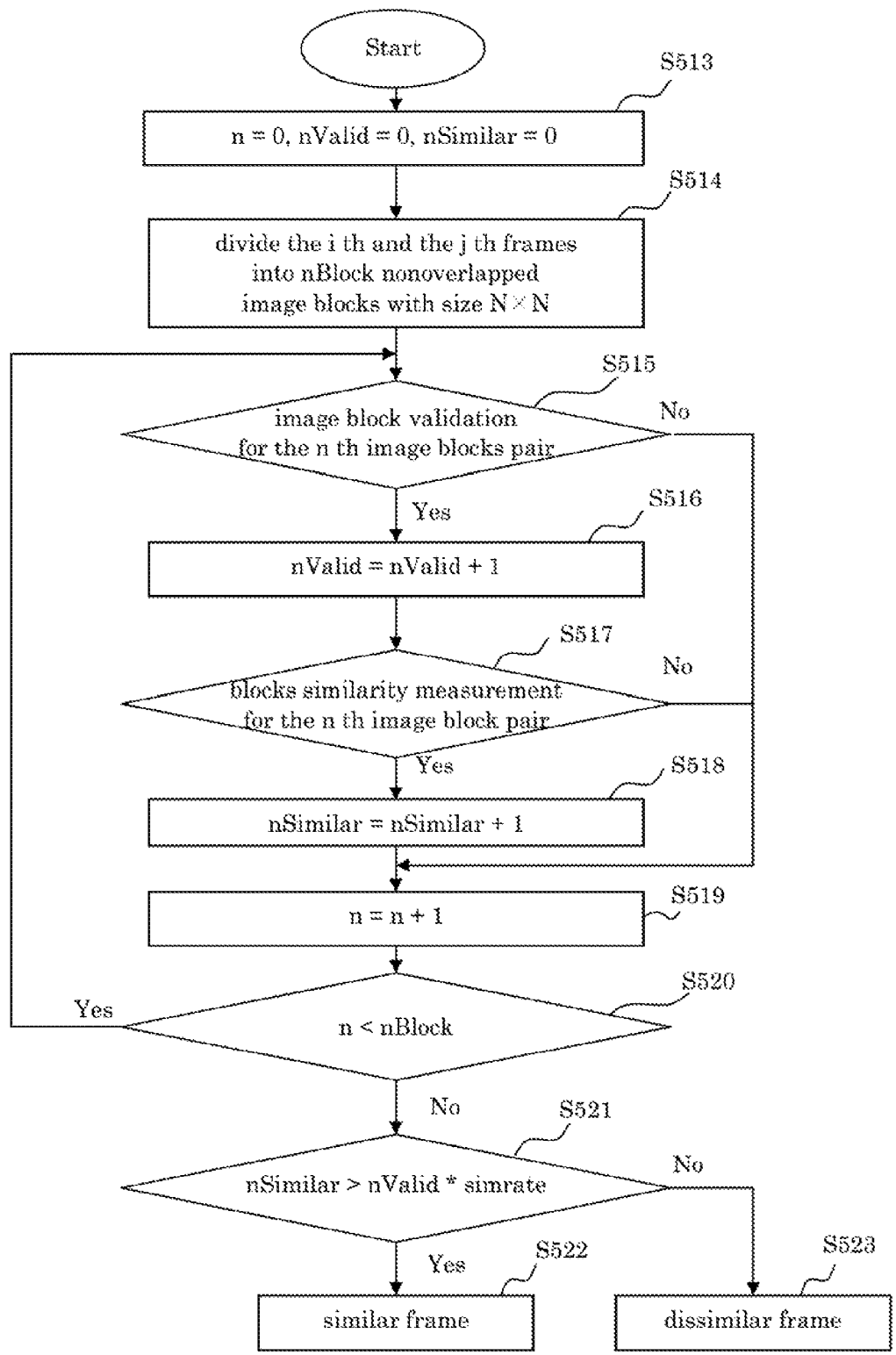
FIG. 11 shows the flowchart of determination of the similarity of two frames.

FIG. 11 shows the flowchart of the operation of the determination of the similarity of two frames in S503 shown in FIG. 10. The flowchart of the process in S511 is obtained by replacing j with k in FIG. 11.

At start, the image block count n, the valid block count nValid, and the similar block count nSimilar are all set to zero (S513). Then the i th frame and the j th frame are divided into non-overlapped small image blocks with size of N×N, and the number of the image blocks is recorded as nBlock (S514). Here N=16, for example. The two image blocks in the same position in the two frames are defined as an image block pair. For every image block pair, the image block validation unit 311 is used to check whether the image block pair is a valid block pair (S515). The detection of the change between two frames is achieved by detecting change in every image block pair. The background parts of a slide usually do not change, even if the content has been changed. So image block pairs in these parts should not considered as valid block pairs.

If the block pair is invalid, then the next block pair is checked (S519 and S520). If the block pair is a valid block pair, the valid block count nValid increases by 1 (S516), and the image block similarity measurement unit 312 is used to measure the similarity of the two image blocks (S517). If the blocks are similar, the similar block count nSimilar increases by 1 (S518). When all the block pairs are compared (S519 and S520), the frame similarity judgment unit 313 is used to determine whether the two frames are similar (S521). The two frames are considered as similar if the following condition is met (S522):

$$n\text{Similar} > n\text{Valid} * \text{simrate},$$

here simrate=0.85, for example. The two frames are considered as dissimilar if the above condition is not met (S523).

Figure 12:
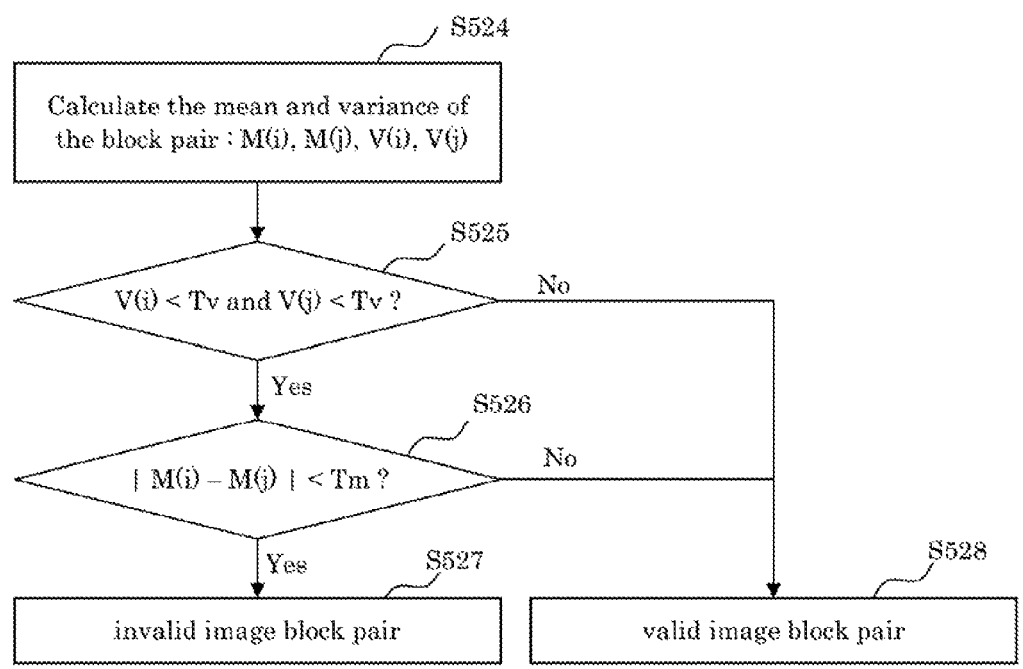
FIG. 12 shows the flowchart of the operation of the image block validation unit.

FIG. 12 shows the flowchart of the operation of the image block validation unit 311 in S515 shown in FIG. 11. First, the mean and the variance of the n th image block pair are calculated (S524). The means and the variances of the gray level of the image block in the i th frame are denoted by $M(i)$ and $V(i)$, respectively. The mean and the variance of the gray level of the image block in the j th frame are denoted by $M(j)$ and $V(j)$, respectively. If two variances $V(i)$ and $V(j)$ of the block pair are all smaller than a predefined threshold Tv (S525), and the absolute difference of the two means $M(i)$ and $M(j)$ is also smaller than a predefined threshold Tm (S526), then the image block pair is an invalid block pair (S527). Otherwise, the image block pair is a valid block pair (S528).

FIG. 13 shows the flowchart of the operation of the image block similarity measurement unit 312 in S517 shown in FIG. 11. The means $M(i)$ and $M(j)$ of the n th image block pair is calculated first (S529). If the absolute difference of the two means $M(i)$ and $M(j)$ is larger than a predefined threshold Tm1 (S530), then the two image blocks are considered as dissimilar image blocks (S534). Otherwise, the correlation of the two image blocks $C(i, j)$ is calculated (S531). If the correlation $C(i,j)$ is larger than a predefined threshold Tc (S532), the two image blocks are similar (S533), and if the correlation is smaller than the threshold Tc, the two image blocks are dissimilar (S534).

Figure 14:
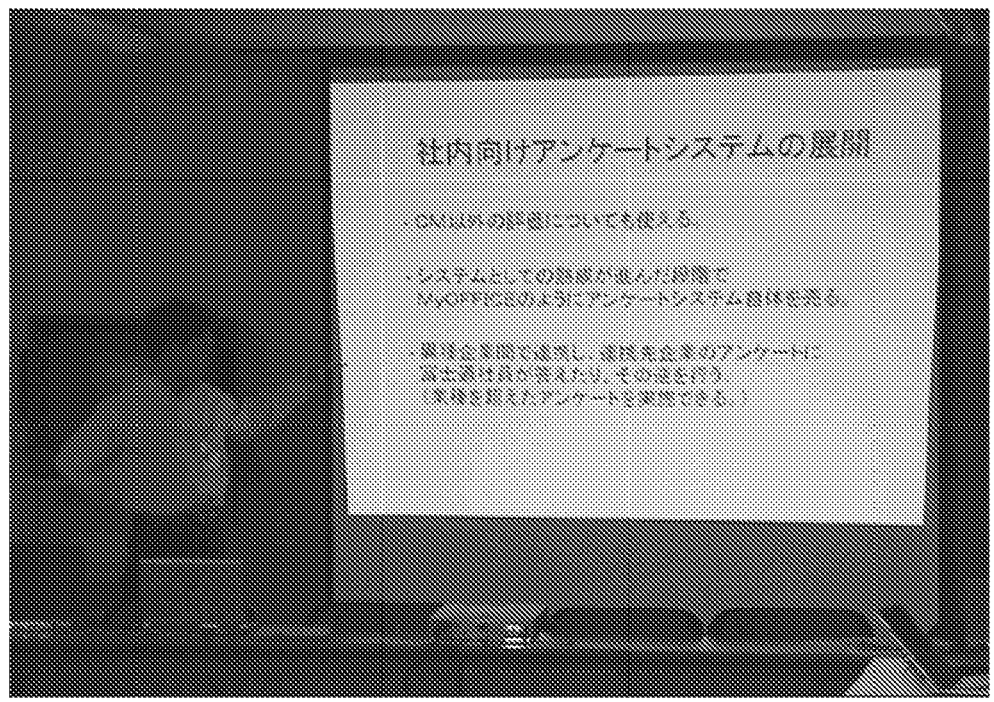
FIG. 14 shows the original video frame for text frame detection and verification.
Figure 15:
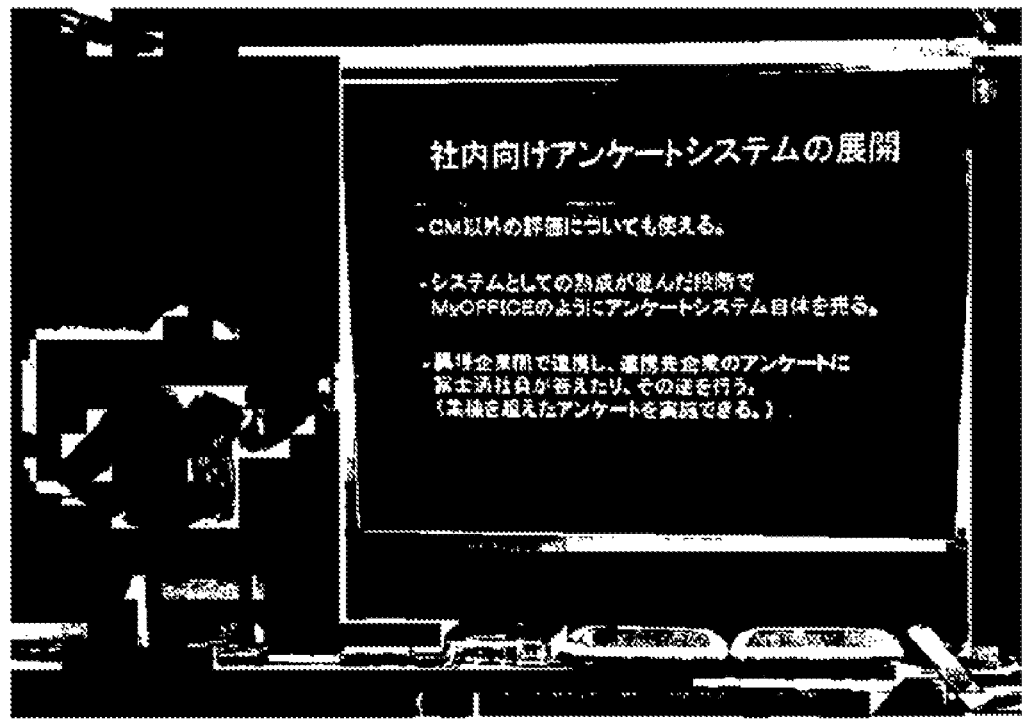
FIG. 15 shows the first binary image resulted from fast and simple image binarization.
Figure 16:
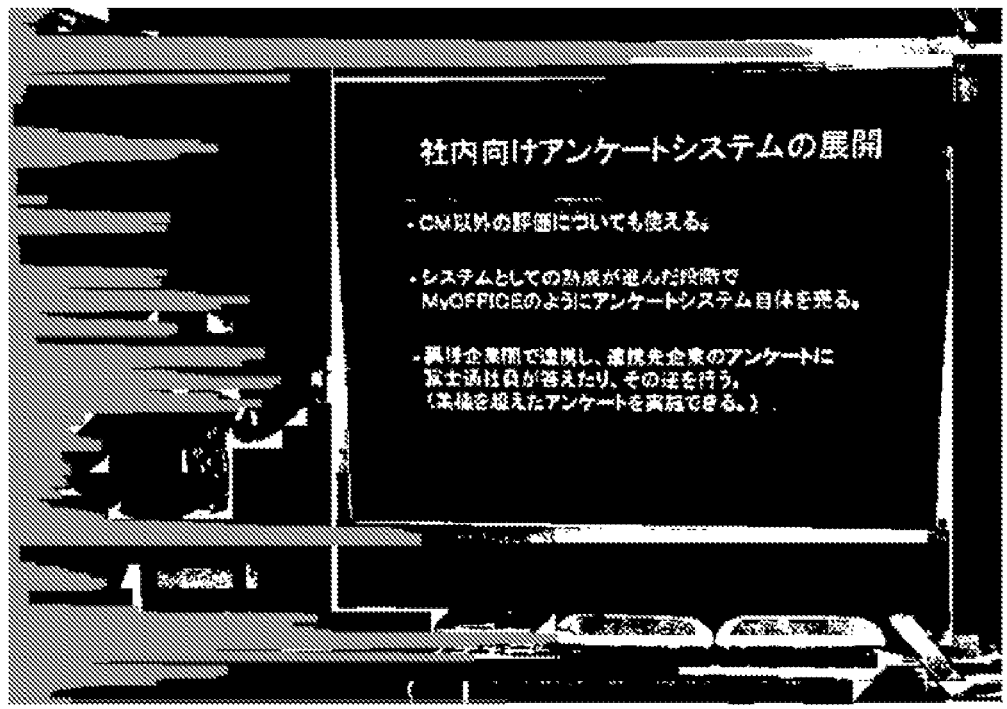
FIG. 16 shows the result of horizontal projection.
Figure 17:
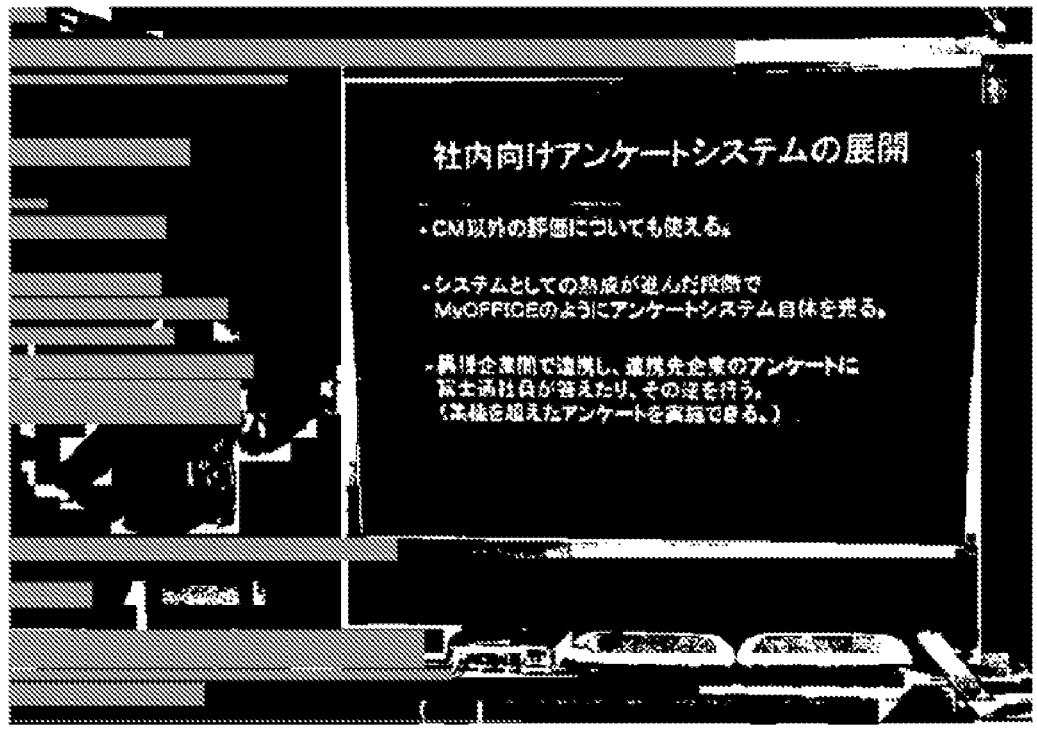
FIG. 17 shows the result of projection regularization.
Figure 18:
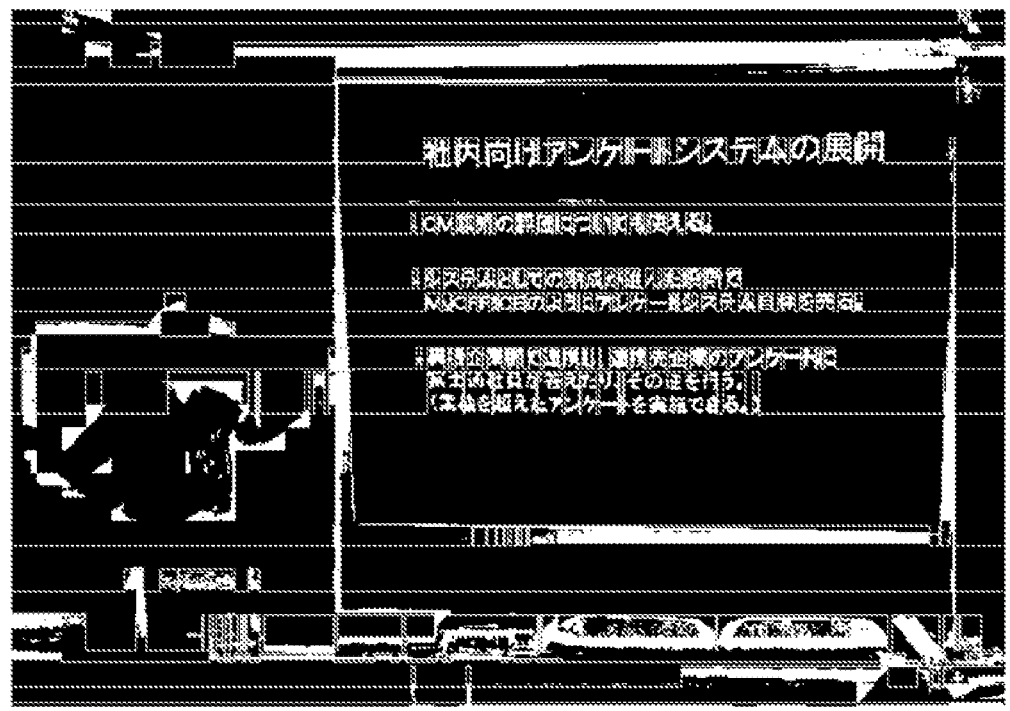
FIG. 18 shows the result of vertical binary projection in every candidate text line.
Figure 19:
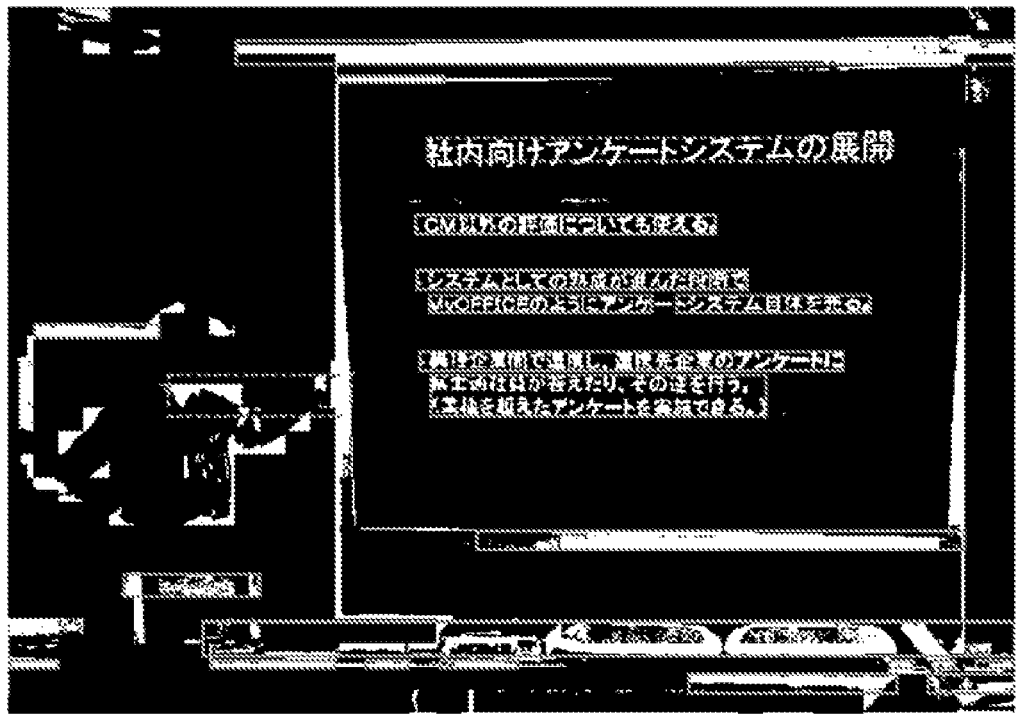
FIG. 19 shows the result of text line region determination.

FIGS. 14 to 21 show some example results of the processes performed by the text frame detection and verification unit 302 shown in FIG. 5. FIG. 14 shows the original video frame. FIG. 15 shows the first binary image resulted from fast and simple image binarization. FIG. 16 shows the result of horizontal binary projection. FIG. 17 shows the result of projection regularization. FIG. 18 shows the result of vertical binary projection in every candidate text line. FIG. 19 shows the result of text line region determination. Gray rectangles indicate candidate text line regions.

Figure 21:
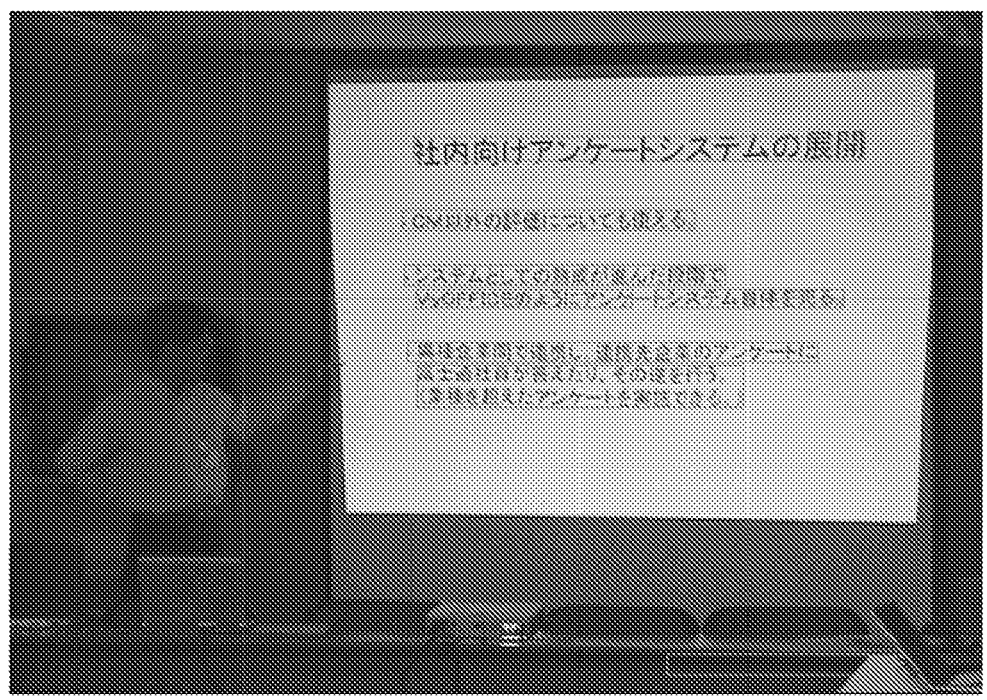
FIG. 21 shows detected text line regions.

FIG. 20 shows the result of two pairs of binary images for two candidate text line regions marked in dashed line in FIG. 19. The first pair binary images contain text information. The difference between these two images is very small. So this text line region is regarded as a true text line region. The second pair of binary images has very big difference. Since the different part is larger than a predefined threshold, this region is considered as non-text-line region. FIG. 21 shows the detected text line regions.

Figure 22:
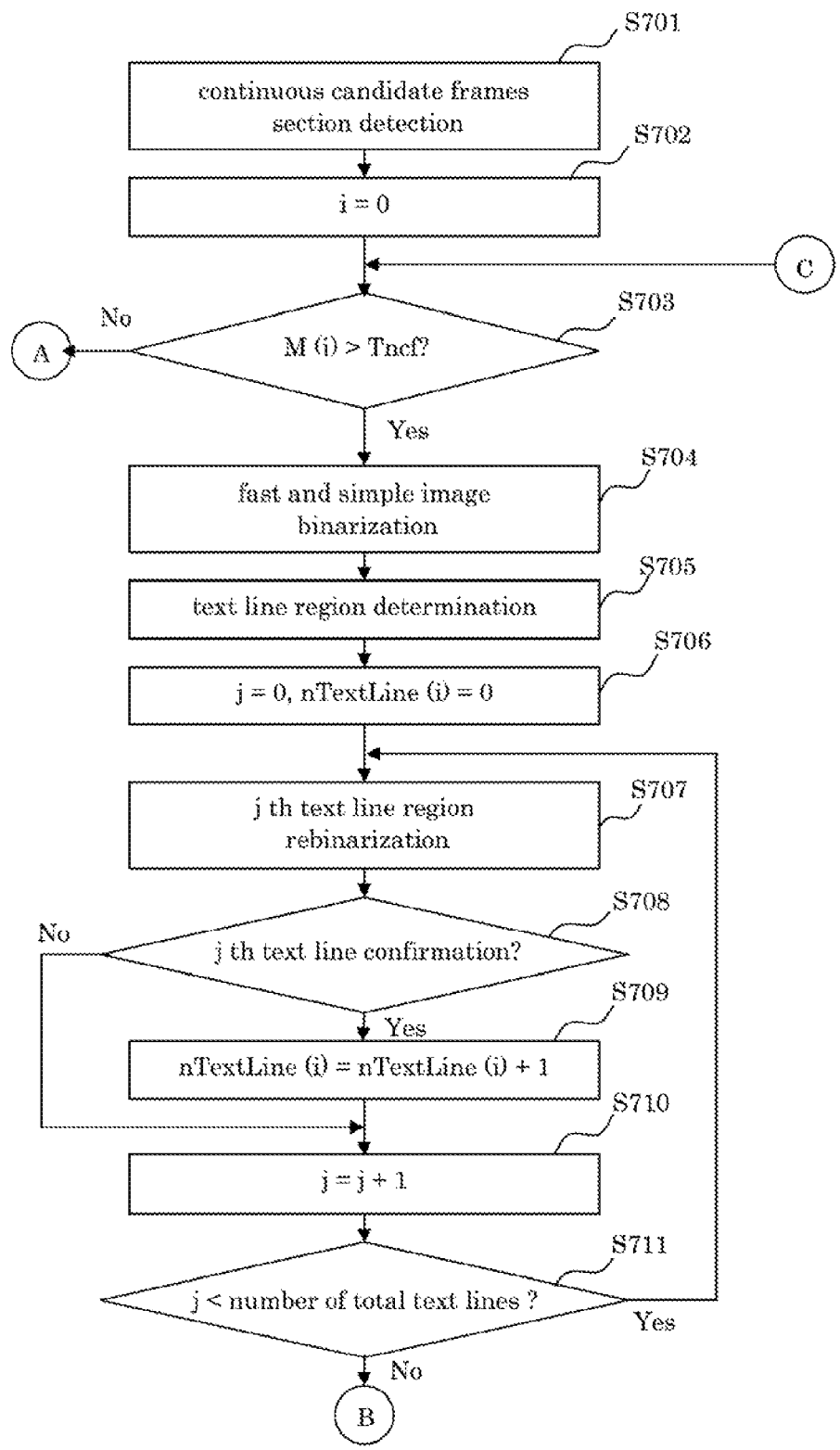
FIG. 22 shows the flowchart of the operation of the text frame detection and verification unit (No. 1)
Figure 23:
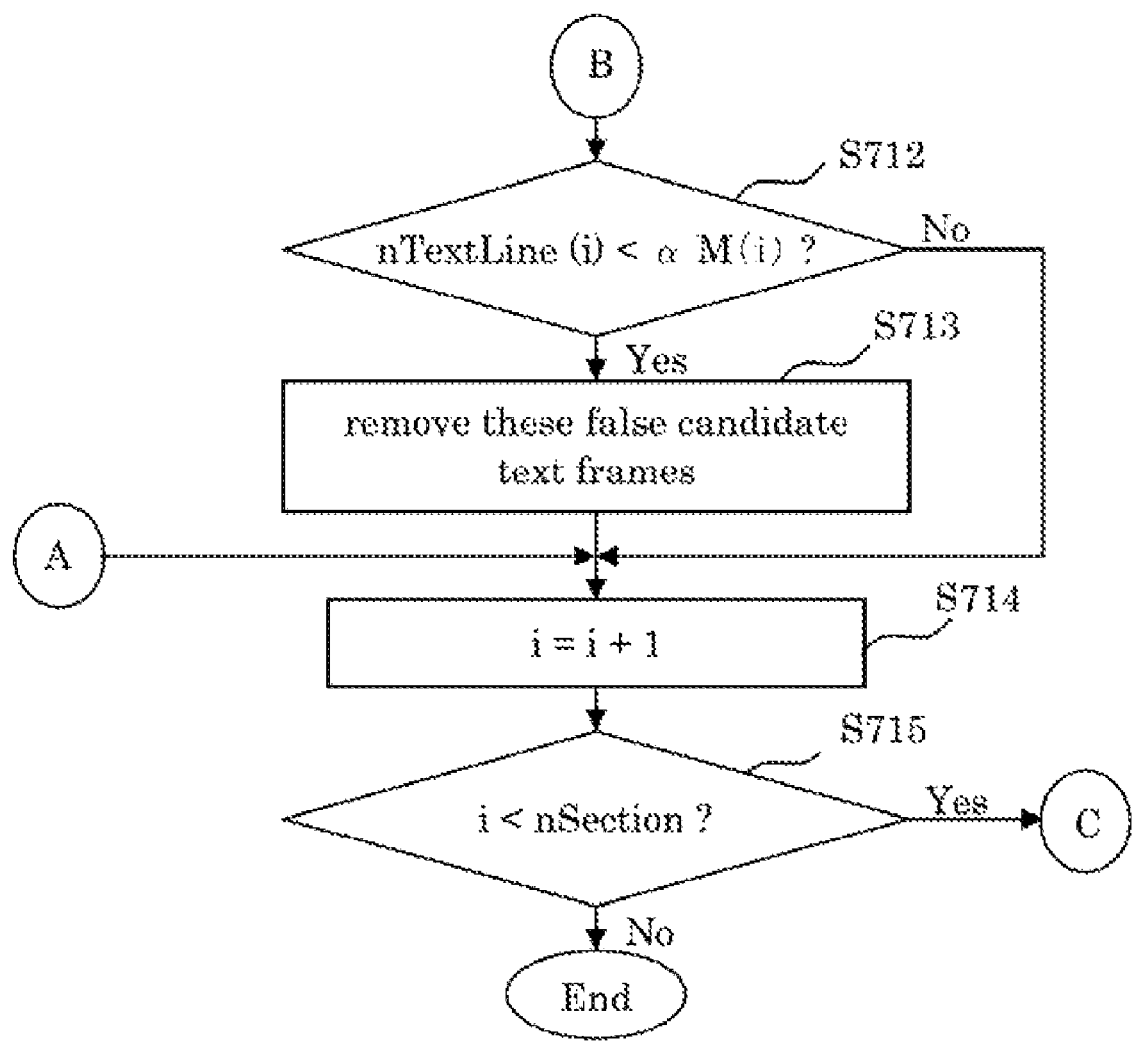
FIG. 23 shows the flowchart of the operation of the text frame detection and verification unit (No. 2)

FIGS. 22 and 23 show the flowchart of the operation of the text frame detection and verification unit 302 shown in FIG. 3. First, continuous candidate frames section detection is performed to classify the candidate text frames outputted by the frame similarity measurement unit 301 into a plurality of sections, each section contains a serial of continuous candidate frames (S701). The number of the sections is denoted by nSection. Started from the first section (S702), if the number of the continuous candidate frames $M(i)$ of the i th section is larger than a predefined threshold Tncf (S703), the fast and simple image binarization unit 321 is used to get the every binary image of all video frames (S704). Then the text line region determination unit 322 using the horizontal and vertical projection of the binary image is used to determine the regions of the text lines (S705).

Next started from the first detected text line region (S706), the rebinarization unit 323 is used to make a second binary image of the text line region (S707). The rebinarization unit 323 uses Niblack's image binarization method on the whole region of every detected text line to get the binary image. The two binary images of the same text line region are compared by the text line confirmation unit 324 (S708). If the two binary images are similar, then the similar text line count for the i th section nTextLine(i) increases by 1 (S709). This procedure repeat for all text lines in these $M(i)$ continuous candidate frames (S710 and S711).

Sometime a non-text frame will be detected as containing some text lines, but if a serial of candidate frames do not contain any text line, it is unlikely that the total number of the text lines detected in these frames will be very big. So the text frame verification unit 325 is used to confirm whether the serial of candidate text frames are non-text frames. The serial of the candidate text frames are considered as non-text frames if the following condition is met (S712):

$$n\text{TextLine}(i) \leq \alpha M(i),$$

and these false candidate text frames are removed (S713). Here, $\alpha$ is a positive real number that is determined by experiment. Usually it is set as $\alpha=0.8$. The procedure repeats for all continuous candidate frames sections (S714 and S715).

Figure 24:
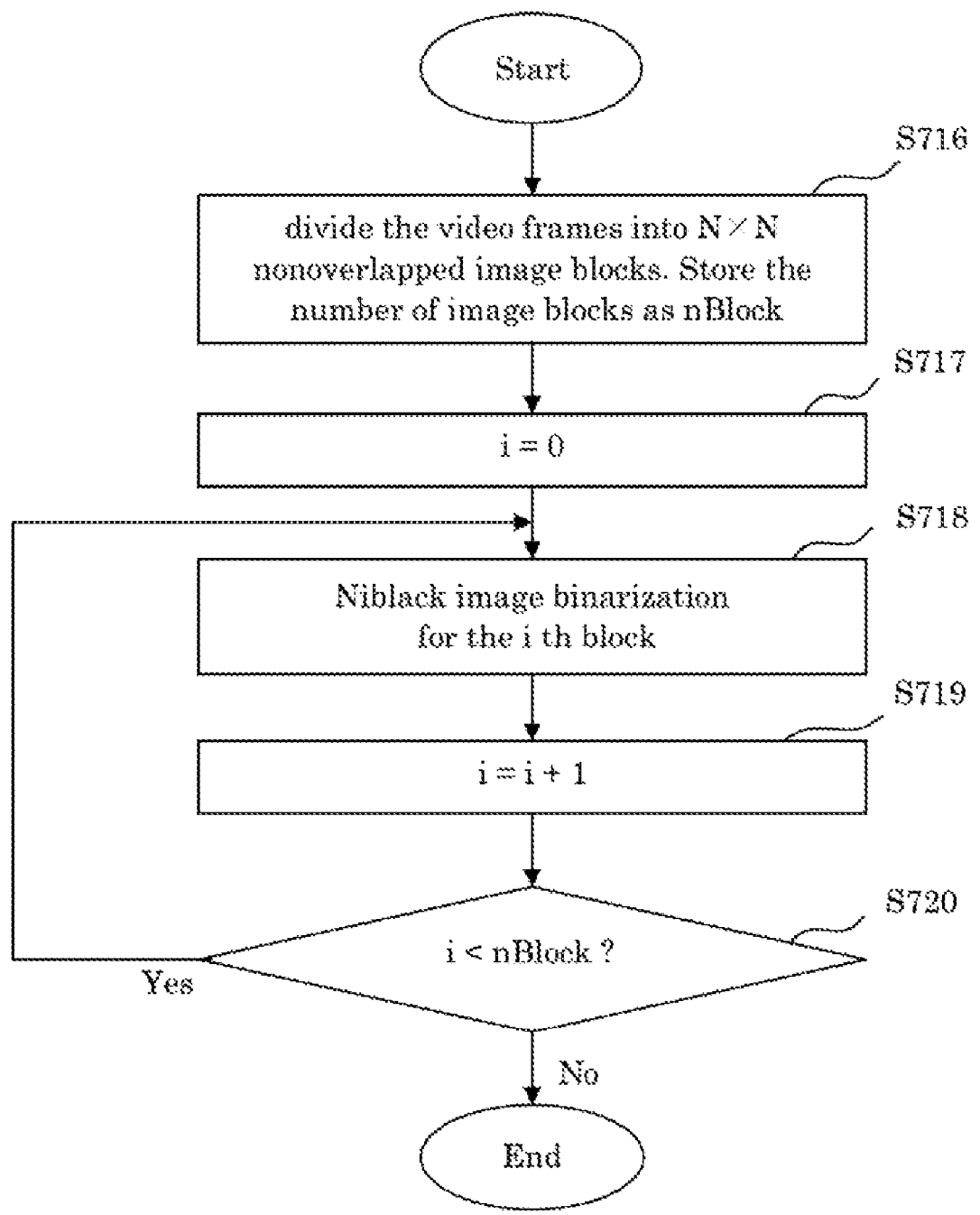
FIG. 24 shows the flowchart of the operation of the fast and simple image binarization unit.

FIG. 24 shows the flowchart of the operation of the fast and simple binarization unit 321 in S704 shown in FIG. 22. The frame image is first divided into non-overlapped image blocks with size of N×N, and the number of the image blocks is recorded as nBlock (S716). Here N=16, for example. Started from the first image block (S717), every image block is binarized using Niblack's image binariation method (S718). The parameter k for Niblack's image binarization is set as k=−0.4. The procedure repeats for all image blocks (S719 and S720).

FIG. 25 shows the flowchart of Niblack's image binarization method in S718 shown in FIG. 24. The input is a gray level image of size M×N. First, the mean Mean and the variance Var of the image is calculated (S721). If the variance Var is less than a predefined threshold Tv (S722), then all pixels in the binary image are set to 0. If Var>Tv, a binary threshold T is calculated by the following equation:

$$T = \text{Mean} + k * \text{Var}.$$

For every image pixel i, if the gray level gray(i) for of the pixel is larger than T (S726), the pixel in the binary image bin(i) is set to 0 (S727), otherwise, the pixel is set to 1 (S728). The procedure repeats for all pixels in the binary image (S729 and S730).

Figure 26:
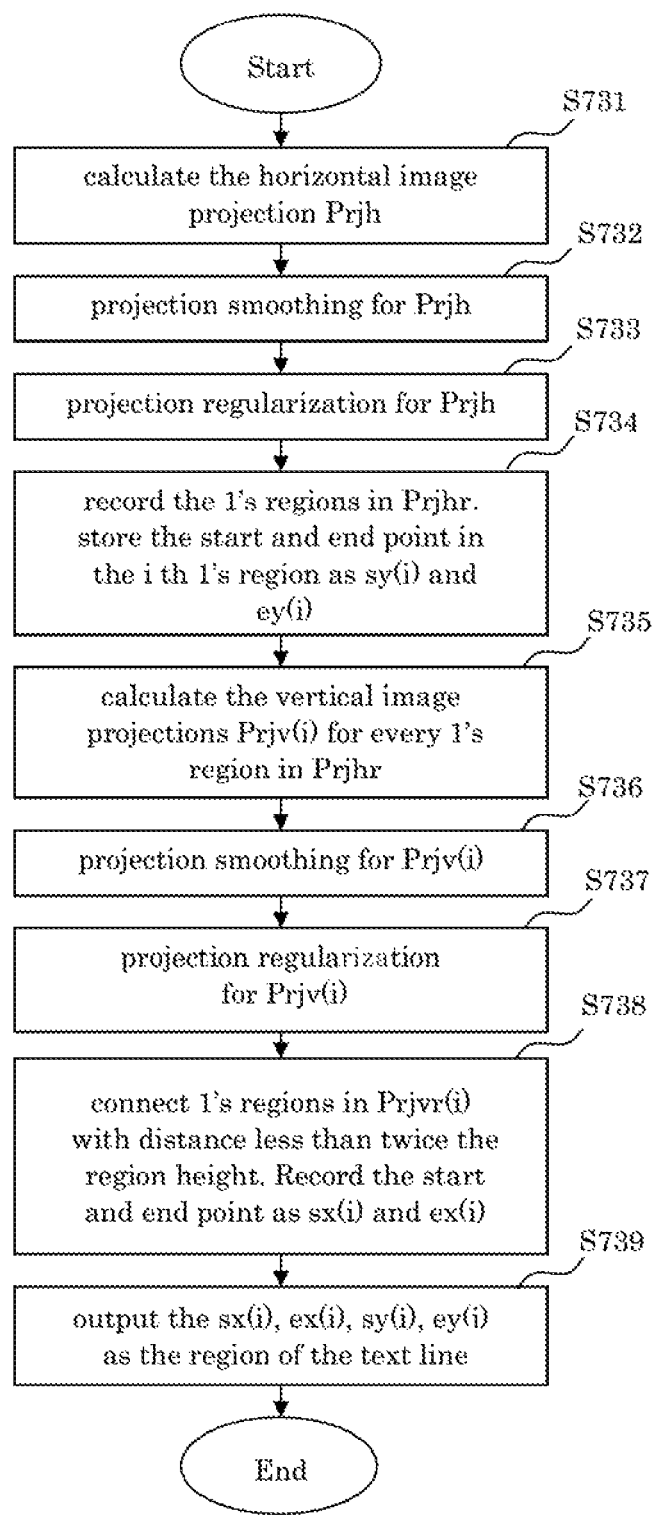
FIG. 26 shows the flowchart of the operation of the text line region determination unit.

FIG. 26 shows the flowchart of the operation of the text line region determination unit 322 in S705 shown in FIG. 22. The input of this unit is the binary image of the video frame from S704. The horizontal image projection Prjh is first calculated (S731). The projection is then smoothed (S732) and regularized (S733). The result of the regularization of Prjh is Prjhr, which has only two values: 0 or 1. 1 means that the position has a large projection value, 0 means that the position has a small projection value. The start and end points of each 1's region in the Prjhr are recorded as sy(i) and ey(i), respectively (S734). For each 1's region in Prjhr, the vertical image projection Prjv(i) is calculated (S735). Prjv(i) is smoothed (S736) and regularized as Prjvr(i) (S737). Two 1's regions in Prjvr(i) are connected into one region if the distance between the two 1's regions is less than 2*region height, and the start and end points of the connected region are recorded as sx(i) and ex(i), respectively (S738). The output sx(i), ex(i), sy(i) and ey(i) determine the i th region of the text line (S739).

Figure 27:
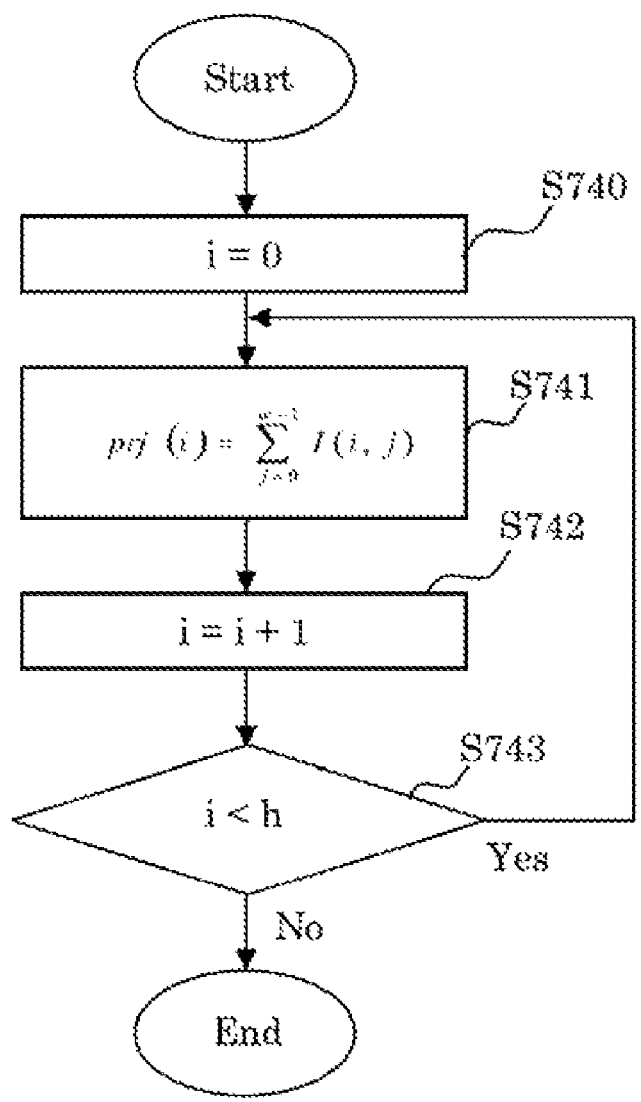
FIG. 27 shows the flowchart of horizontal image projection.

FIG. 27 shows the flowchart of horizontal image projection in S731 shown in FIG. 26. Started from the first horizontal line (S740), the projection for the i th horizontal line is calculated by the following equation (S741):

$$prj(i) = \sum_{j=0}^{w-1} I(i, j),$$

where I(i, j) is the pixel value in the i th row and j th column and w is the width of the image. The calculation repeats for all horizontal lines in the image with h as the height of the image (S742 and S743).

Figure 28:
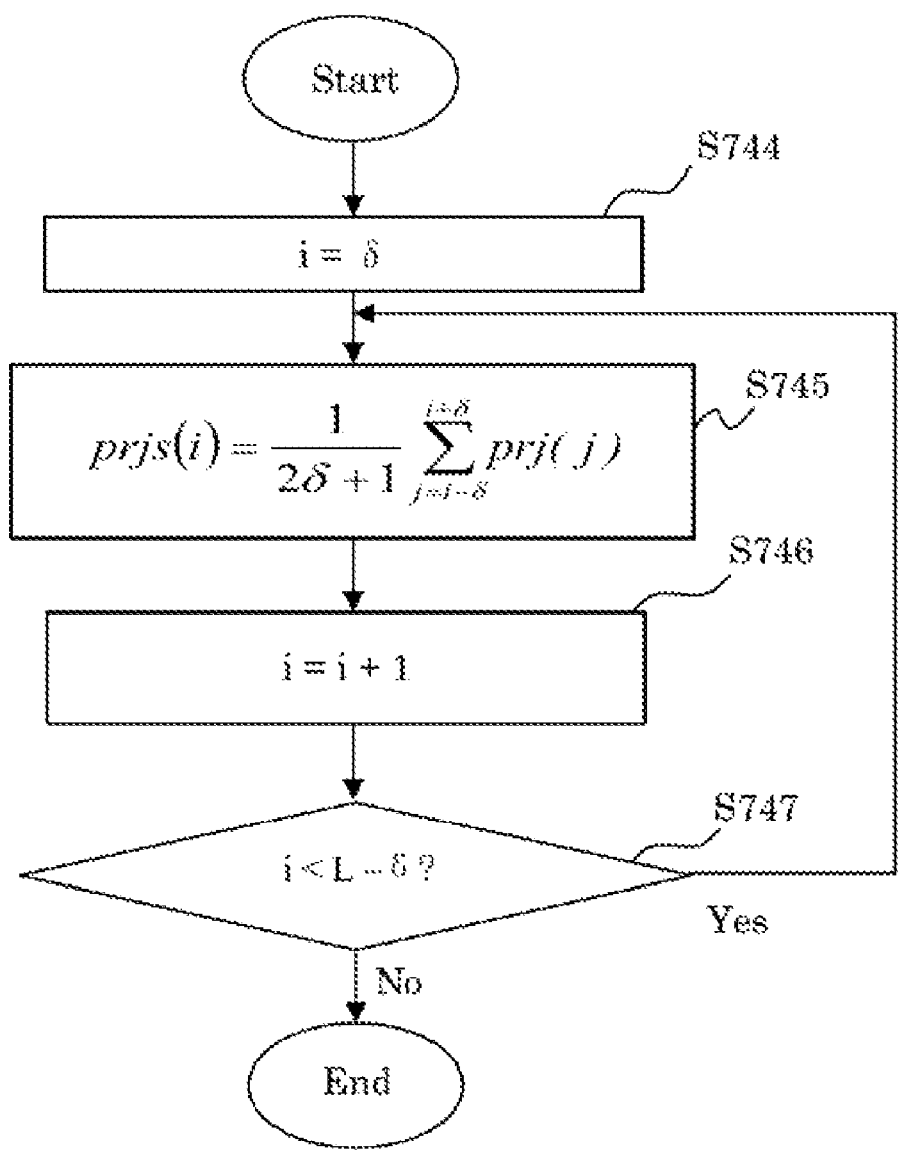
FIG. 28 shows the flowchart of projection smoothing.

FIG. 28 shows the flowchart of projection smoothing in S732 shown in FIG. 26. Started from the radii of the smoothing window, δ (S744), the value for the i th point in the smoothed projection prjs(i) is calculated by the following equation (S745):

$$prjs(i) = \frac{1}{2\delta + 1} \sum_{j=i-\delta}^{i+\delta} prj(j),$$

where the length of the smoothing window is 2*δ+1. The calculation repeats for all points in the smoothed projection with L as the range for smoothing (S746 and S747).

Figure 29:
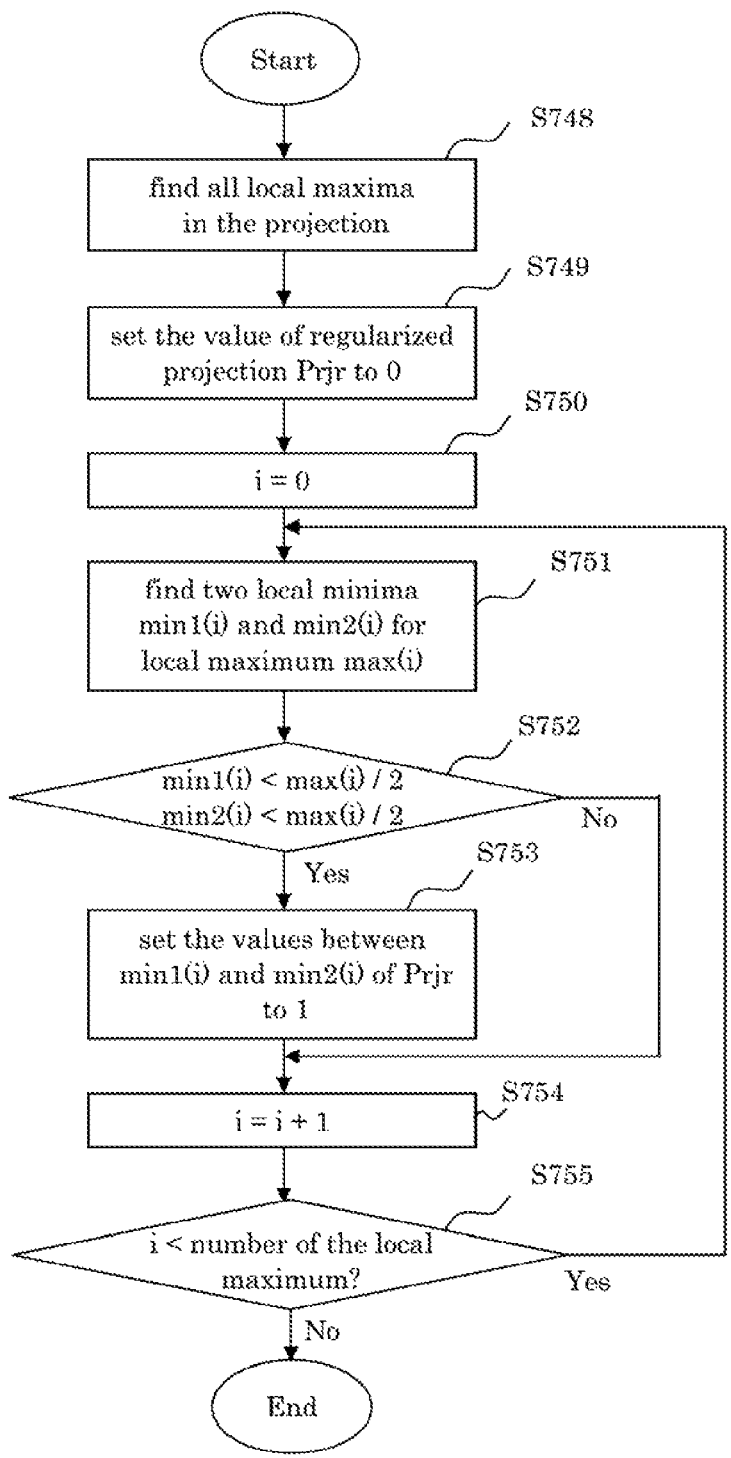
FIG. 29 shows the flowchart of projection regularization.

FIG. 29 shows the flowchart of projection regularization in S733 shown in FIG. 26. At first, all local maxima in the projection are detected (S748). The value for every pixel in the regularized projection Prjr is set to 0 (S749). Started from the first local maximum max(i) (S750), two nearby local minima min1(i) and min2(i) are detected (S751).

Figure 30:
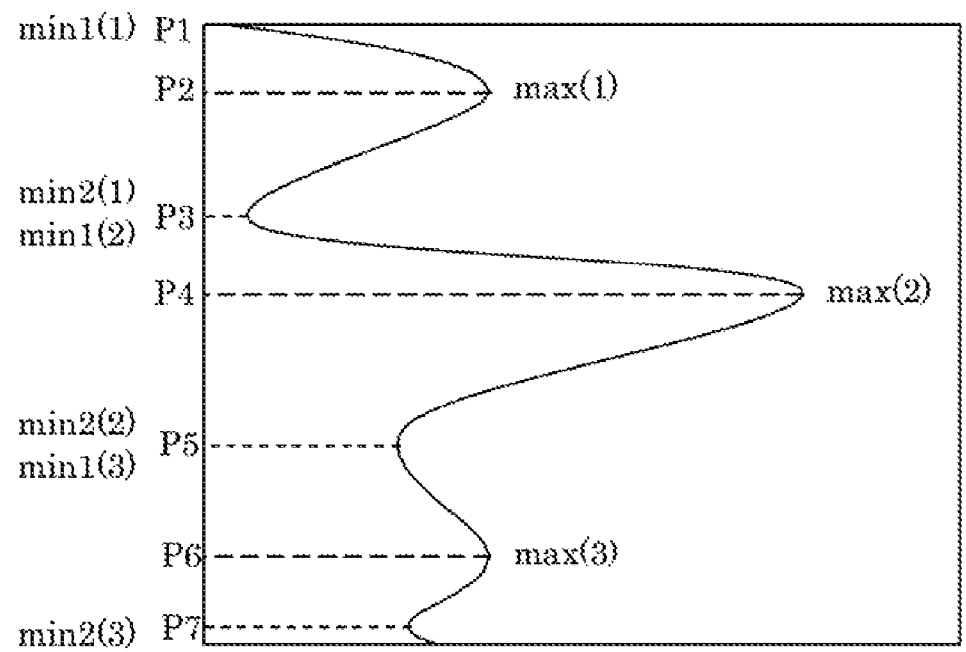
FIG. 30 shows examples of the max and min in a projection.

FIG. 30 shows an exemplary drawing of the max(i), min1(i) and min2(i) positions in a projection curve. There are three local maxima. P2, P4 and P6 are max(i), max(2) and max(3), respectively. P1 is the upper minimum min1(1) for max(1), P3 is the bottom minimum min2(1) for max(1). P3 is also the upper minimum min1(2) for max(2). Similarly, P5 is the bottom minimum min2(2) for max(2), and also is the upper minimum min1(3) for max(3). P7 is the bottom minimum min2(3) for max(3).

If min1(i)<max(i)/2 and min2(i)<max(i)/2 (S752), then the values in the regularized projection Prjr between the positions of min1(i) and min2(i) are set to 1 (S753). The procedure repeats for every local maximum (S754 and S755).

Figure 31:
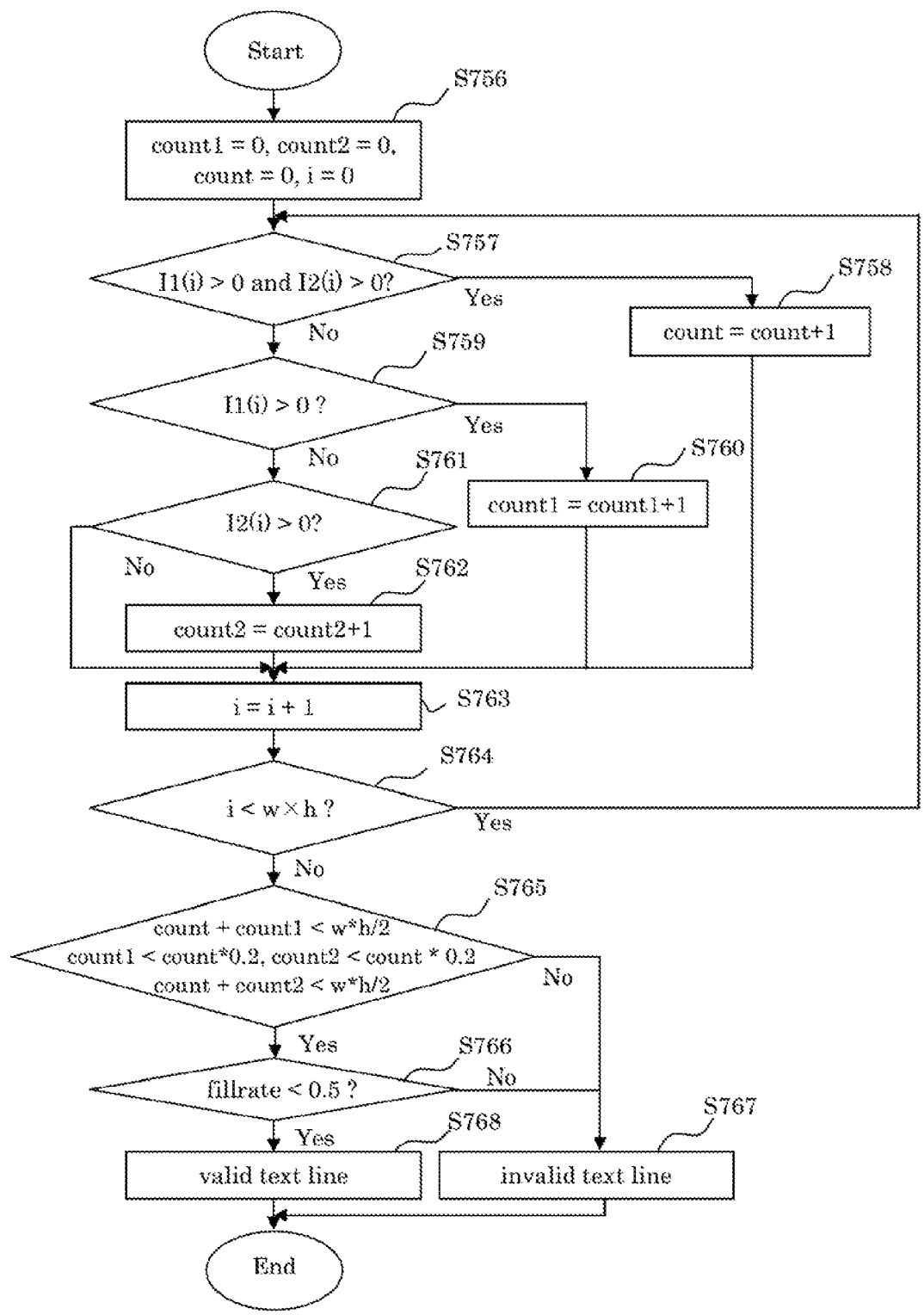
FIG. 31 shows the flowchart of the operation of the text line confirmation unit.

FIG. 31 shows the flowchart of the operation of the text line confirmation unit 324 in S708 shown in FIG. 22. The input of this unit is two binary images I1 and I2 with size w×h of the same text line region. First the counters count1, count2 and count are set to 0 (S756). count means the number of pixels where the value of two corresponding pixels in I1 and I2 are all 1. count1 means the number of pixels where the value of the corresponding pixel in I1 is 1 and that in I2 is 0. count2 means the number of pixels where the value of the corresponding pixel in I2 is 1 and that in I1 is 0.

Started from the first position in the two images, if corresponding two pixels I1(i) and I2(i) are both 1, then count increases by 1 (S757 and S758). Otherwise, if I1(i) is 1, then count1 increases by 1 (S759 and S760). Otherwise, if I2(i) is 1, then count2 increases by 1 (S761 and S762). After all pixels are checked (S763 and S764), it is checked whether the following conditions are met (S765 and S766):

count+count1<w*h/2, count+count2<w*h/2, count1<count*0.2, count2<count*0.2, fillrate<0.5.

The 'fillrate' of a text line region is defined as the rate of the number of foreground pixels to the number of total pixels in the region. If the above conditions are met, then two binary images are considered as similar in this text line region and the text line region is considered as a valid text line (S768). If one of these conditions is not met, the text line region is considered as an invalid text line (S767).

Figure 32:
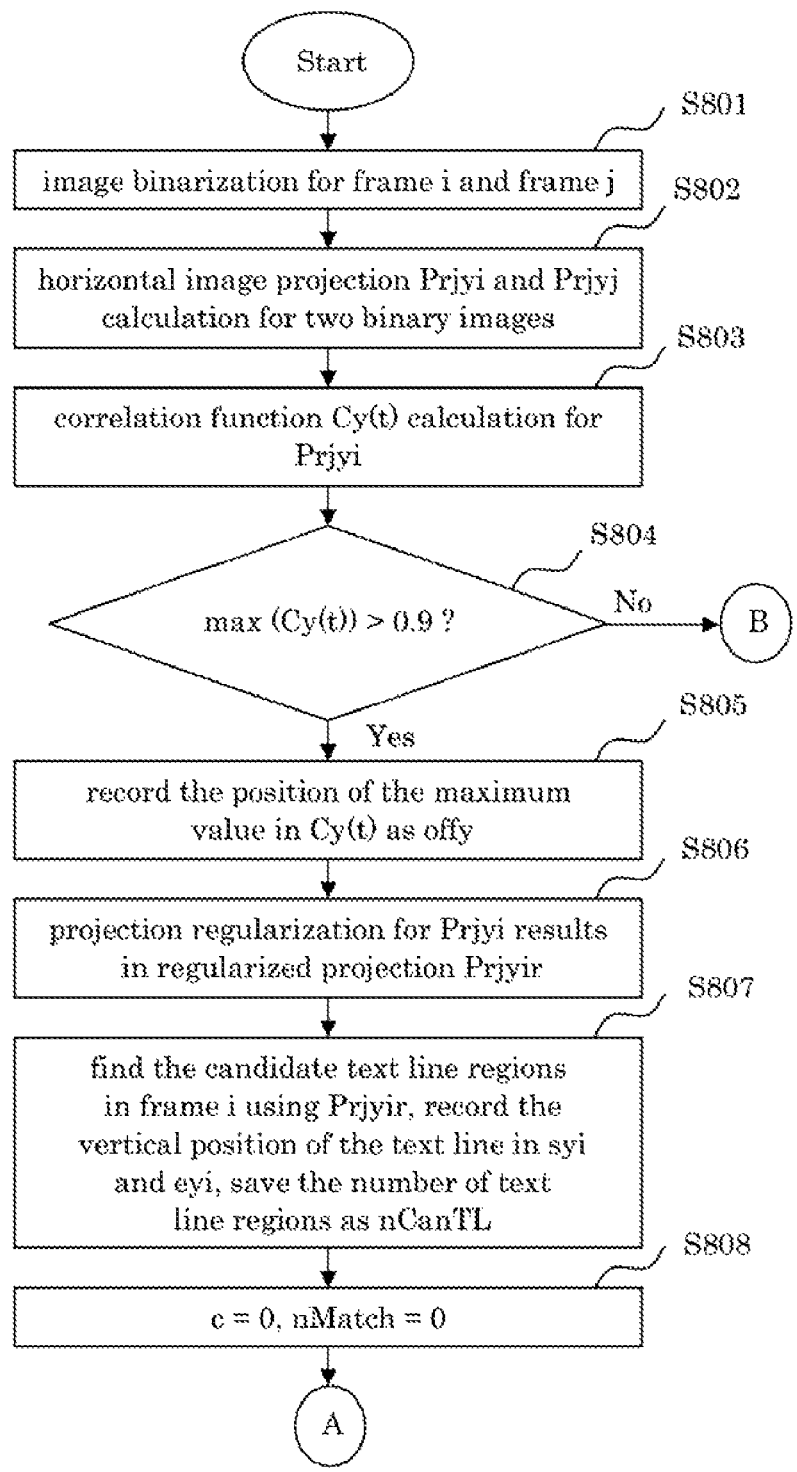
FIG. 32 shows the flowchart of the operation of the image shifting detection unit (No. 1)
Figure 33:
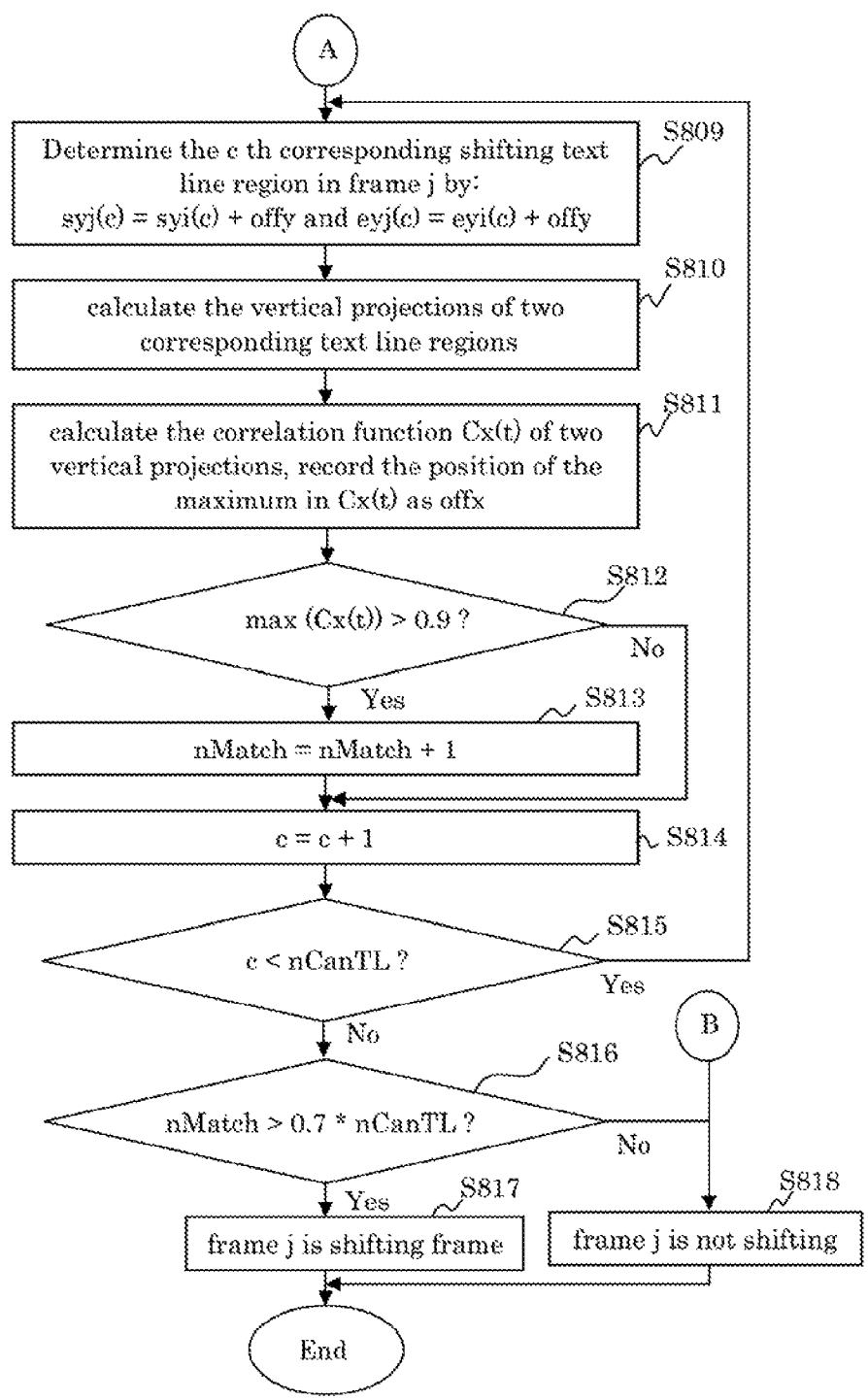
FIG. 33 shows the flowchart of the operation of the image shifting detection unit (No. 2)

FIGS. 32 and 33 show the flowchart of the operation of the image shifting detection unit 303 shown in FIG. 6. For two continuous frames, frame i and frame j, first the fast and simple image binarization unit 331 is used to get the binary image of the two frames (S801). Then the text line vertical position determination unit 332 is used to perform the horizontal image projection as in S731 shown in FIG. 26 for obtaining the horizontal projections Prjyi and Prjyj for frame i and frame j, respectively (S802). The vertical shifting detection unit 333 is then used to calculate the correlation function Cy(t) of the two projections (S803).

Here, a correlation function C(t) of two projections Prj1(x) and Prj2(x) is defined as:

$$C(t) = \frac{1}{L * V1 * V2} \sum (Prj1(x) - M1) * (Prj2(x+t) - M2)$$

Where L is the length of the projection, and M1 and M2 are the means of the projections Prj1 and Prj2, respectively. V1 and V2 are the variances of Prj1 and Prj2, respectively.

If the maximum of Cy(t) is less than 90% (S804), then the two images are not shifting images. Otherwise, the position of the maximum value of Cy(t) is recorded as the vertical offset offy (S805), and the projection regularization as in S733 is performed to get the regularized projection Prjyir of projection Prjyi (S806). If frame j is a shifting version of frame i, the vertical shifting offset of frame j is represented by offy. Every 1's region in Prjyir is considered as a candidate text line region, which is indicated by the start and end points syi and eyi (S807). The number of the candidate text line regions is recorded as nCanTL.

Started from the first candidate text line region, the matching count nMatch is set to 0 (S808). The c th corresponding shifting candidate text line region in frame j is assumed to be represented by syj(c)=syi(c)+offy and eyj(c)=eyi(c)+offy (S809). For two corresponding candidate text line regions, the vertical projections are calculated (S810). Then the horizontal shifting detection unit 334 is used to calculate the correlation function Cx(t) for the two vertical projections is calculated, and the position of the maximum value of Cx(t) is recorded as the horizontal offset offx, for these two projections (S811). If the maximum of Cx(t) is larger than 90% (S812), the two candidate text line regions are considered as matched shifting text line regions and the matching count nMatch increases by 1 (S813). After every candidate text line pair are checked (S814 and S815), if the number of the matched shifting text line regions is larger than 70% of the number of candidate text line regions (S816), frame j is regarded as a shifting version of frame i (S817). Otherwise, frame j is not a shifting frame of frame i (S818).

FIG. 34 shows the configuration of the text extraction apparatus 105 shown in FIG. 1. The text extraction apparatus comprises an edge image generation unit 901 for extracting the edge information of the video frame, a stroke image generation unit 902 using the edge image for generating the stroke image of the candidate character strokes, a stroke filtering unit 903 for removing false character strokes, a text line region formation unit 904 for connecting nearby strokes into a text line region, a text line verification unit 905 for delete false character stroke in the text line region, and a text line binarization unit 906 for obtaining the final binary image of the text line region. The output of the text extraction apparatus is a list of binary images for all text line regions in the frame. According to the text extraction apparatus 105, the text line region can be accurately binarized since the false strokes are detected and removed as much as possible.

Figure 35:
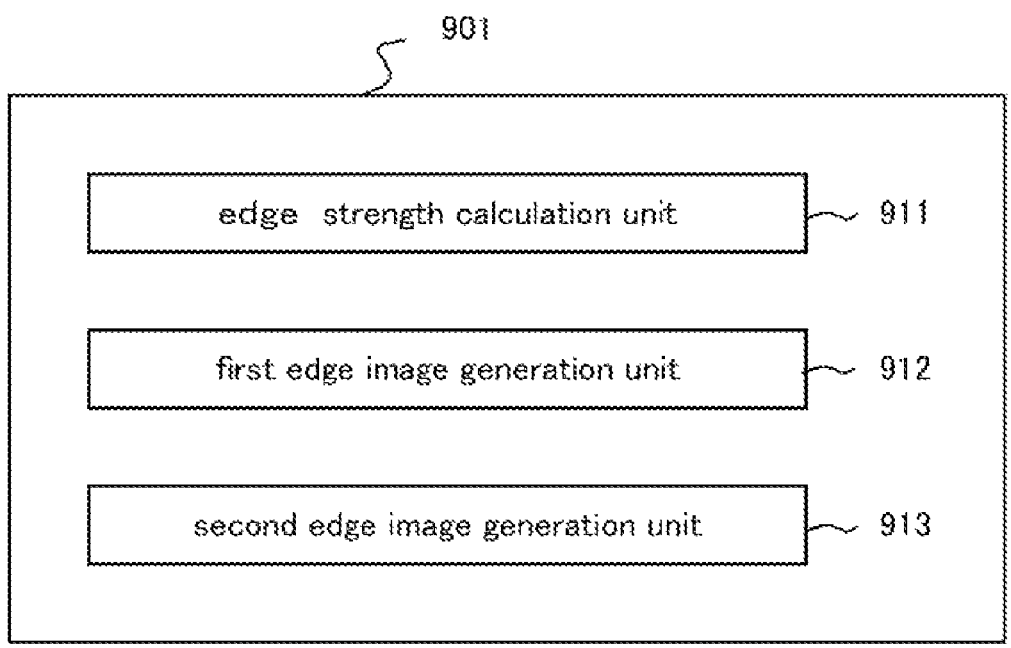
FIG. 35 shows the configuration of the edge image generation unit.

FIG. 35 shows the configuration of the edge image generation unit 901 shown in FIG. 34. The edge image generation unit 901 includes an edge strength calculation unit 911, a first edge image generation unit 912, and a second edge image generation unit 913. The edge strength calculation unit 911 calculates edge strength for every pixel in a video frame by using a Sobel edge detector. The first edge image generation unit 912 generates the first edge image by comparing the edge strength of every pixel with a predefined edge threshold and sets a value of a corresponding pixel in the first edge image to one binary value if the edge strength is greater than the threshold and the other binary value if the edge strength is less than the threshold. For example, logic "1" is used as the one binary value, which may indicate a white pixel, and logic "0" is used as the other binary value, which may indicate a black pixel. The second edge image generation unit 913 generates the second edge image by comparing the edge strength of every pixel in a window centered at the position of every pixel of the one binary value in the first edge image with mean edge strength of the pixels in the window, and sets a value of a corresponding pixel in the second edge image to the one binary value if the edge strength of the pixel is greater than the mean edge strength and the other binary value if the edge strength of the pixel is less than the mean edge strength. A small window of size of 3×3, for example, is used for the second edge image generation.

Figure 36:
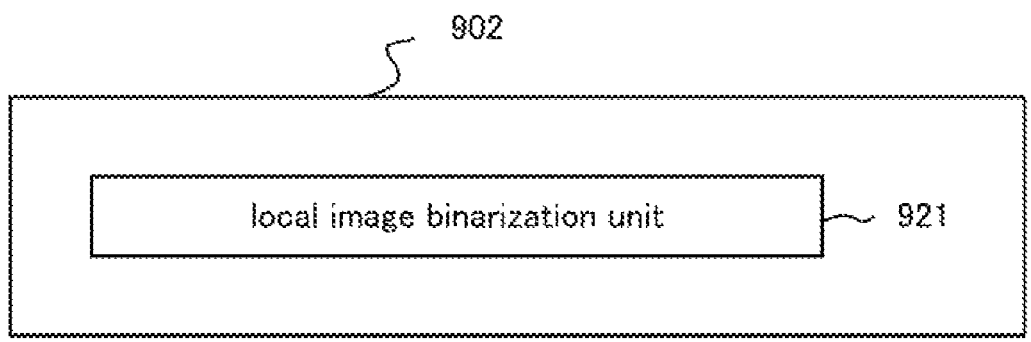
FIG. 36 shows the configuration of the stroke image generation unit.

FIG. 36 shows the configuration of the stroke image generation unit 902 shown in FIG. 34. The stroke image generation unit 902 includes a local image binarization unit 921. The local image binarization unit 921 binarizes a gray scale image of the video frame in the Niblack's binarization method to obtain a binary image of candidate character strokes by using a window centered at the position of every pixel of the one binary value in the second edge image. A window of size of 11×11, for example, is used for the local image binarization.

FIG. 37 shows the configuration of the stroke filtering unit 903 shown in FIG. 34. The stroke filtering unit 903 includes a stroke edge coverage validation unit 931 and a long straight line detection unit 932. The stroke edge coverage validation unit 931 checks an overlap rate of a contour of a stroke in the binary image of the candidate character strokes by pixels of the one binary value in the second edge image, determines that the stroke is a valid stroke if the overlap rate is greater than a predefined threshold and an invalid stroke if the overlap rate is less than the predefined threshold, and removes the invalid stroke as a false stroke. The long straight line detection unit 932 removes a very large stroke as a false stroke by using a width and a height of the stroke. According to the stroke filtering unit 903, false strokes unnecessary for a text line region are detected and removed from the binary image of the candidate character strokes.

Figure 38:
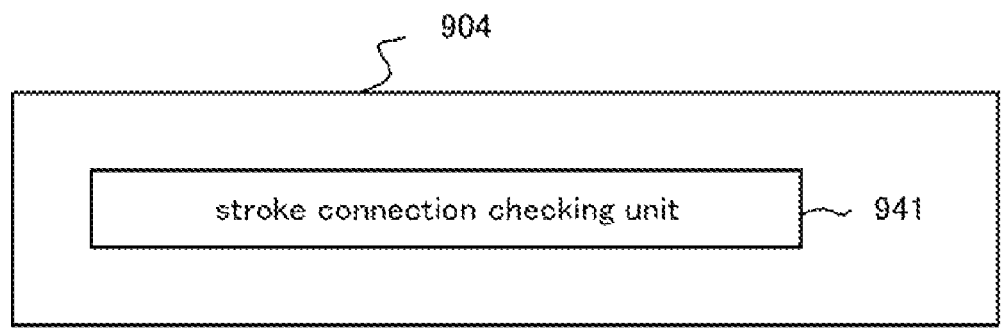
FIG. 38 shows the configuration of the text line region formation unit.

FIG. 38 shows the configuration of the text line region formation unit 904 shown in FIG. 34. The text line region formation unit 904 includes a stroke connection checking unit 941. The stroke connection checking unit 941 checks whether two adjacent strokes are connectable by using an overlap ratio of heights of the two strokes and a distance between the two strokes. The text line region formation unit 904 combines strokes into a text line region by using the result of the checking.

Figure 39:
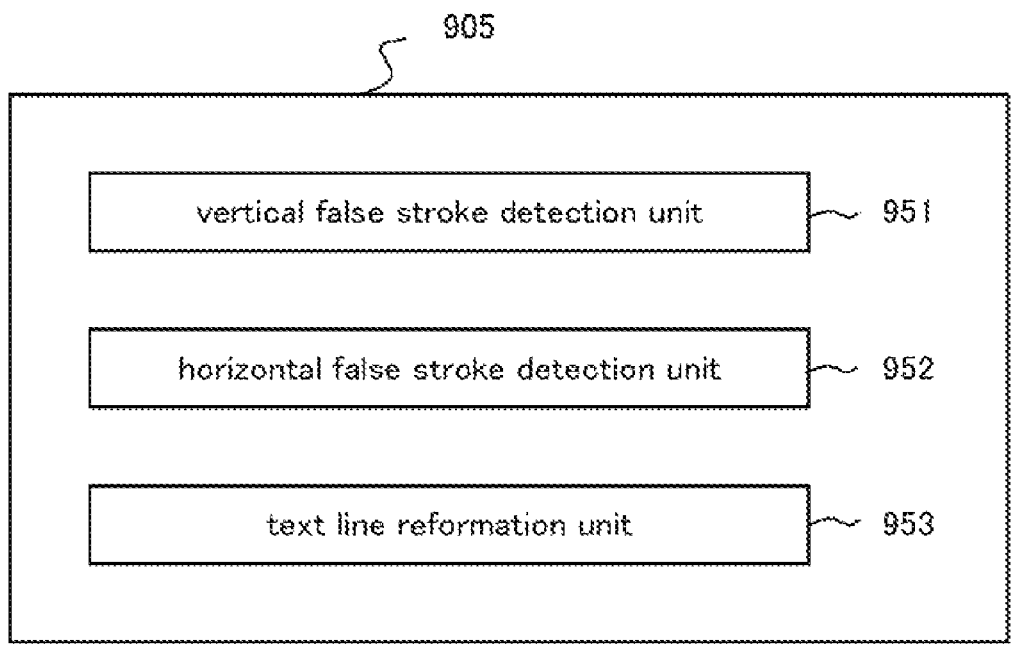
FIG. 39 shows the configuration of the text line verification unit.

FIG. 39 shows the configuration of the text line verification unit 905 shown in FIG. 34. The text line verification unit 905 includes a vertical false stroke detection unit 951, a horizontal false stroke detection unit 952, and a text line reformation unit 953. The vertical false stroke detection unit 951 checks every stroke with a height higher than the mean height of strokes in the text line region, and marks the stroke as a false stroke if the stroke connects two horizontal text line regions into one big text line region. The horizontal false stroke detection unit 952 checks every stroke with a width larger than a threshold determined by the mean width of the strokes in the text line region, and marks the stroke as a false stroke if the number of strokes in a region that contains the stroke is less than a predefined threshold. The text line reformation unit 953 reconnects strokes except for a false stroke in the text line region if the false stroke is detected in the text line region. According to the text line verification unit 905, false strokes are further detected and removed from the text line region.

FIG. 40 shows the configuration of the text line binarization unit 906 shown in FIG. 34. The text line binarization unit 906 includes an automatic size calculation unit 961 and a block image binarization unit 962. The automatic size calculation unit 961 determines a size of a window for binarization. The block image binarization unit 962 binarizes a gray scale image of the video frame in the Niblack's binarization method to obtain a binary image of a text line region by using the window centered at the position of every pixel of the one binary value in the second edge image. According to such text line binarization after removing the false strokes, the text line region can be accurately binarized.

Figure 41:
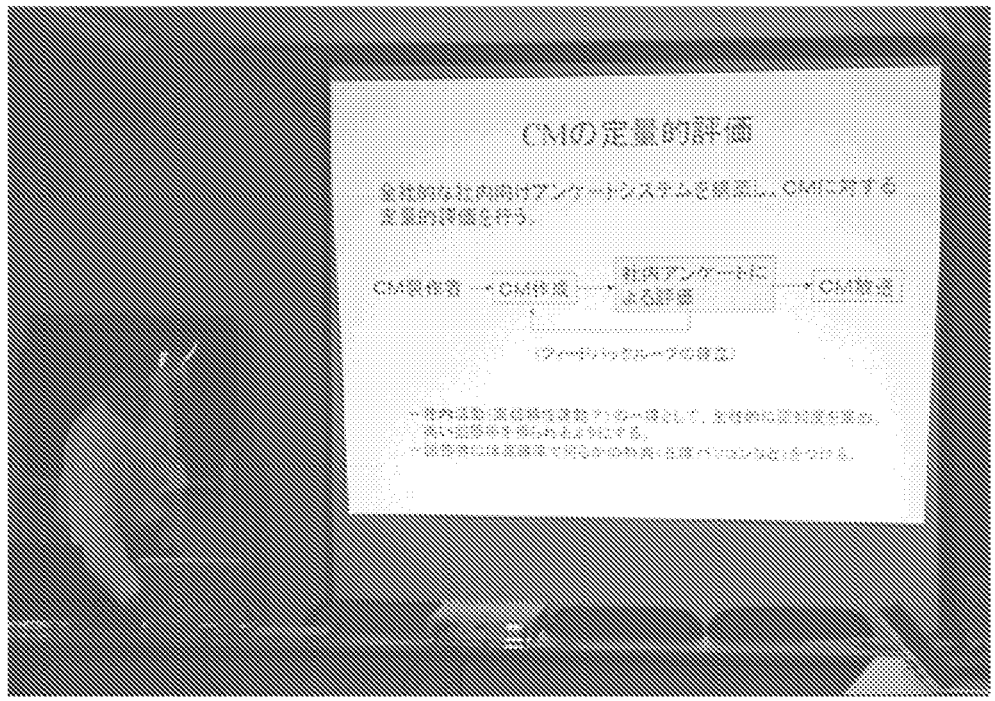
FIG. 41 shows the original video frame for text extraction.
Figure 43:
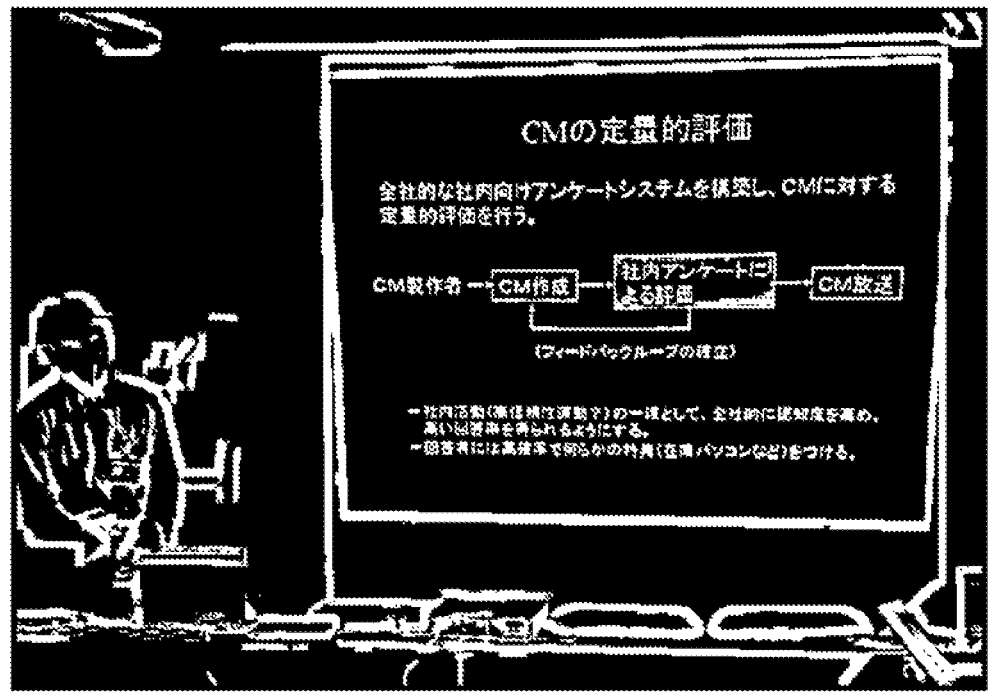
FIG. 43 shows the result of stroke generation.
Figure 44:
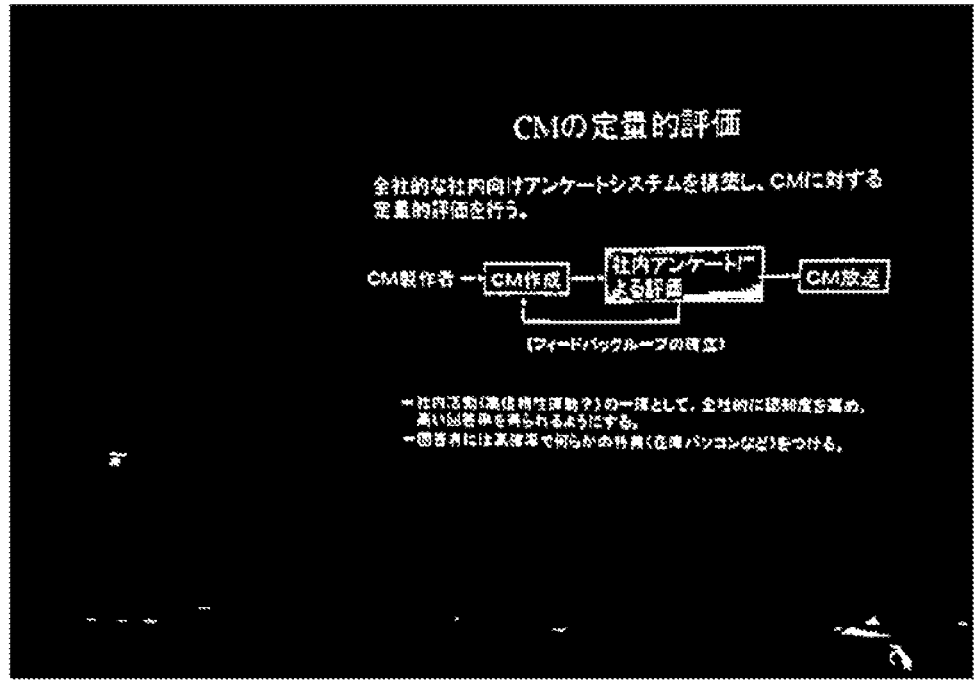
FIG. 44 shows the result of stroke filtering.
Figure 45:
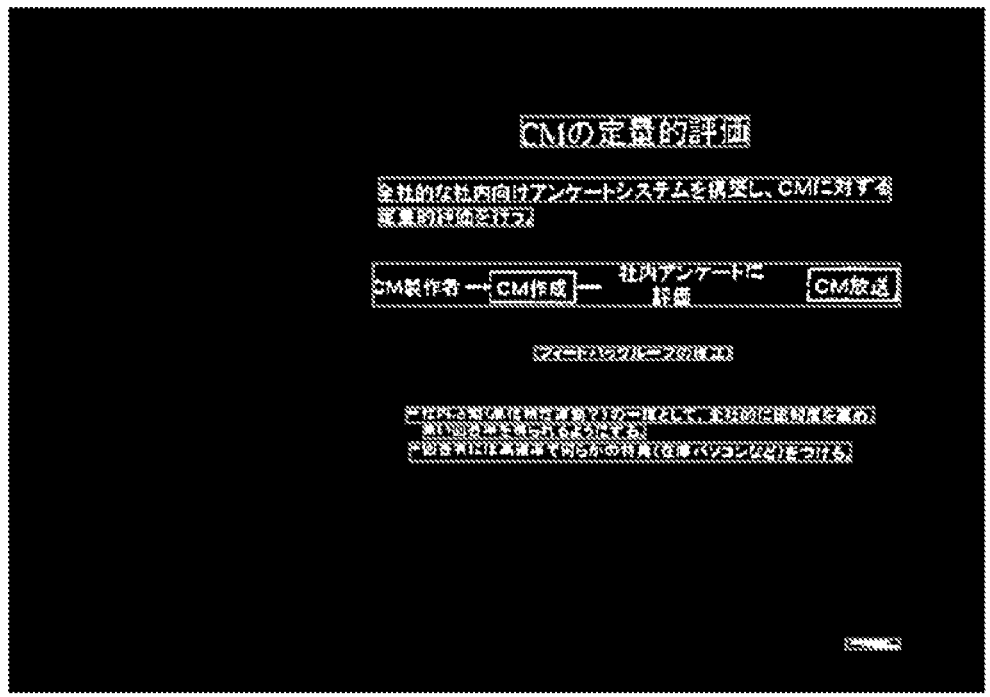
FIG. 45 shows the result of text line region formation.
Figure 46:
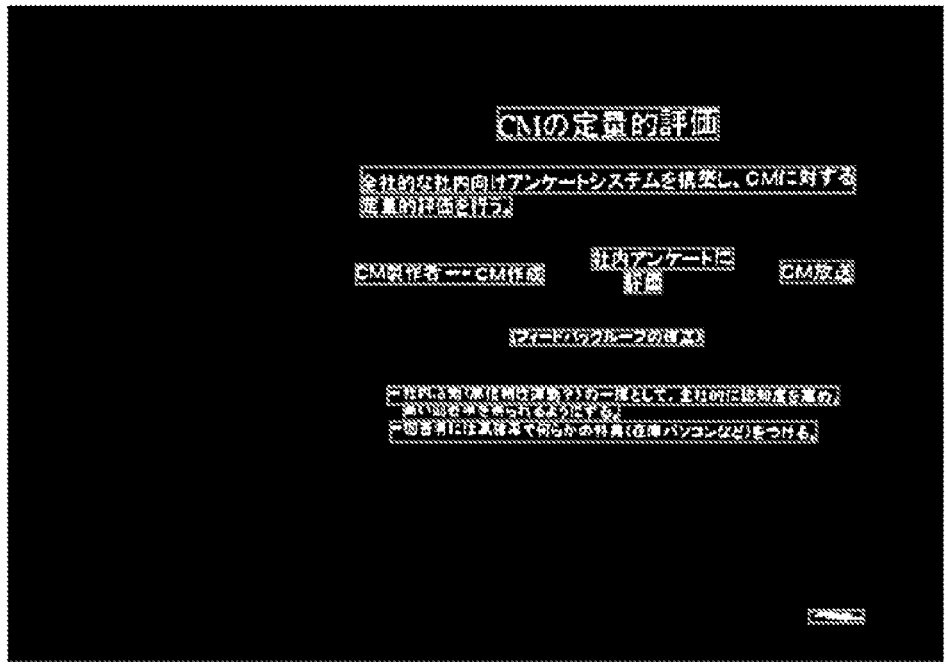
FIG. 46 shows the final binarized text line regions.

FIGS. 41 to 46 show some results of the text extraction apparatus. FIG. 41 shows the original video frame. FIG. 42 shows the result for edge image generation, which is the final edge image (second edge image). FIG. 43 shows the result of stroke generation. FIG. 44 shows the result of stroke filtering. FIG. 45 shows the result of text line formation. FIG. 46 shows the result of the refined final binarized text line regions.

Figure 47:
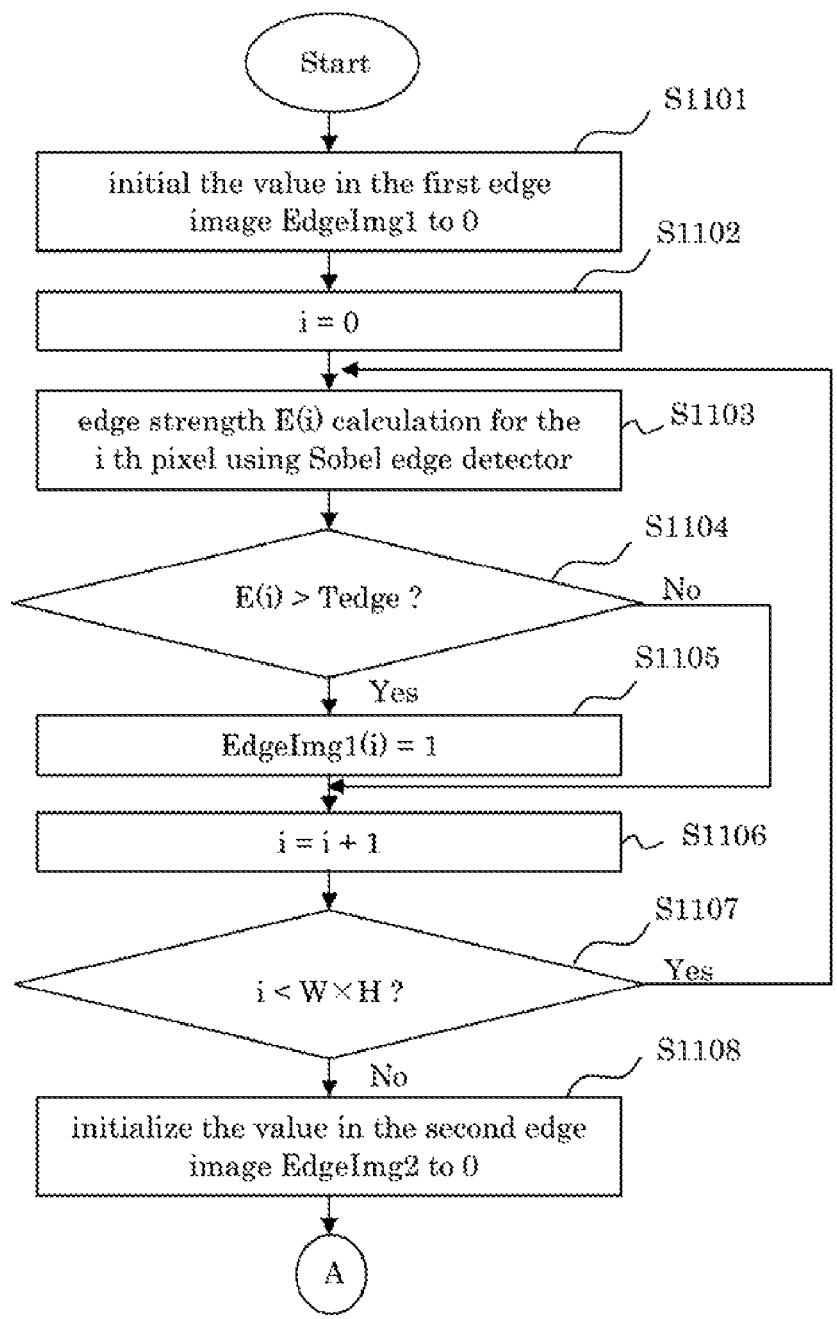
FIG. 47 shows the flowchart of the operation of the edge image generation unit (No. 1)
Figure 48:
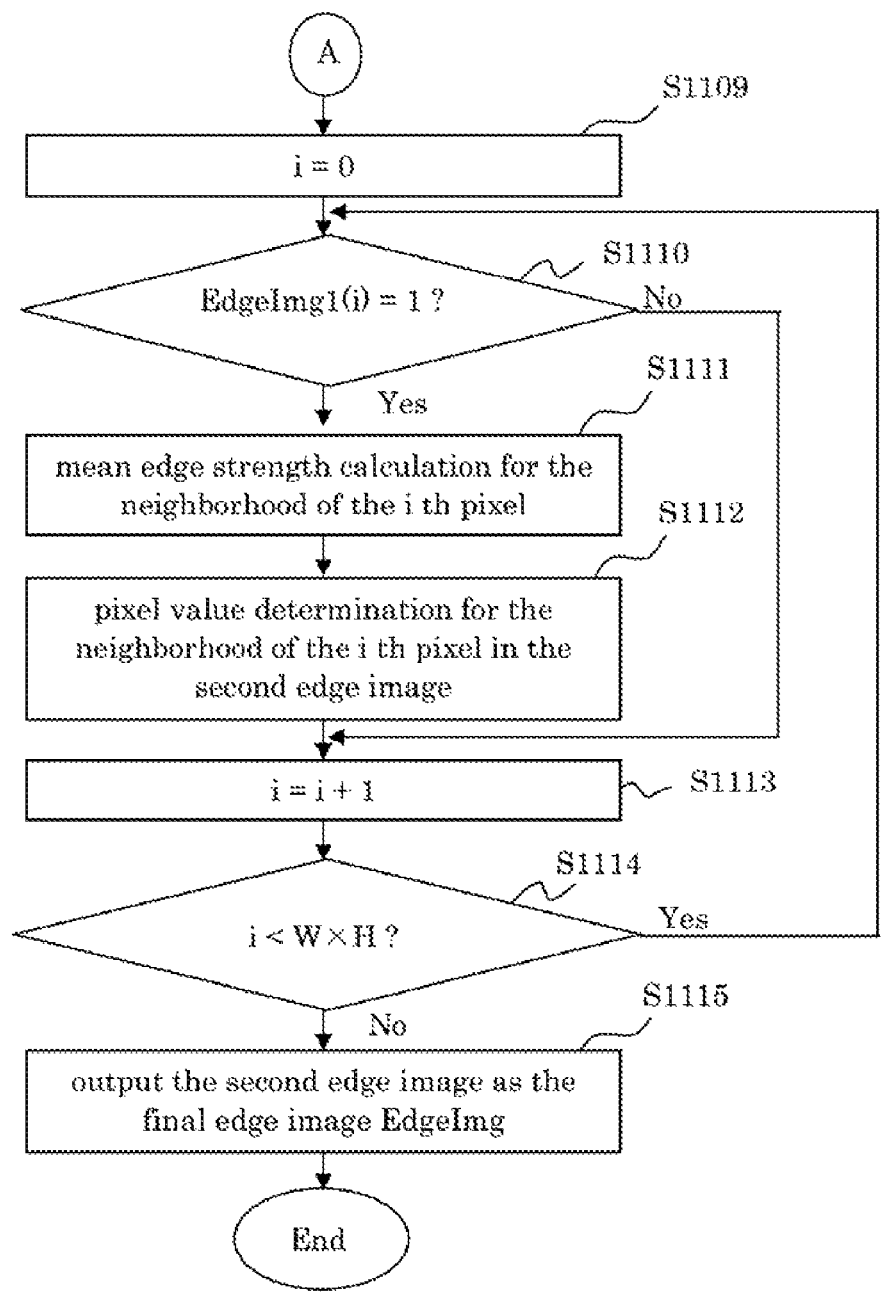
FIG. 48 shows the flowchart of the operation of the edge image generation unit (No. 2)

FIGS. 47 and 48 show the flowchart of the operation of the edge image generation unit 901 shown in FIG. 35. First all the values of the pixels EdgeImg1($i$) in the first edge image EdgeImg1 of size W×H are set to 0 (S1101). Started from the first pixel (S1102), the edge strength calculation unit 911 is then used to calculate edge strength E(i) of the i th pixel using Sobel edge detector (S1103). Next the first edge image generation unit 912 is used to determine the value of EdgeImg1($i$). If the edge strength is larger than a predefined threshold Tedge (S1104), then the value of this pixel in the first edge image is set to 1, EdgeImg1($i$)=1 (S1105). This procedure continues until all the pixels are checked (S1106 and S1107).

After the first edge image is obtained, all the values EdgeImg2($i$) for the second edge image EdgeImg2 of size W×H are initialized to 0 (S1108). Scanned from the first pixel (S1109), if the value of the pixel in the first edge image is 1 (S1110), then the mean edge strength of the neighborhood pixels is obtained according to the arrangement of the neighborhood 1116 of pixel i shown in FIG. 49 (S1111). The second edge image generation unit 913 is then used to determine the values for these neighborhood pixels in the second edge image by comparing the edge strength of a pixel with the mean edge strength (S1112). If the edge strength is larger than the mean edge strength, the pixel value in the second edge image is set to 1, otherwise the value is set to 0. After all pixels in the first edge image are checked (S1113 and S1114), the second edge image is outputted as the final edge image EdgeImg (S1115).

FIG. 50 shows the flowchart of the operation of the edge strength calculation unit 911 in S1103 shown in FIG. 47. For the i th pixel, the horizontal and the vertical edge strengths Ex(i) and Ey(i) are first obtained in the neighborhood area 1116 shown in FIG. 49 by the following equations (S1117 and S1118):

$$Ex(i)=I(d)+2*I(e)+I(f)-I(b)-2*I(a)-I(h),$$

$$Ey(i)=I(b)+2*I(c)+I(d)-I(h)-2*I(g)-I(f),$$

where I(x) represents the gray level of the x th pixel (x=a, b, c, d, e, f, g, h). The total edge strength E(i) is calculated by the following equation (S1119):

$$E(i)=\sqrt{Ex(i)*Ex(i)+Ey(i)*Ey(i)}.$$

The mean edge strength of pixel i in S1111 shown in FIG. 48 is calculated by the following equation:

$$Medge(i)=(E(a)+E(b)+E(c)+E(d)+E(e)+E(f)+E(g)+E(h)+E(i))/9.$$

FIG. 51 shows the flowchart of the operation of the stroke image generation unit 902 shown in FIG. 36. The stroke image of size W×H is first initialized to 0 (S1201). Then the local image binarization unit 921 is used to determine the values of the pixels of the stroke image. Started from the first pixel (S1202), if the value of the i th pixel EdgeImg(i) in the edge image EdgeImg is 1 (S1203), a 11×11 window is set at the gray level frame image centered at the pixel's position and the values of the pixels of the stroke image in the window are determined by Niblack's binarization method shown in FIG. 25 (S1204). After all pixels are checked in the edge image (S1205 and S1206), the stroke image is generated.

Figure 52:
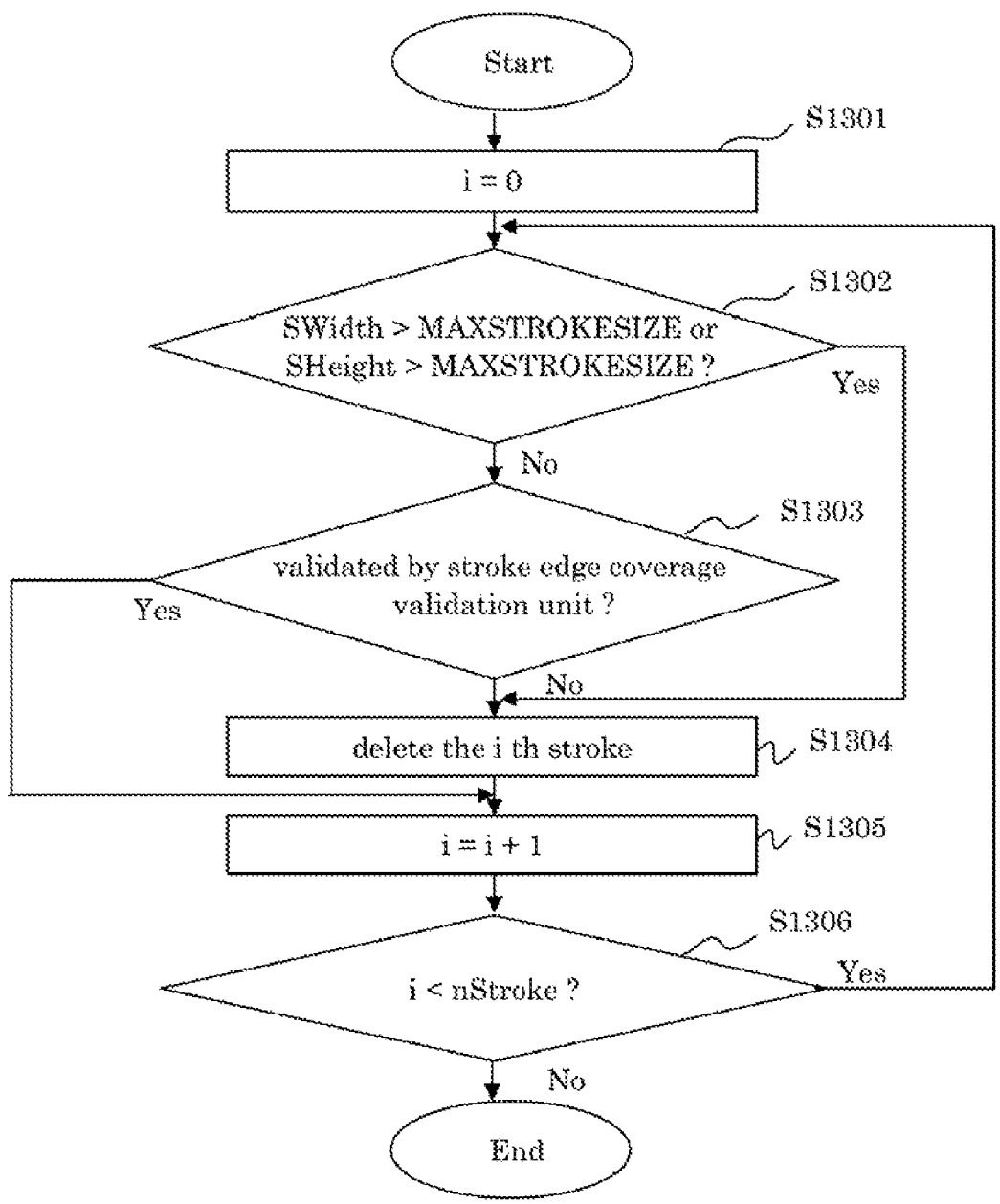
FIG. 52 shows the flowchart of the operation of the stroke filtering unit.

FIG. 52 shows the flowchart of the operation of the stroke filtering unit 903 shown in FIG. 37. First the long straight line detection unit 932 is used to delete very large strokes. Started from the first stroke (S1301), if the width or height of the stroke exceeds a predefined threshold MAXSTROKESIZE (S1302), this stroke is deleted (S1304). Otherwise, the stroke edge coverage validation unit 931 is used to check the validity of the stroke (S1303). A valid stroke means a candidate character stroke and an invalid stroke is not a true character stroke. If the stroke is invalid, it is deleted (S1304). The checking is repeated for all strokes found in the stroke image with nStroke as the number of the strokes (S1305 and S1306).

Figure 49:
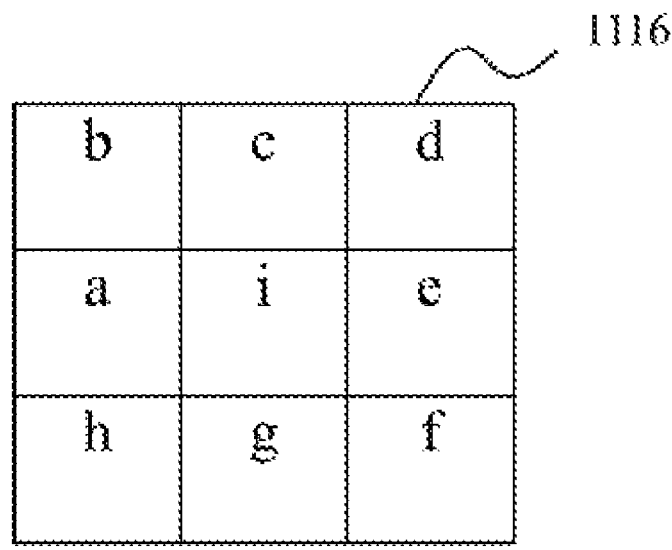
FIG. 49 shows the arrangement of the neighborhood of pixel I.
Figure 53:
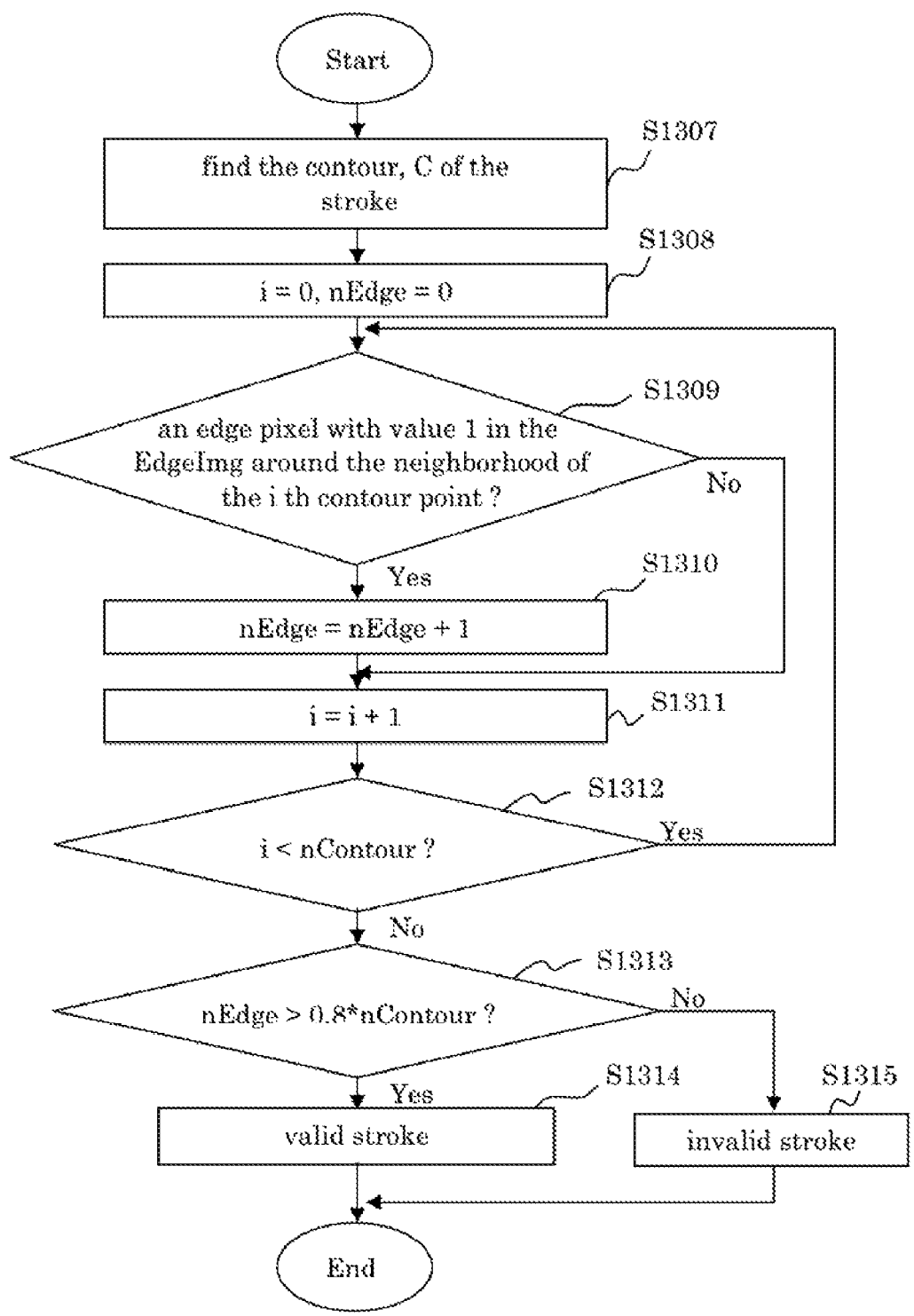
FIG. 53 shows the flowchart of the operation of the stroke edge coverage validation unit.

FIG. 53 shows the flowchart of the operation of the stroke edge coverage validation unit 931 in S1303 shown in FIG. 52. First the contour C of the stroke is obtained (S1307). From the first contour point (S1308), the pixel values of EdgeImg in the neighborhood area of the current contour point are checked (S1309). As shown in FIG. 49, point a to point h are considered as the neighborhood points of point i. If there is a neighbor edge pixel which has a value of 1, then this contour point is regarded as a valid edge contour point and the count of valid edge contour points nEdge increases by 1 (S1310). After all contour points are checked with nContour as the number of the contour points (S1311 and S1312), if the number of the valid edge contour points is larger than 0.8*nContour (S1313), the stroke is considered as a valid stroke, that is, a candidate character stroke (S1314). Otherwise, the stroke is an invalid stroke (S1315). An invalid stroke is deleted from the stroke list. The rate of nEdge to nContour in S1313 represents the overlap rate.

Figure 54:
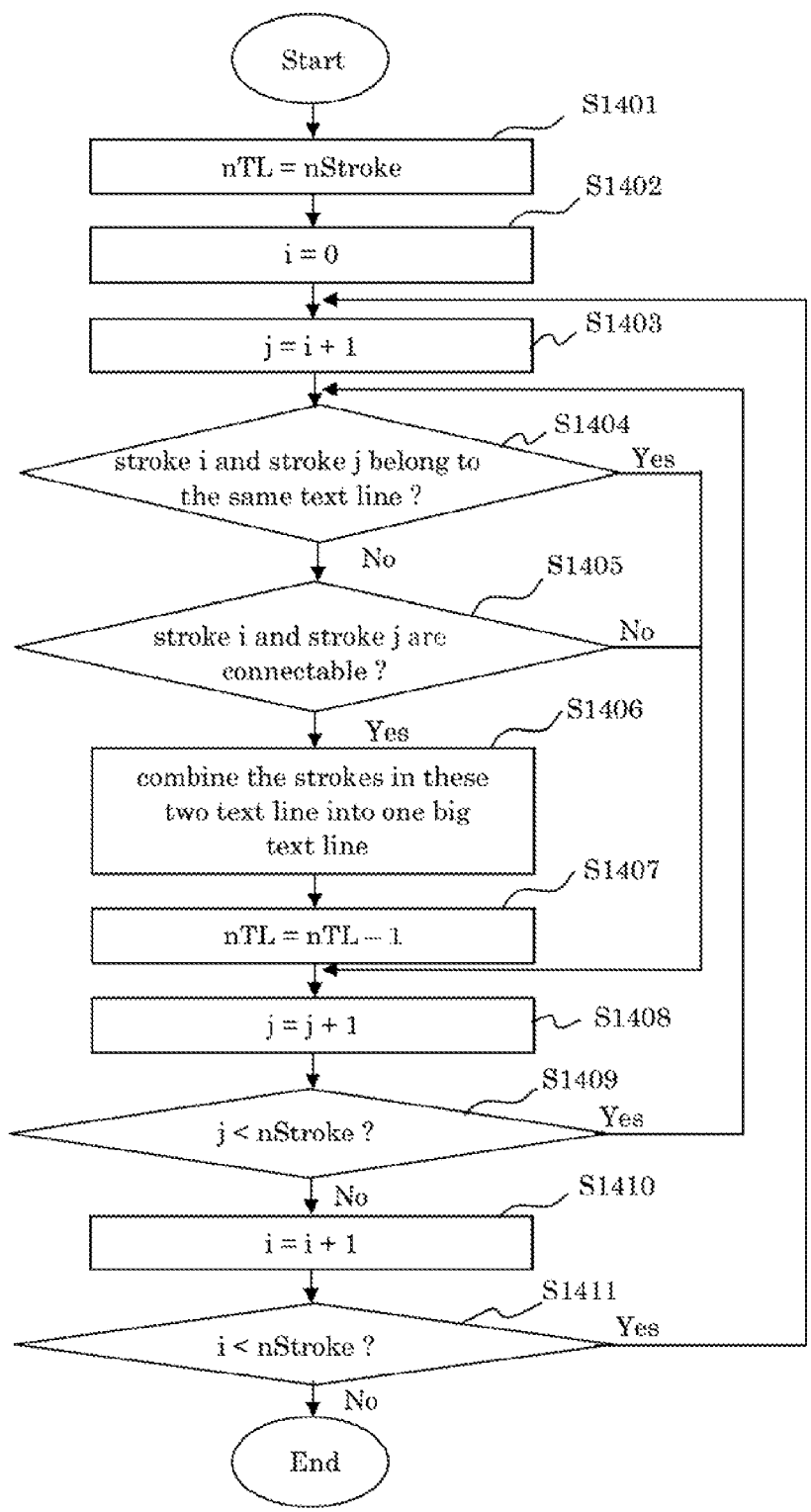
FIG. 54 shows the flowchart of the operation of the text line region formation unit.

FIG. 54 shows the flowchart of the operation of the text line region formation unit 904 shown in FIG. 38. First the region of every stroke is set as an individual text line region and the number of text line nTL is set to nStroke (S1401). Started from the first stroke (S1402), stroke j next to stroke i is selected (S1403) and it is checked whether stroke i and stroke j belong to one text line region (S1404). If not, the stroke connection checking unit 941 is used to check whether these two strokes are connectable (S1405). If so, all the strokes in these two text lines, a text line to which stroke i belongs and a text line to which stroke j belongs, are combined into one big text line (S1406) and the number of text line decreases by 1 (S1407).

Here, a text line is a group of connectable strokes and every stroke has an attribute of a text line. If stroke i belongs to the m th text line, stroke j belongs to the n th text line, and stroke is connectable with stroke j, then the attributes of all strokes in the m th and the n th text lines are set to m. After every pair of the strokes are checked (S1408, S1409, S1410 and S1411), nTL is the number of the text lines in the frame.

Figure 55:
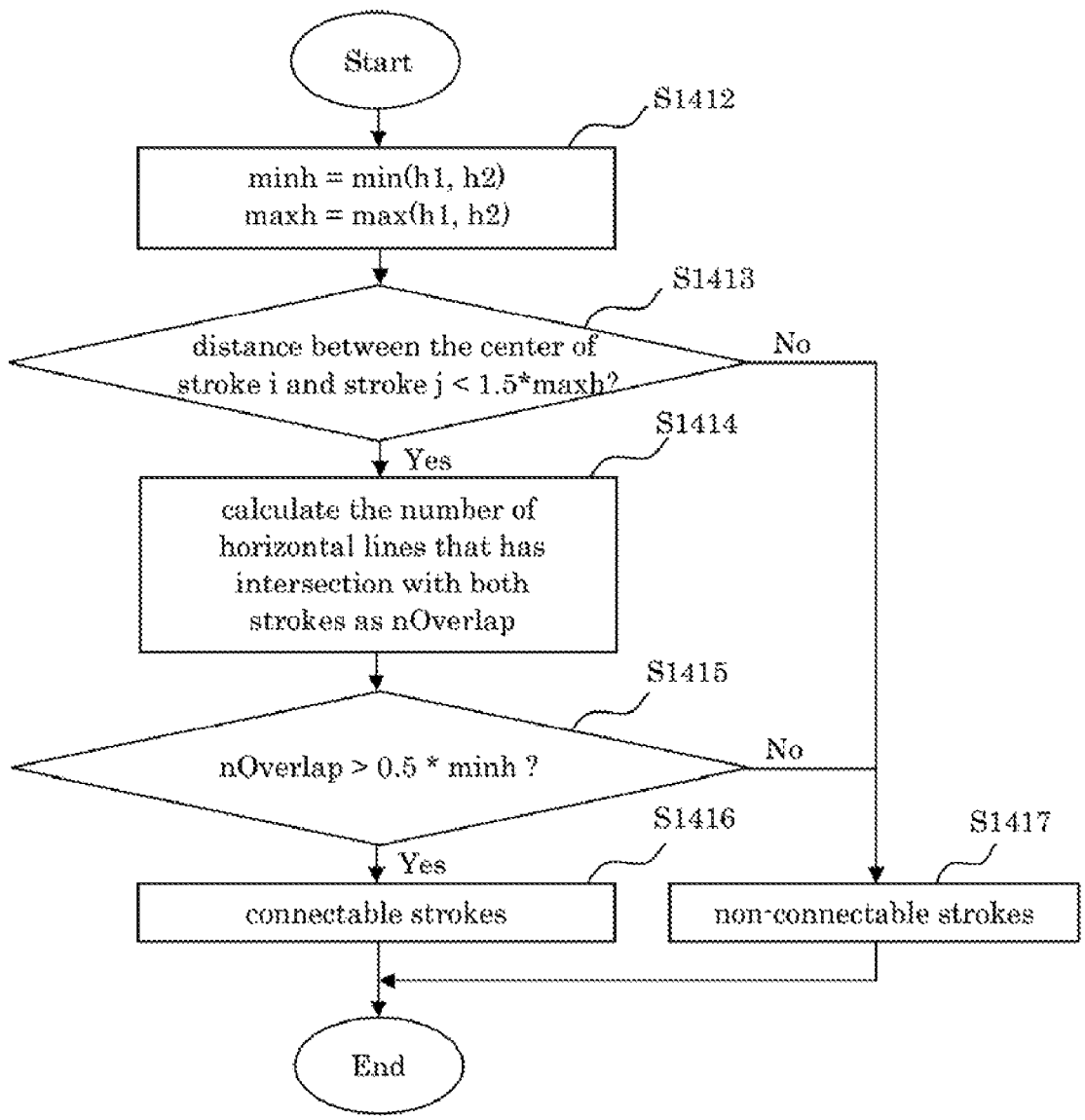
FIG. 55 shows the flowchart of the operation of the stroke connection checking unit.

FIG. 55 shows the flowchart of the operation of the stroke connection checking unit 941 in S1405 shown in FIG. 54. First, the heights of the two strokes h1 and h2 are obtained and the higher height is marked as maxh and the lower height is marked as minh (S1412). If the horizontal distance between the centers of stroke i and stroke j is larger than 1.5*maxh (S1413), then these two strokes are not connectable (S1417). Otherwise, the number of the horizontal lines that has intersection with both stroke i and stroke j is recorded as nOverlap (S1414). If nOverlap is larger than 0.5*minh (S1415), then these two strokes are connectable (S1416). Otherwise, these two strokes are not connectable (S1417). The ratio of nOverlap to minh in S1415 represents the overlap ratio.

FIG. 56 shows the flowchart of the operation of the text line verification unit 905 shown in FIG. 39. First, the modification flag modflag is set to false (S1501). Started from the first text line region (S1502), if the height of the i th text line region Height(i) is less than a predefined threshold MINTLHEIGHT (S1503), this text line region is deleted (S1504). Otherwise, a vertical false stroke detection unit 951 and a horizontal false stroke detection unit 952 are used to detect a false stroke (S1505 and S1506). If a false stroke is detected, then the stroke is deleted (S1507), the remaining strokes are reconnected (S1508) using the text line reformation unit 953, and the modification flag is set to true (S1509). The text line reformation unit 953 reconnects the remaining strokes in the same manner as the text line region formation unit 904. After all the text line regions are checked (S1510 and S1511), if the modification flag is true (S1512), then the whole process is repeated again until no false stroke is detected.

Figure 57:
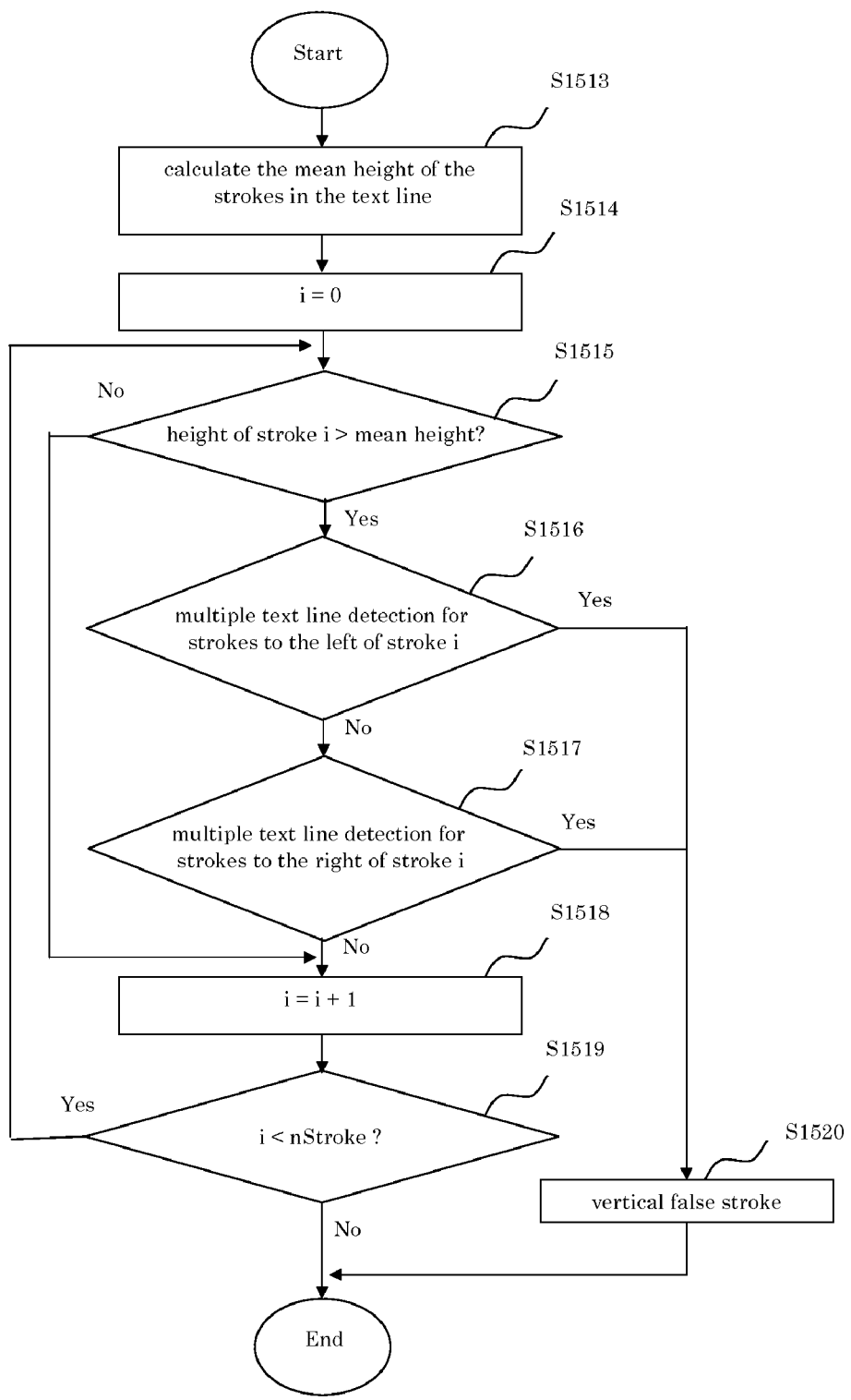
FIG. 57 shows the flowchart of the operation of the vertical false stroke detection unit.

FIG. 57 shows the flowchart of the operation of the vertical false stroke detection unit 951 in S1505 shown in FIG. 56. The mean height of the strokes in the text line region is first calculated (S1513). Started from the first stroke (S1514), if the height of stroke i is larger than the mean height (S1515), then multiple text line detection is performed to check the strokes in an area to the left of stroke i (S1516). The area to the left of stroke i is a region inside a text line region, and the left, up, and bottom boundaries of this area are the left, up and bottom boundaries, respectively, of the text line region. The right boundary of this area is the left boundary of stroke i. If there are two or more non-overlapped horizontal text line regions in the area to the left of stroke i, stroke i is a vertical false stroke (S1520).

Otherwise, multiple text line detection is then performed to check the strokes in an area to the right of stroke i (S1517). The area to the right of stroke i has a similar definition to that of the area to the left of stroke i. If there are two or more non-overlapped horizontal text line regions in the area to the right of stroke i, stroke i is a vertical false stroke (S1520). The procedure repeats until every stroke in the text line region is checked (S1518 and S1519).

Figure 58:
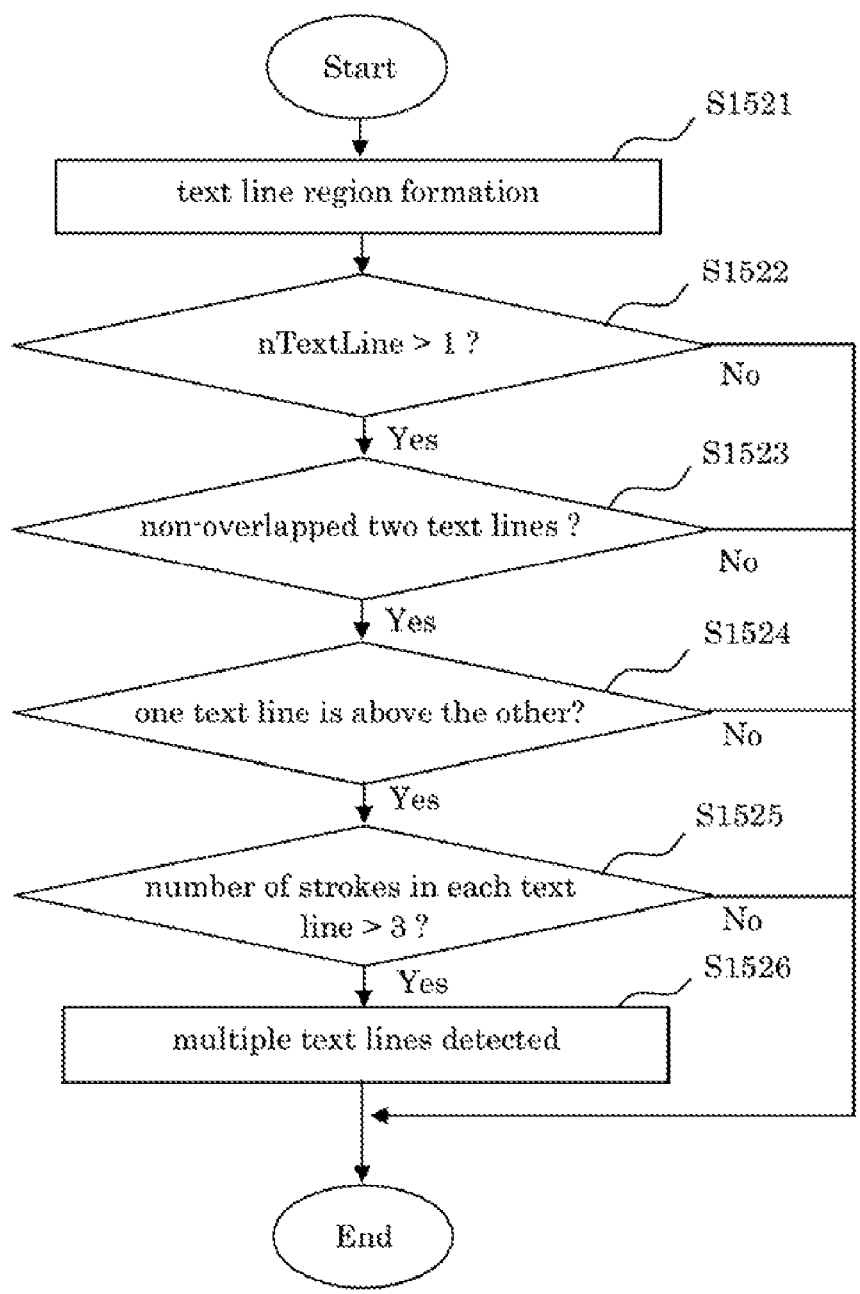
FIG. 58 shows the flowchart of multiple text line detection.

FIG. 58 shows the flowchart of multiple text line detection in S1516 and S1517 shown in FIG. 57. First, the strokes are connected in the same manner as the text region formation unit 904 (S1521). If the number of the text line regions nTextLine is more than 1 (S1522), then it is checked whether the following three conditions are met.
1. There are two non-overlapped text line regions (S1523).
2. One text line region is above the other text line region (S1524).
3. Number of the strokes in each text line region is larger than 3 (S1525).

If all the three conditions are met, then multiple text lines are detected (S1526).

Figure 59:
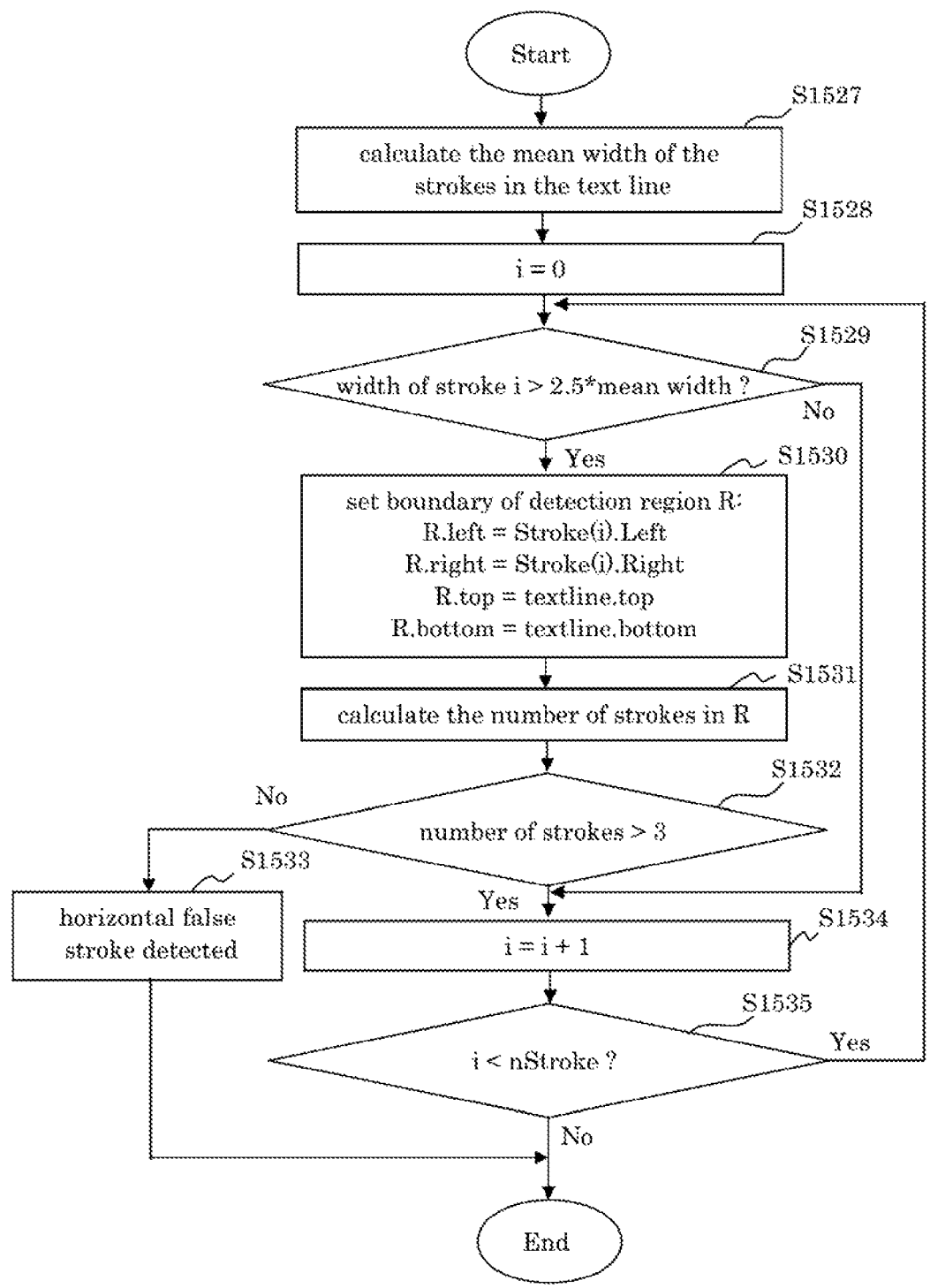
FIG. 59 shows the flowchart of the operation of the horizontal false stroke detection unit.

FIG. 59 shows the flowchart of the operation of the horizontal false stroke detection unit 952 in S1506 shown in FIG. 56. First, the mean width of all the strokes in the text line region is calculated (S1527). Started from the first stroke (S1528), if the width of stroke i is larger than 2.5 times the mean stroke width (S1529), then a detection region R is set (S1530). The left boundary R.left and the right boundary R.right of R are determined by the left boundary Stroke(i).Left and the right boundary Stroke(i).Right, respectively, of stroke i. The top boundary R.top and the bottom boundary R.bottom of R are determined by the top boundary textline.top and the bottom boundary textline.bottom, respectively, of the text line region. The number of strokes in detection region R is calculated (S1531), if the number is less than or equal to 3 (S1532), then stroke i is marked as a horizontal false stroke (S1533). The procedure repeats until every stroke in the text line region is checked (S1534 and S1535).

Figure 60:
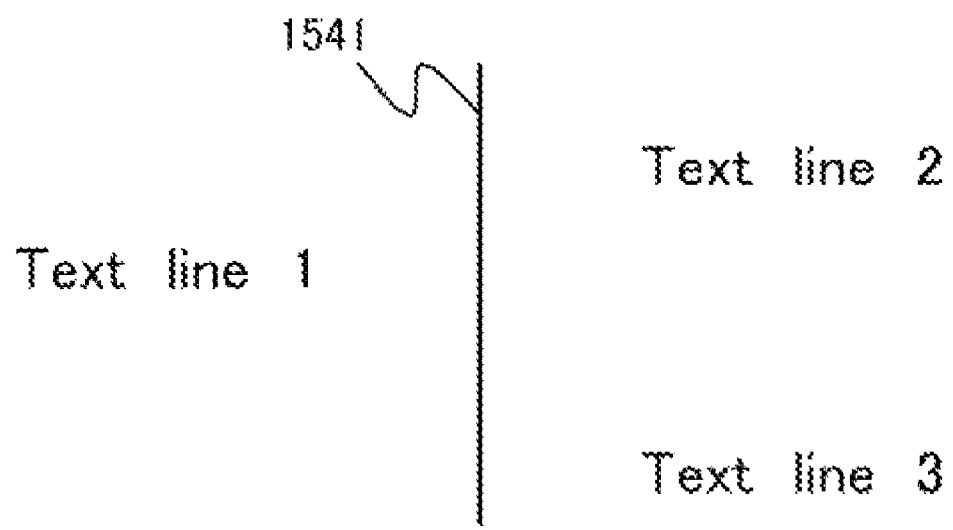
FIG. 60 shows the first false stroke.
Figure 61:
FIG. 61 shows the second false stroke.

FIGS. 60 and 61 show examples of a false stroke. Stroke 1541 shown in FIG. 60 is a vertical false stroke and stroke 1542 shown in FIG. 61 is a horizontal false stroke.

Figure 62:
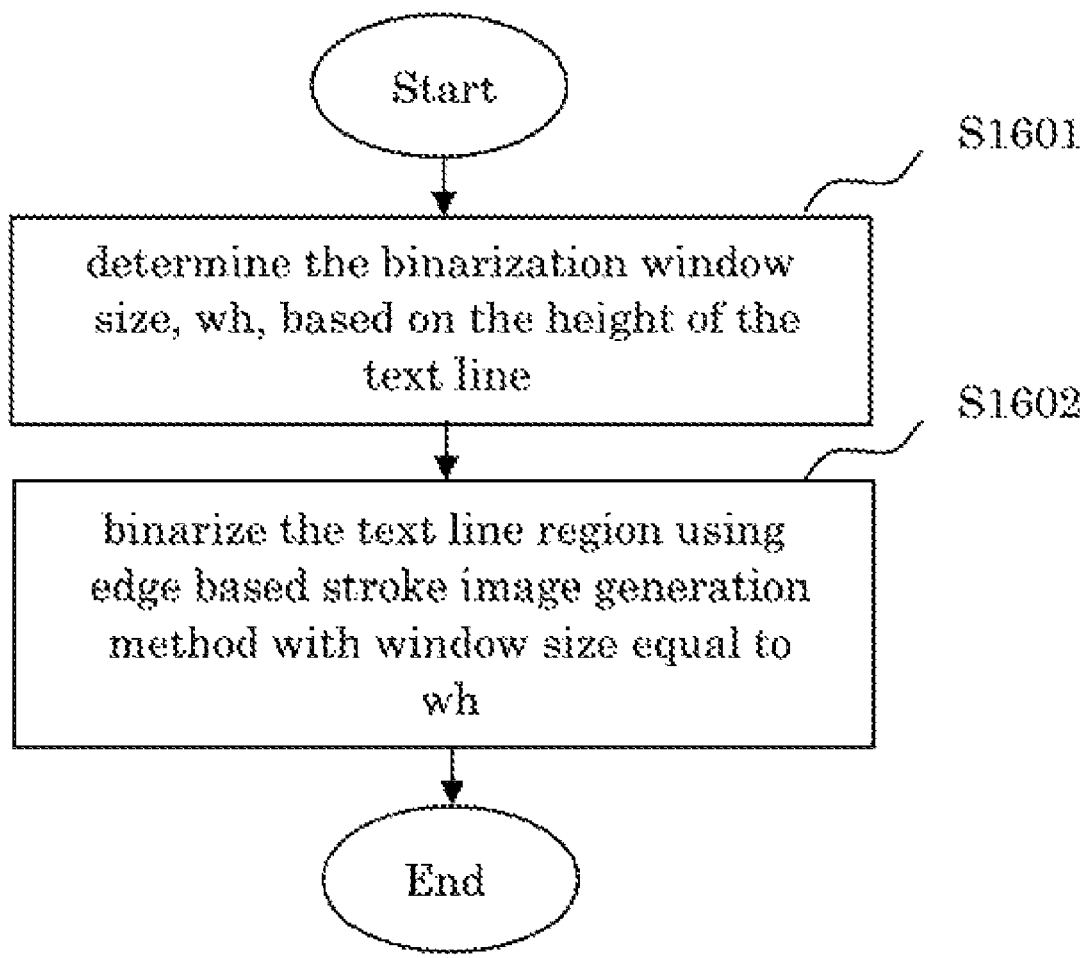
FIG. 62 shows the flowchart of the operation of the text line binarization unit.

FIG. 62 shows the flowchart of the operation of the text line binarization unit 906 shown in FIG. 40. First, the automatic size calculation unit 961 is used to determine the size of the window wh for binarization based on the height of the text line region Height (S1601), which must satisfy the following three conditions:

$$wh = Height/3,$$

$$wh = wh + 1 \text{ if } wh \text{ is an even number,}$$

$$wh = 5 \text{ if } wh < 5.$$

After that, the block image binarization unit 962 is used to rebinarize the text line region (S1602). The block image binarization unit 962 sets the window size of Niblack's binarization method to wh and rebinarizes the text line region in the same manner as the stroke image generation unit 902.

Figure 63:
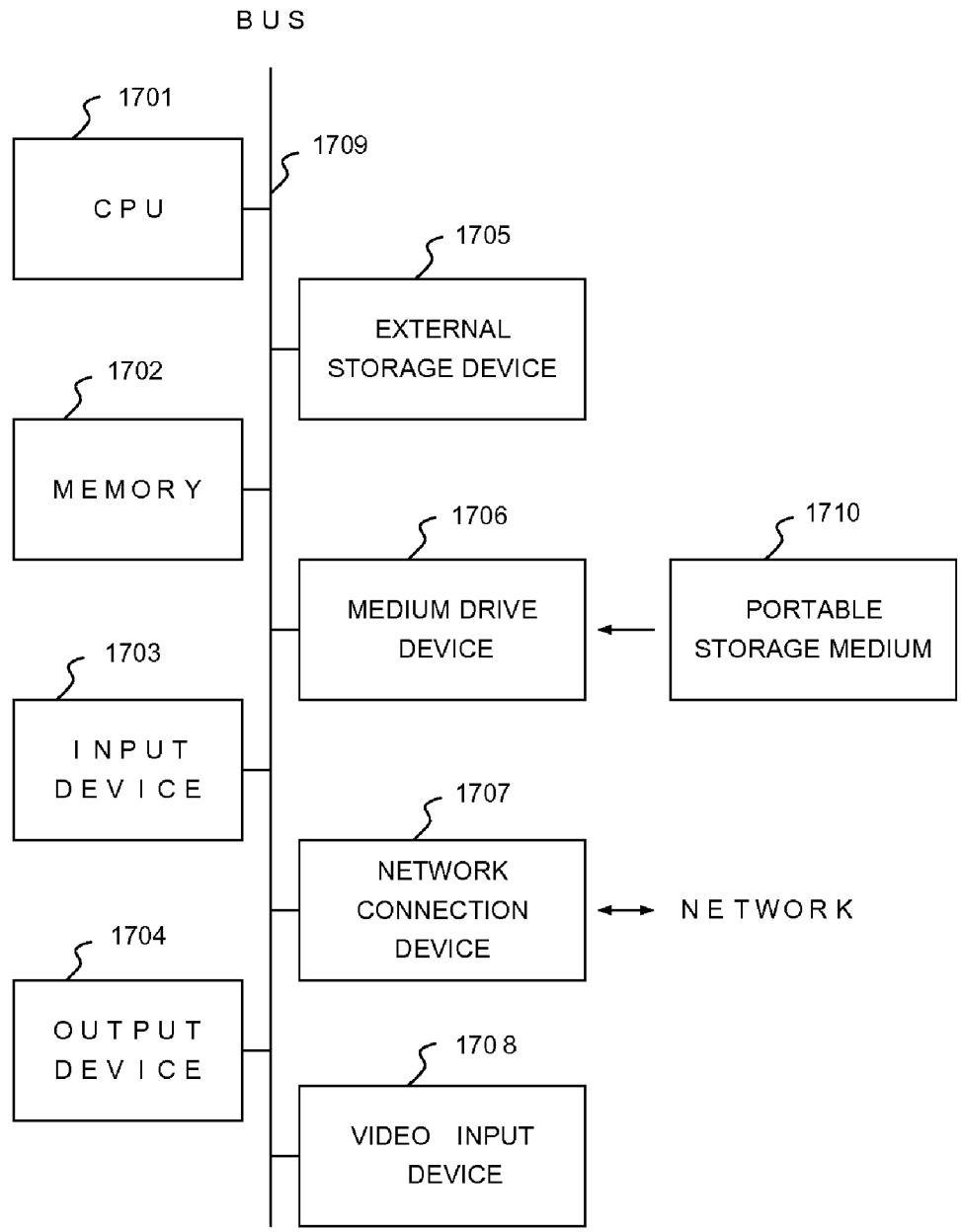
FIG. 63 shows the configuration of an information processing apparatus.

The video text processing apparatus or each of the text change frame detection apparatus 104 and the text extraction apparatus 105 shown in FIG. 1 is configured, for example, using an information processing apparatus (computer) as shown in FIG. 63. The information processing apparatus shown in FIG. 63 comprises a CPU (central processing device) 1701, a memory 1702, an input device 1703, an output device 1704, an external storage device 1705, a medium drive device 1706, a network connection device 1707, and a video input device 1708. They are interconnected through a bus 1709.

The memory 1702 includes, for example, ROM (read only memory), RAM (random access memory), etc. and stores programs and data for use in the processes. The CPU 1701 performs a necessary process by executing the program using the memory 1702. In this case, the units 301 to 303 shown in FIG. 3 and the units 901 to 906 shown in FIG. 34 correspond to the programs stored in the memory 1702.

The input device 1703 is, for example, a keyboard, a pointing device, a touch panel, etc., and used to input an instruction and information from a user. The output device 1704 is, for example, a display, a printer, a speaker, etc., and used to output an inquiry to the user and a process result.

The external storage device 1705 is, for example, a magnetic disk device, an optical disk device, a magneto-optical disk device, a tape device, etc. The information processing apparatus stores the programs and data in the external storage device 1705, and loads them to the memory 1702 to use them as necessary. The external storage device 1705 is also used as a database storing the existing video data 101 shown in FIG. 1.

The medium drive device 1706 drives a portable storage medium 1710, and accesses the stored contents. The portable storage medium 1710 is an arbitrary computer-readable storage medium such as a memory card, a flexible disk, CD-ROM (compact disk read only memory), an optical disk, a magneto-optical disk, etc. The user stores the programs and data in the portable storage medium 1710, and loads them to the memory 1702 to use them as necessary.

The network connection device 1707 is connected to an arbitrary communications network such as a LAN (local area network), Internet, etc., and converts data during the communications. The information processing apparatus receives the programs and data through the network connection device 1707, loads them to the memory 1702 to use them as necessary.

The video input device 1708 is, for example, the TV video camera 102 shown in FIG. 1 and is used to input the living video stream.

FIG. 64 shows computer-readable storage media capable of providing a program and data for the information processing apparatus shown in FIG. 63. The program and data stored in the portable storage medium 1710 and a database 1803 of a server 1801 are loaded to the memory 1702 of an information processing apparatus 1802. The server 1801 generates a propagation signal for propagating the program and data, and transmits it to the information processing apparatus 1802 through an arbitrary transmission medium in a network. The CPU 1701 executes the program using the data to perform a necessary process.

As explained above in detail, according to the present invention, duplicate video frames, shifting video frames as well as video frames that do not contain a text area can be removed in a very fast speed from given video frames. Further, the text line region in a video frame can be accurately binarized since the false strokes are detected and removed as much as possible.

What is claimed is:
1. A text extraction apparatus that extracts at least one text line region from a given image, said apparatus comprising:
   an edge image generation unit generating edge information of the given image;
   a stroke image generation unit generating a binary image of candidate character strokes in the given image by using the edge information;
   a stroke filtering unit removing a false stroke from the binary image by using the edge information;

a text line region formation unit combining a plurality of strokes into a text line region;

a text line verification unit removing a false character stroke from the text line region and reforming the text line region;

a text line binarization unit binarizing the text line region by using a height of the text line region; and an output unit outputting a binary image of the text line region.

2. The text extraction apparatus according to claim 1, wherein the edge image generation unit includes:

an edge strength calculation unit calculating edge strength for every pixel in the given image by using a Sobel edge detector;

a first edge image generation unit generating a first edge image by comparing the edge strength of every pixel with a predefined edge threshold and setting a value of a corresponding pixel in the first edge image to one binary value if the edge strength is greater than the threshold and the other binary value if the edge strength is less than the threshold; and a second edge image generation unit generating a second edge image by comparing the edge strength of every pixel in a window centered at a position of every pixel of the one binary value in the first edge image with mean edge strength of the pixels in the window and setting a value of a corresponding pixel in the second edge image to the one binary value if the edge strength of the pixel is greater than the mean edge strength and the other binary value if the edge strength of the pixel is less than the mean edge strength.

3. The text extraction apparatus according to claim 2, wherein the stroke image generation unit includes a local image binarization unit binarizing a gray scale image of the given image in a Niblack's binarization method to obtain the binary image of the candidate character strokes by using a window centered at a position of every pixel of the one binary value in the second edge image.

4. The text extraction apparatus according to claim 2, wherein the stroke filtering unit includes:

a stroke edge coverage validation unit checking an overlap rate of a contour of a stroke in the binary image of the candidate character strokes by pixels of the one binary value in the second edge image, determining that the stroke is a valid stroke if the overlap rate is greater than a predefined threshold and an invalid stroke if the overlap rate is less than the predefined threshold, and removing the invalid stroke; and a long straight line detection unit removing a large stroke by using a width and a height of the stroke.

5. The text extraction apparatus according to claim 2, wherein the text line binarization unit includes:

an automatic size calculation unit determining a size of a window for binarization; and a block image binarization unit binarizing a gray scale image of the given image in a Niblack's binarization method to obtain the binary image of the text line region by using the window centered at a position of every pixel of the one binary value in the second edge image.

6. The text extraction apparatus according to claim 1, wherein the text line region formation unit includes a stroke connection checking unit checking whether two adjacent strokes are connectable by using an overlap ratio of heights of the two strokes and a distance between the two strokes, and the text line region formation unit combines the plurality of strokes into a text line region by using a result of checking.

7. The text extraction apparatus according to claim 1, wherein the text line verification unit includes:

a vertical false stroke detection unit checking every stroke with a height higher than a mean height of strokes in the text line region, and marking the stroke as a false stroke if the stroke connects two horizontal text line regions into one big text line region;

a horizontal false stroke detection unit checking every stroke with a width larger than a threshold determined by a mean width of the strokes in the text line region, and marking the stroke as a false stroke if a number of strokes in a region that contains the stroke is less than a predefined threshold; and a text line reformation unit reconnecting strokes except for a false stroke in the text line region if the false stroke is detected in the text line region.

8. A text extraction apparatus that extracts at least one text line region from a given image, said apparatus comprising:

an edge image generation unit generating an edge image of the given image;

a stroke image generation unit generating a binary image of candidate character strokes in the given image by using the edge image;

a stroke filtering unit checking an overlap rate of a contour of a stroke in the binary image of the candidate character strokes by pixels indicating an edge in the edge image, determining that the stroke is a valid stroke if the overlap rate is greater than a predefined threshold and an invalid stroke if the overlap rate is less than the predefined threshold, and removing the invalid stroke; and an output unit outputting information of remaining strokes in the binary image of the candidate character strokes.

9. A non-transitory computer-readable storage medium storing a program used to direct a computer, that extracts at least one text line region from a given image, to perform a process comprising:

generating edge information of the given image;

generating a binary image of candidate character strokes in the given image by using the edge information;

removing a false stroke from the binary image by using the edge information;

combining a plurality of strokes into a text line region;

removing a false character stroke from the text line region and reforming the text line region;

binarizing the text line region by using a height of the text line region; and outputting a binary image of the text line region.

10. The storage medium according to claim 9, wherein the generating edge information includes:

calculating edge strength for every pixel in the given image by using a Sobel edge detector;

generating a first edge image by comparing the edge strength of every pixel with a predefined edge threshold and setting a value of a corresponding pixel in the first edge image to one binary value if the edge strength is greater than the threshold and the other binary value if the edge strength is less than the threshold; and generating a second edge image by comparing the edge strength of every pixel in a window centered at a position of every pixel of the one binary value in the first edge image with mean edge strength of the pixels in the window and setting a value of a corresponding pixel in the second edge image to the one binary value if the edge strength of the pixel is greater than the mean edge strength and the other binary value if the edge strength of the pixel is less than the mean edge strength.

11. The storage medium according to claim 10, wherein the generating the binary image of the candidate character strokes includes binarizing a gray scale image of the given image in a Niblack's binarization method to obtain the binary image of the candidate character strokes by using a window centered at a position of every pixel of the one binary value in the second edge image.

12. The storage medium according to claim 10, wherein the removing the false stroke from the binary image includes:
   removing a large stroke by using a width and a height of the stroke;
   checking an overlap rate of a contour of a stroke in the binary image of the candidate character strokes by pixels of the one binary value in the second edge image;
   determining that the stroke is a valid stroke if the overlap rate is greater than a predefined threshold and an invalid stroke if the overlap rate is less than the predefined threshold; and
   removing the invalid stroke.

13. The storage medium according to claim 10, wherein the binarizing the text line region includes:
   determining a size of a window for binarization; and
   binarizing a gray scale image of the given image in a Niblack's binarization method to obtain the binary image of the text line region by using the window centered at a position of every pixel of the one binary value in the second edge image.

14. The storage medium according to claim 9, wherein the combining the plurality of strokes into the text line region includes checking whether two adjacent strokes are connectable by using an overlap ratio of heights of the two strokes and a distance between the two strokes, and the combining the plurality of strokes into the text line region combines the plurality of strokes into a text line region by using a result of checking.

15. The storage medium according to claim 9, wherein the removing the false character stroke from the text line region and reforming the text line region includes:
   checking every stroke with a height higher than a mean height of strokes in the text line region;
   marking the stroke as a false stroke if the stroke connects two horizontal text line regions into one big text line region;
   checking every stroke with a width larger than a threshold determined by a mean width of the strokes in the text line region;
   marking the stroke as a false stroke if a number of strokes in a region that contains the stroke is less than a predefined threshold; and
   reconnecting strokes except for a false stroke in the text line region if the false stroke is detected in the text line region.

16. A non-transitory computer-readable storage medium storing a program used to direct a computer, that extracts at least one text line region from a given image, to perform a process comprising:
   generating an edge image of the given image;
   generating a binary image of candidate character strokes in the given image by using the edge image;
   checking an overlap rate of a contour of a stroke in the binary image of the candidate character strokes by pixels indicating an edge in the edge image;
   determining that the stroke is a valid stroke if the overlap rate is greater than a predefined threshold and an invalid stroke if the overlap rate is less than the predefined threshold;
   removing the invalid stroke; and
   outputting information of remaining strokes in the binary image of the candidate character strokes.

17. A text extraction method for extracting at least one text line region from a given image, said method comprising:
   generating edge information of the given image;
   generating a binary image of candidate character strokes in the given image by using the edge information;
   removing a false stroke from the binary image using the edge information;
   combining a plurality of strokes into a text line region;
   removing a false character stroke from the text line region and reforming the text line region;
   binarizing the text line region by using a height of the text line region; and
   presenting a binary image of the text line region.

* * * * *